(12) United States Patent
Nilsson et al.

(10) Patent No.: US 8,848,785 B2
(45) Date of Patent: Sep. 30, 2014

(54) COMPACT CUMULATIVE BIT CURVES

(75) Inventors: Michael Erling Nilsson, Ipswich (GB); Stephen Clifford Appleby, Colchester (GB); Rory Stewart Turnbull, Woodbridge (GB); Ian Barry Crabtree, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 13/985,381

(22) PCT Filed: Feb. 16, 2012

(86) PCT No.: PCT/GB2012/000160
§ 371 (c)(1),
(2), (4) Date: Aug. 14, 2013

(87) PCT Pub. No.: WO2012/110764
PCT Pub. Date: Aug. 23, 2012

(65) Prior Publication Data
US 2013/0322522 A1    Dec. 5, 2013

(30) Foreign Application Priority Data
Feb. 16, 2011    (EP) ................ 11250181

(51) Int. Cl.
| | | |
|---|---|---|
| H04N 7/12 | (2006.01) | |
| H04N 19/146 | (2014.01) | |
| H04N 21/234 | (2011.01) | |
| H04N 21/2343 | (2011.01) | |
| H04N 21/2381 | (2011.01) | |
| H04N 21/44 | (2011.01) | |
| H04N 21/442 | (2011.01) | |
| H04N 21/6373 | (2011.01) | |
| H04N 21/845 | (2011.01) | |
| H04N 7/173 | (2011.01) | |

(52) U.S. Cl.
CPC .......... *H04N 19/00169* (2013.01); *H04N 7/12* (2013.01); *H04N 21/23424* (2013.01); *H04N 21/234327* (2013.01); *H04N 21/23439* (2013.01); *H04N 21/2381* (2013.01); *H04N 21/44016* (2013.01); *H04N 21/44209* (2013.01); *H04N 21/6373* (2013.01); *H04N 21/8456* (2013.01)
USPC .............. 375/240.02; 375/240.05; 725/118

(58) Field of Classification Search
CPC ............. H04N 7/26; H04N 7/27; H04N 7/58; H04N 19/00169; H04N 7/50; H04N 7/26244; H04N 7/26271; H04N 7/26053; H04N 7/26941
See application file for complete search history.

(56) References Cited

U.S. PATENT DOCUMENTS 5,684,714 A * 11/1997 Yogeshwar et al. .......... 370/521
5,844,867 A * 12/1998 De Haan et al. ........... 369/47.35
(Continued)

FOREIGN PATENT DOCUMENTS

EP    2 200 319    6/2010

OTHER PUBLICATIONS

"Optimal Video Stream Multiplexing Through Linear Programming" by Heiman I. Stern et al., Science Direct 23(2008) 224-238, Feb. 1, 2008.*

(Continued)

*Primary Examiner* — Dave Czekaj
*Assistant Examiner* — Dramos I Kalapodas
(74) *Attorney, Agent, or Firm* — Nixon & Vanderhye PC

(57) ABSTRACT

Embodiments of the present invention provide a compact representation of a cumulative bit curve formed from piecewise straight line approximations between upper and lower bounds about an actual cumulative bit curve (CBC). In one embodiment the lower bounds are found by applying a constraint such that if a delivery rate was to be calculated using the count at the lower bound it would result in a delivery rate which was greater than the delivery rate that would be calculated using the actual CBC data by a particular amount, for example 10%. The actual CBC data is then used as an upper bound. As a result, the approximated CBC will lie for each GoP between the actual CBC value and the lower bound, with the result that one can be certain that any data rate that is calculated using the approximation will be at least as high as a data rate that is calculated using the actual CBC data. In terms of line-fitting algorithms that are used, several different algorithms may be used of differing complexities, with the intention of trying to minimize the number of end-points required of within the piecewise approximation.

20 Claims, 31 Drawing Sheets

(56) References Cited

U.S. PATENT DOCUMENTS

| | | | |
|---|---|---|---|
| 6,259,733 B1* | 7/2001 | Kaye et al. | 375/240 |
| 6,671,849 B2* | 12/2003 | Tripathi et al. | 714/746 |
| 7,646,816 B2* | 1/2010 | Ribas-Corbera et al. | 375/240.25 |
| 2004/0057446 A1* | 3/2004 | Varsa et al. | 370/412 |
| 2004/0193762 A1* | 9/2004 | Leon et al. | 710/52 |
| 2005/0259623 A1* | 11/2005 | Garudadri et al. | 370/335 |
| 2006/0067362 A1* | 3/2006 | Ramakrishnan | 370/468 |
| 2006/0126713 A1* | 6/2006 | Chou et al. | 375/225 |
| 2006/0143678 A1* | 6/2006 | Chou et al. | 725/118 |
| 2006/0165166 A1* | 7/2006 | Chou et al. | 375/240.05 |
| 2007/0253479 A1* | 11/2007 | Mukherjee | 375/240.1 |
| 2011/0243223 A1 | 10/2011 | Nilsson et al. | |

OTHER PUBLICATIONS

International Search Report for PCT/GB2012/000160 mailed Apr. 24, 2012.

M. Furini et al., "Real-Time Traffic Transmissions Over the Internet", IEEE Transactions on Multimedia, IEEE Service Center, vol. 3, No. 1, Mar. 1, 2001, pp. 33-40.

Furini, Marco and Towsley, Donald F., "Real-Time Traffic Transmissions Over the Internet", IEEE Transactions on Multimedia, vol. 3, No. 1, Mar. 2001 (8 pgs.).

\* cited by examiner

| GoP | Q1 | | Q2 | | Q3 | |
| --- | --- | --- | --- | --- | --- | --- |
| | CBC | 0-SUD | CBC | 0-SUD | CBC | 0-SUD |
| 1 | 150 | 1.57 | 250 | 1.78 | 330 | 2.1 |
| 2 | 300 | 1.83 | 450 | 2.02 | 575 | 2.6 |
| 3 | 480 | 1.67 | 780 | 2.1 | 860 | 2.7 |
| 4 | 780 | 1.23 | 1000 | 1.8 | 1380 | 2.4 |
| ... | ... | ... | ... | ... | ... | ... |

30

| DCP | GoP | ACP | GoP |
| --- | --- | --- | --- |
| 1 | 232 | 1 | 456 |
| 2 | 867 | 2 | 754 |
| 3 | 1347 | 3 | 1542 |
| ... | ... | ... | ... |

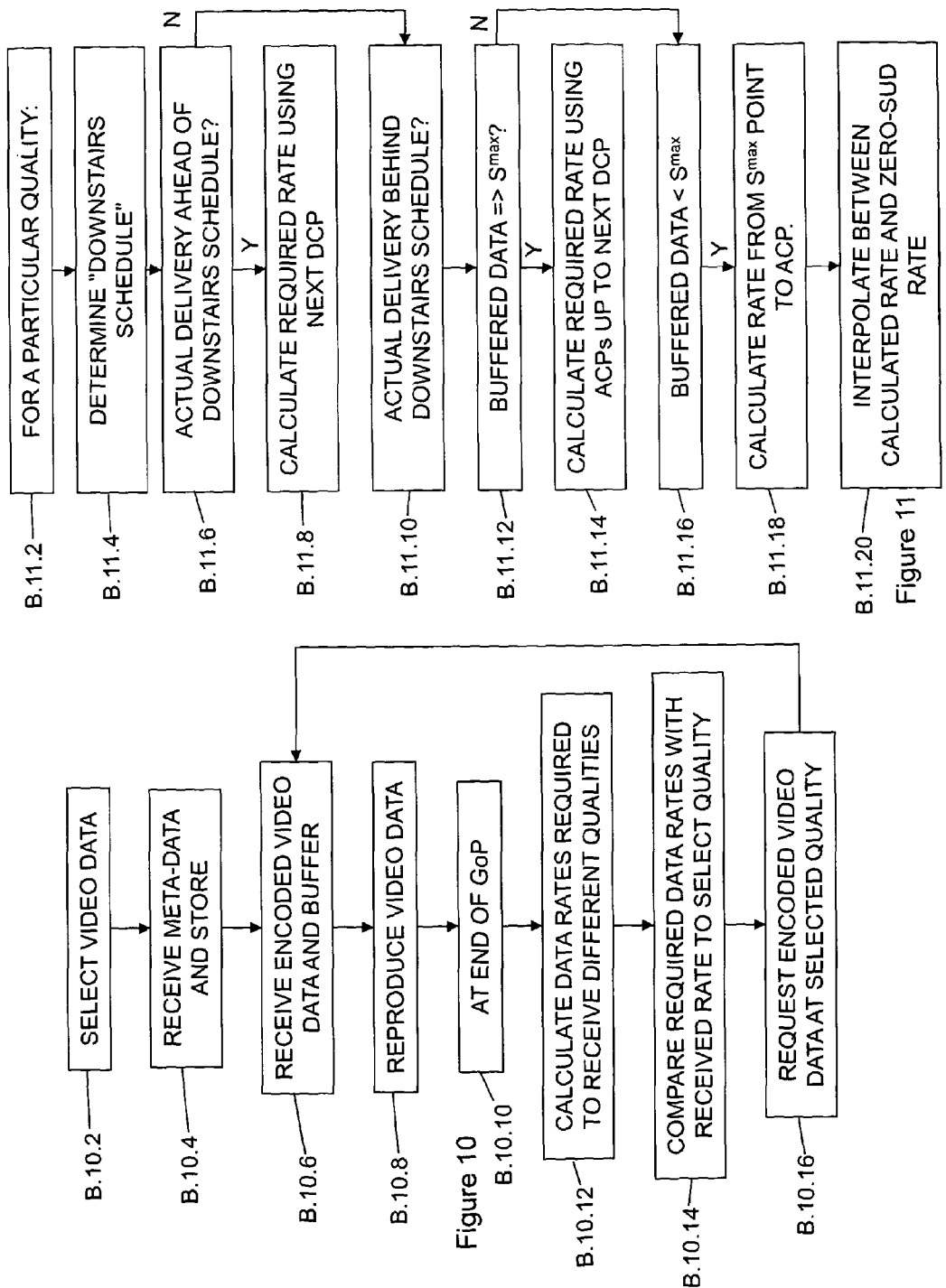

(a)

| Index | GoP | DSR |
|---|---|---|
| 1 | 0 | 373 |
| 2 | 31 | 348 |
| 3 | 32 | 261 |
| ... | 3700 | 95 |

300

(b)

| Index | GoP | CBC Value |
|---|---|---|
| 1 | 0 | -9203 |
| 2 | 17 | 5845695 |
| 3 | 30 | 10743696 |
| ... | | |

302

(c)

| Index | GoP | CBC Value at ACP |
|---|---|---|
| 1 | 31 | 11419768 |
| 2 | 121 | 30191720 |
| 3 | 127 | 31812712 |
| ... | | |

… 
COMPACT CUMULATIVE BIT CURVES

This application is the U.S. national phase of International Application No. PCT/GB2012/000160 filed 16 Feb. 2012 which designated the U.S. and claims priority to EP 11250181.2 filed 16 Feb. 2011, the entire contents of each of which are hereby incorporated by reference.

TECHNICAL FIELD

The present invention relates to a method and system for the determination of a compact representation of a cumulative bit curve. The compact representation may be used in some embodiments for rate determination calculations in a data streaming service.

BACKGROUND TO THE INVENTION

Traditionally a video on demand service, such as that provided commercially in the UK under the trade name BT Vision, is supported by encoding video at a constant bit rate and delivering it over a network at the same constant bit rate. This generally requires bandwidth reservation on the network, which can be expensive to provide. Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate (CBR) encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly.

In order to address the perceived image quality issues with CBR encoded video, variable bit rate (VBR) encoded video can be provided, where the video is encoded at a variable rate so as to provide for substantially constant quality. In this respect, WO 2009/112801, incorporated herein by reference in its entirety for all purposes, describes how video data may be encoded to allow for substantially constant perceived quality on the part of a viewing user. However, due to the variability of instantaneous bit rate of VBR encoded data, delivery of variable bit rate encoded data over a network can itself be problematic, if the network is to deliver the data sufficiently quickly such that all video data is delivered in time for it to be decoded and displayed without interruption. In particular, parts of the VBR encoded data which have a high number of bits per frame, such as action sequences or the like, may lead to high instantaneous data rate requirements which the network is unable to deliver. Such situations may then lead to buffer underflow at the decoding client, and hence interruptions in delivery.

In order to avoid such buffer underflow conditions occurring it is therefore important to control carefully the data transfer rate and video data quality (which itself dictates the amount of data to be delivered) such that quality can be improved where possible, whilst preventing buffer underflow conditions occurring.

Our prior co-pending European patent applications EP10252205.9 (Agent ref: A32153 CALCULATING DELIVERY BIT RATES USING ADDITIONAL CRITICAL POINTS) and EP10252204.2 (Agent Ref: A32154 CALCULATING DELIVERY BIT RATES USING DOWNSTAIRS POINTS) (the contents of both of which being incorporated herein by reference for all purposes) describe techniques for calculating forward delivery rates required for VBR encoded data dependent on received delivery rates and the cumulative bit profile with respect to time of the encoded data file. Herein the cumulative bit profile is referred to as the cumulative bit curve (CBC), and is a monotonically increasing curve, the gradient of which at any time is dependent on the encoding of the original data file. For example, in the case of a video file with a fast moving action sequence, there will be more bits required per Group of Pictures (GoP), and hence the gradient of the cumulative bit curve will be steeper than for a scene which is slow moving, or little changing. In this respect, the cumulative bit curve is not usually a continuous curve, but instead made of discrete data points corresponding to each GoP in a video sequence.

As will be described below, the CBC is required in the calculation of forward delivery rates using the techniques described in the above referenced European patent applications and described further below. However, as will be apparent the techniques require knowledge of the whole CBC at the video client, and hence CBC data needs to be transferred across a network from a video server to a video client prior to the start of streaming of the actual content. At its simplest the data comprises tables of cumulative bit values per GoP for a VBE encoded file, and can be sizable, typically several hundred kilobytes. This can impose a significant network overhead and/or time delay in starting streaming, and hence is undesirable. It would therefore be beneficial if an alternative to having to provide such tables of data could be provided.

SUMMARY OF THE INVENTION

Embodiments of the present invention address the above by providing a compact representation of a cumulative bit curve formed from piecewise straight line approximations between upper and lower bounds about the actual CBC. In one embodiment the lower bounds are found by applying a constraint such that if a delivery rate was to be calculated using the count at the lower bound it would result in a delivery rate which was greater than the delivery rate that would be calculated using the actual CBC data by a particular amount, for example 10%. The actual CBC data is then used as an upper bound. As a result, the approximated CBC will lie for each GoP between the actual CBC value and the lower bound, with the result that one can be certain that any data rate that is calculated using the approximation will be at least as high as a data rate that is calculated using the actual CBC data. In terms of line-fitting algorithms that are used, several different algorithms may be used of differing complexities, with the intention of trying to minimise the number of end-points required within the piecewise approximation.

In view of the above, from one aspect the present invention provides a method of determining a compact representation of a cumulative bit curve, the method comprising: receiving cumulative bit curve data representing the decoding schedule of encoded content to be delivered over a network, the cumulative bit curve data comprising cumulative bit counts with respect to a timebase of the content; for the timebase points in the cumulative bit curve, calculating a respective lower bound point in dependence on a forward delivery rate required to deliver the encoded content over a network such that a delivery schedule is provided which is ahead of the decoding schedule of the content; determining a piecewise approximation to the cumulative bit-curve, the piecewise approximation being such that a value of the approximation corresponding to a timebase point of the content is between the cumulative bit count and the calculated lower bound for the timebase point; and storing data representing the piecewise approximation as the compact representation of the cumulative bit curve.

In one embodiment the lower bound for a timebase point is calculated in dependence on a first delivery rate that is found in dependence on the cumulative bit curve data, and a second delivery rate equal to the product of a coefficient (1+K) and the first delivery rate, where K>0.

More particularly, the lower bound is calculated such that the if the resulting lower bound was used to calculate a forward delivery rate, a rate of (1+K)R would be obtained, where R is a forward delivery rate required by the decoding schedule to prevent buffer underflow at a receiver that reproduces the encoded content, and K>0.

Selecting K to be greater than 0 has the effect that one can be certain that when the approximation of the cumulative bit curve is used during content streaming to calculate a delivery rate, the delivery rate will be at least as high as that which would have been calculated using the actual cumulative bit curve data. In preferred embodiments $0.01 <= K <= 1$, and preferably $0.01 <= K <= 0.2$.

In embodiments of the invention the piecewise approximation is a curve-fit approximation within the bounds of the cumulative bit curve data and the lower bound points. In particular embodiments the piecewise approximation is a piece-wise straight line approximation. A straight-line approximation has the advantage that simple linear interpolation operations can be used to find approximated values between provided line end-points.

In one embodiment the piece-wise approximation is found by starting at a point a predetermined fraction between the cumulative bit count and the lower bound for a first timebase point, and determining the longest straight line that can be drawn that ends at a point with the same predetermined fraction between the cumulative bit count and the lower bound for a second timebase point, and which remains within the cumulative bit counts and lower bounds for all timebase points in between first and second timebase points. The procedure is then iterated with the second timebase point as the first timebase point, until substantially all timebase points in the cumulative bit curve have been processed.

In one version of the above the first timebase point is the earliest timebase point in the encoded content, in which case the straight line approximation is found by working forward through the cumulative bit curve.

In another version the first timebase point is the last timebase point in the encoded content, in which case the straight line approximation is found by working backward through the cumulative bit curve.

In another embodiment the piecewise approximation is found by: i) from a starting point between the cumulative bit count and the calculated lower bound for a timebase point, determining a first longest line that can be drawn from the point within the cumulative bit counts and the lower bounds until one of the cumulative bit count curve and/or the lower bound is intercepted; ii) from points on the first longest line corresponding to timebase points encompassed by the line, determining a respective second longest line that can be drawn from each point within the cumulative bit counts and the lower bounds until one of the cumulative bit count curve and/or the lower bound is intercepted; iii) selecting the respective second longest line which ends at the highest timebase; and iv) iterating the above operations ii) and iii), using the selected second longest line as the first longest line, until substantially all timebase points in the cumulative bit curve have been processed.

From another aspect the present invention also provides a method of determining a data rate required for the delivery of variable bit rate encoded content data over a network, comprising: a) being provided with data representing a decoding schedule of the encoded content data, the data being a compact representation of a cumulative bit curve of the encoded content data obtained from the method of any of the preceding claims; and b) calculating a forward delivery rate required such that a delivery schedule comprising the forward delivery rate is at least equal to the decoding schedule, the calculation being performed in dependence on the compact representation of the cumulative bit curve.

In one embodiment the calculation of a forward delivery rate comprises: being provided with pre-calculated data defining one or more critical points of a first type on the decoding schedule of the encoded content data, the critical points of the first type being points at which, for one or more other points on the decoding schedule and assuming that when delivery occurs from those points a minimum threshold amount of encoded content data is buffered, a constant bit rate delivery schedule calculated for the one or more other points such that buffer underflow does not occur is substantially equal to the decoding schedule; wherein when actual delivery of the encoded content data is behind a piecewise monotonic decreasing constant bit rate delivery schedule required to deliver the encoded content data from the start so that buffer underflow does not occur, and at least the minimum threshold amount of content is buffered, calculating the data rate required for delivery of remaining encoded data in dependence on at least the critical points of the first type.

The above embodiment may further comprise being further provided with pre-calculated data defining one or more critical points of a second type on the decoding schedule of the encoded data at the particular quality level, the critical points of the second type being points at which the piecewise monotonic decreasing constant bit rate delivery schedule is equal to the decoding schedule, wherein the calculating the data rate further comprises; calculating a respective data rate for each critical point of the first type on the decoding schedule between the present delivery point and the next critical point of the second type; and selecting the maximum calculated data rate as the data rate for the particular quality.

In another embodiment the calculation of a forward delivery rate comprises: being provided with pre-calculated data defining one or more critical points on a decoding schedule of the encoded data, the critical points being points at which a piecewise monotonic decreasing constant bit rate delivery schedule required to deliver the encoded content data so that buffer underflow does not occur is equal to the decoding schedule; and when actual delivery of the encoded content data is ahead of the constant bit rate delivery schedule, calculating the data rate required for delivery of remaining encoded data in dependence on at least the critical points on the decoding schedule.

Within the above embodiment the calculation of the data rate may comprise: determining a latest timepoint Tr in the set of encoded content data at which already delivered bits will be decoded; determining a cumulative bit count Bd for the particular quality level at the latest time Tr; determining the present timepoint Ta in the set of encoded content data corresponding to the data just decoded; determining the required data rate as the ratio of the difference between the cumulative bit count Bdcp of the critical point and the cumulative bit count Bd at the latest time Tr, and the difference between the time Tdcp of the critical point and the present timepoint Ta.

In addition to the above, from other aspects the present invention also provides corresponding systems that perform the above described methods, as well as one or more computer programs that when executed by one or more computers perform the above described methods. Also provided are one or more computer readable media storing such computer programs.

BRIEF DESCRIPTION OF THE DRAWINGS

Further features and advantages of the present invention will become apparent from the following description of an embodiment thereof, presented by way of example only, with reference to the accompanying drawings, wherein like reference numerals refer to like parts, and wherein:

FIG. 3 is a set of tables of pre-calculated meta-data;

FIG. 10 is a flow diagram of the operation of the client device in an embodiment of the invention;

FIG. 11 is a flow diagram illustrating the processing performed to calculate data rates in an embodiment of the invention;

FIG. 31(a)-(c) show tables of meta-data provided in an embodiment of the invention;

DESCRIPTION OF THE EMBODIMENTS

Embodiments of the present invention are directed at finding a compact rate-constrained representation of a cumulative bit curve, and also to using such a compact rate constrained representation in rate calculation algorithms. We will therefore describe in due course how the compact rate-constrained representation of a CBC can be found per se, but prior to so doing we first describe how a required data transfer rate can be calculated for a particular encoded video file (or other "chunk" or set of video data), using a CBC. This is necessary so it can be understood what a CBC is, and how it may be used, so it may then be better understood how a compact representation thereof may be found and used.

Overview, and Operating Environment for Data Transfer Rate Determination

In one embodiment of the invention to be described and which makes use of a CBC we model the network as one or more network based video servers connected to one or more video receivers over a shared network. Multiple pieces of video content are encoded at a number of constant quality levels and stored on one or more of the network based servers. In response to requests from users, video content is selected on a server and delivered over the shared network to the user. The system selects the quality level to deliver based on the video content currently being delivered, the amount of video data already buffered at the video receiver, and the available network throughput. One of the aims of the embodiment is to adapt the quality of video delivered according to the available network throughput so as maximise the quality of video delivered while ensuring that all video data is delivered over the network in time for it to be decoded and displayed without interruption.

As background to the understanding of the embodiment, a video sequence that has been encoded at variable bit rate can be delivered over a network at piecewise constant bit rate, with the rate of each piece decreasing monotonically. The resulting bit rate profile is referred to herein as a "downstairs" function. Our international patent application (Ghanbari and Sun), published as WO2004/047455, describes one method of analysing a video sequence that has been encoded at variable bit rate to determine a video delivery schedule for that sequence consisting of one or more contiguous periods of constant bit rate delivery in which the rates are monotonically decreasing.

Figure 4:
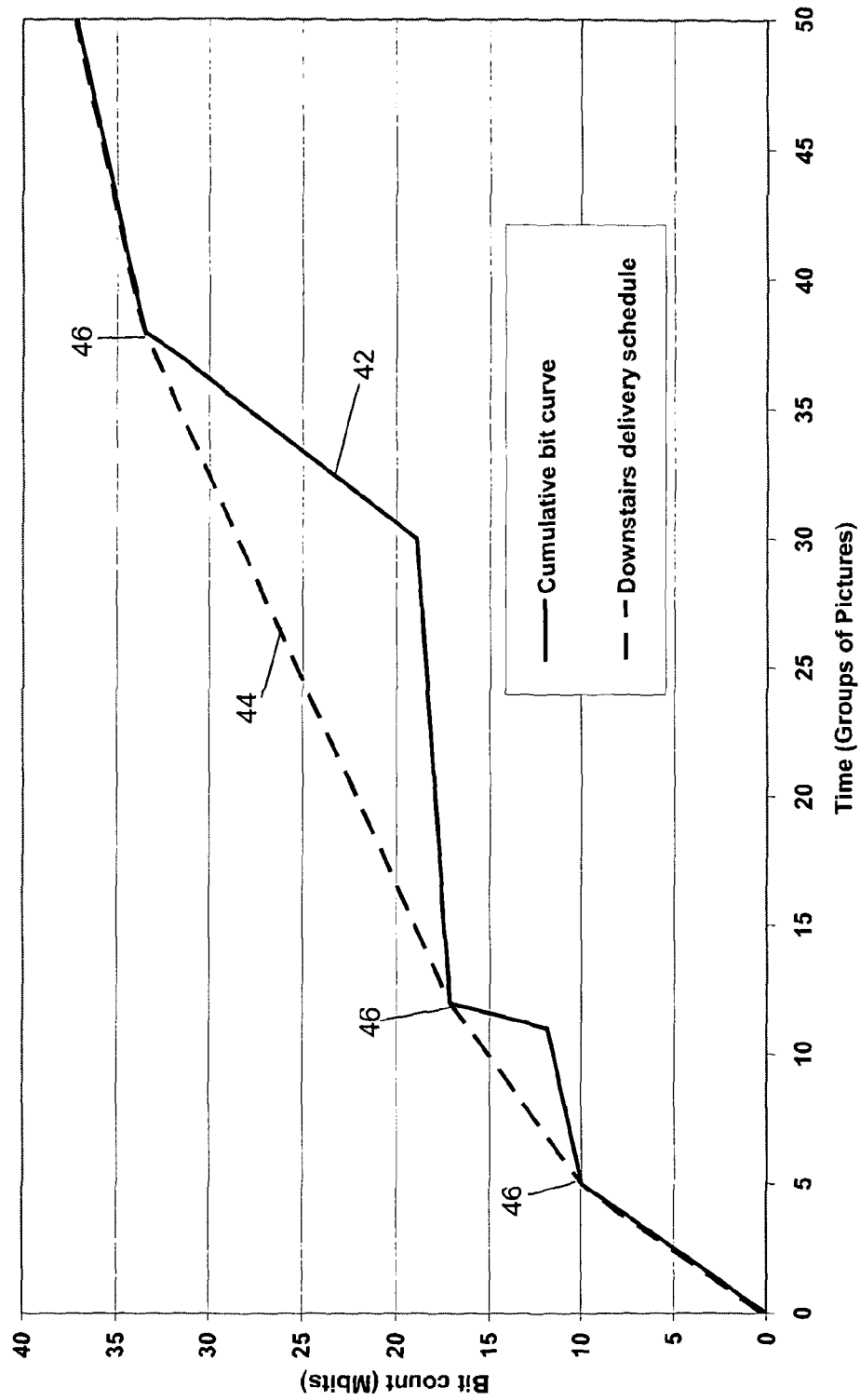
FIG. 4 is a graph of a cumulative bit curve.

An alternative visualisation is described in our international patent application WO2010/067050, where the cumulative number of bits in the encoded video sequence is plotted against time. An example of such a cumulative bit curve (also referred to herein as the decoding schedule) is shown in FIG. 4. This is simply a plot of the total number of bits in the coded video sequence to date against time. The "downstairs" delivery rate required for initial delivery of this stream is the slope of the line of lowest slope that passes through the origin and is never to the right of the cumulative bit profile, that is, ensuring all bits are delivered before they are needed for decoding. Such a delivery line (or delivery schedule) will touch the cumulative bit curve in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this lower rate. These points where the delivery rate just touches the cumulative bit curve, and then changes rate (typically decreasing) are referred to as "Downstairs Critical Points" (DCPs), and are shown as points 46 in FIG. 4. In addition, in FIG. 4 the cumulative bit curve is shown as solid line 42, and the resulting downstairs delivery schedule as dashed line 44. Note that as the delivery rates are shown as straight lines, then they are constant delivery rates between each DCP.

Video that is encoded at constant bit rate will have a cumulative bit curve near to a straight line. Video that is not coded at constant bit rate, for example, video coded with constant quantisation index or with constant perceptual quality will have a cumulative bit curve that in general will not be a straight line. Such video could be transmitted over a network with a delivery schedule similar to the cumulative bit curve, and thus require little buffering in the receiver, or, with unlimited buffering in the receiver, could be delivered with any delivery schedule subject to every bit being received before it is needed for decoding. When plotted on a graph, with time along the horizontal axis and cumulative bits on the vertical axis, this requirement can be expressed as the delivery schedule must never be to the right of the cumulative bit curve. When there is unlimited buffering at the receiver, it is always possible to deliver any bitstream using constant bit rate delivery at any constant rate: it is just necessary to ensure decoding is delayed sufficiently to keep the delivery schedule to the left of the cumulative bit curve. In the extreme case, the whole of the video sequence could be delivered very slowly and decoding started only as the delivery is about to finish.

In the examples considered here, we consider discrete "chunks" each comprising one or more frames. The choice of chunks is subject to the consideration that, in order to keep to a minimum any interdependence of quality between chunks, a chunk can be one or more frames coded independently of any other chunk, typically starting with an I-frame (one coded without prediction from any other frame). In the examples here, the chunk chosen was a group of pictures (GOP) of IBBP format and all the plots shown are of cumulative bits per group of pictures, $\Sigma^b$, where b is the number of bits in a group of pictures, plotted against group of pictures index.

In the streaming system envisioned, each video sequence is encoded multiple times, each time with a different level of perceptual quality. As mentioned, encoding at fixed levels of perceptual quality level is preferably performed as described in our co-pending International patent application no. WO 2009/112801. However other methods of encoding could also be used, such as coding with constant quantisation index.

We also assume in the embodiment that the client device has sufficient buffering to be able to store a whole video stream. This allows the timing of delivery of the video data to be decoupled from the decoding of it, provided we ensure data is delivered before it is needed for decoding.

The delivery bit rate required to deliver a video stream in timely fashion depends on how much data is already buffered at the client, and the bit rate profile of the bits yet to be decoded i.e. the CBC. By analyzing the video stream prior to delivery, and by monitoring the amount of data buffered at the client, we can determine, for each possible quality level that could be delivered, the bit rate required for timely delivery, as will be described later.

The operating environment of the present embodiment will next be described with respect to FIGS. 1 and 2.

Figure 1:
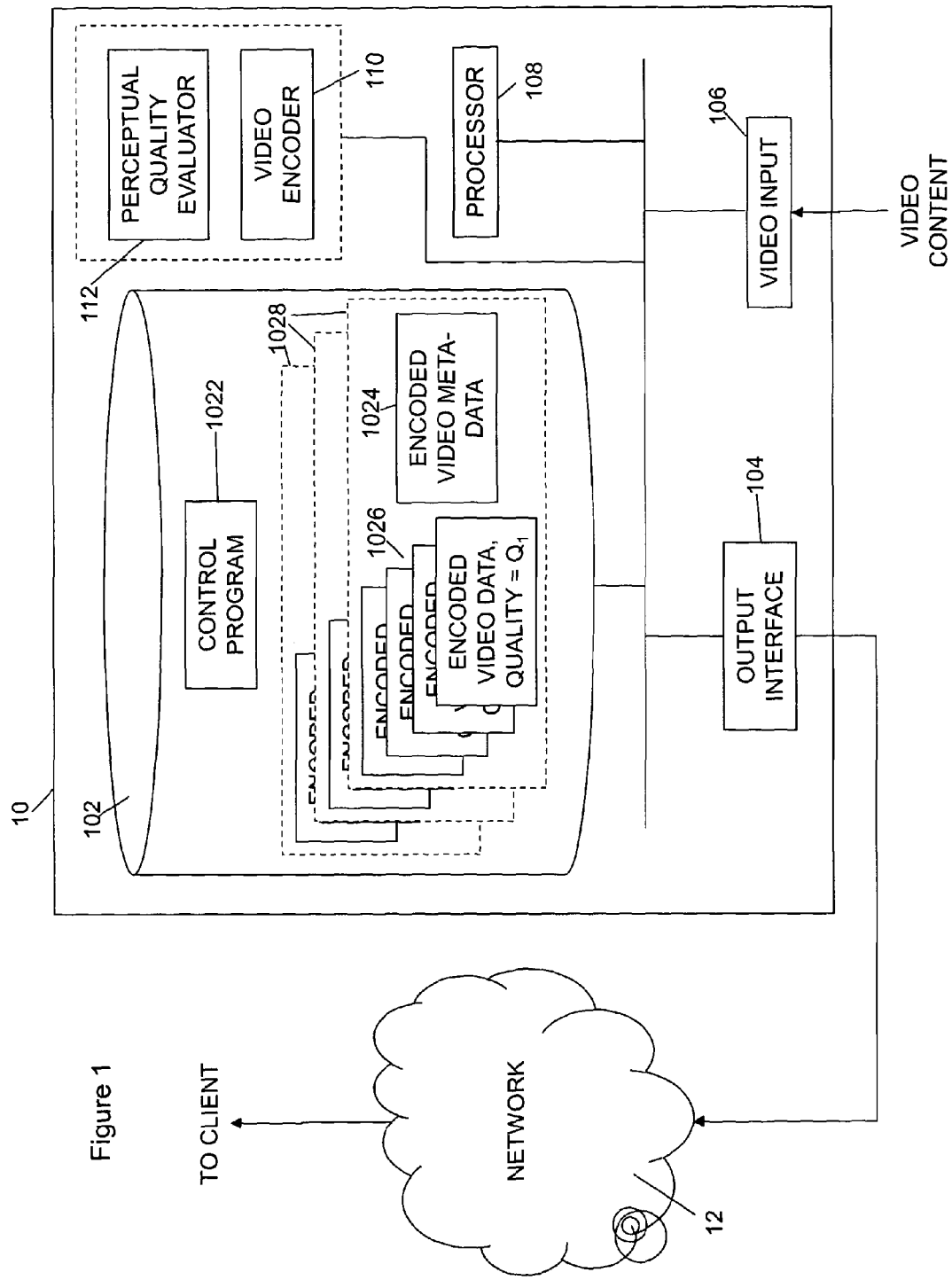
FIG. 1 is a block diagram of a video content server of an embodiment.

More particularly, FIG. 1 illustrates a video content server 10, which is arranged to supply encoded video data to a client for reproduction, via a network 12. The video content server 10 comprises a processor 108, arranged to control a video content server, and to perform any processing required. An input interface, in the form of video input 106 is provided, at which unencoded video content can be input. An output interface 104 is provided, at which encoded video output can be streamed over network 12 to the client. Additionally included is a video encoder 110, and a perceptual quality evaluator 112. The video encoder 110 encodes unencoded video data passed to it, according to at least one known video encoding standard. For example, the video encoder 110 may encode video in accordance with the ITU-T H.264 video coding standard. In addition, the video coder 110 is able to encode video at different qualities, under the command of the perceptual quality evaluator 112. That is, during encoding the perceptual quality evaluator 112 controls the video encoder 110 so that the perceived quality of the encoded video is substantially constant, as described previously.

Video content server 10 also includes a computer readable storage medium 102, such as a hard disk drive, or the like. For example, computer storage medium 102 may be an array of hard disk drives, where significant levels of storage are required. The computer readable storage medium 102 stores a control program 1022 which is run by the processor 108 so as to control the overall operation of video content server, to provide the functions to be described. Also stored on computer readable storage medium 102 are sets of encoded video data 1028, each representing an item of video content, for example an individual movie, television program, music video, or the like. Each set of encoded video data 1028 comprises multiple encoded versions of the video data 1026, each encoded version being of different video data quality. As shown in FIG. 1 four different quality versions of the encoded video data may be produced, but this is by way of illustration only, and in other embodiments a larger or smaller number of different qualities of encoded video data may be produced, in some embodiments as many as nine. Each set of encoded video data also includes encoded video meta data 1024, containing various pre-calculated data regarding each different quality encoded bit stream. Further details of encoded video meta data 1024 will be described later with respect to FIG. 3.

Figure 2:
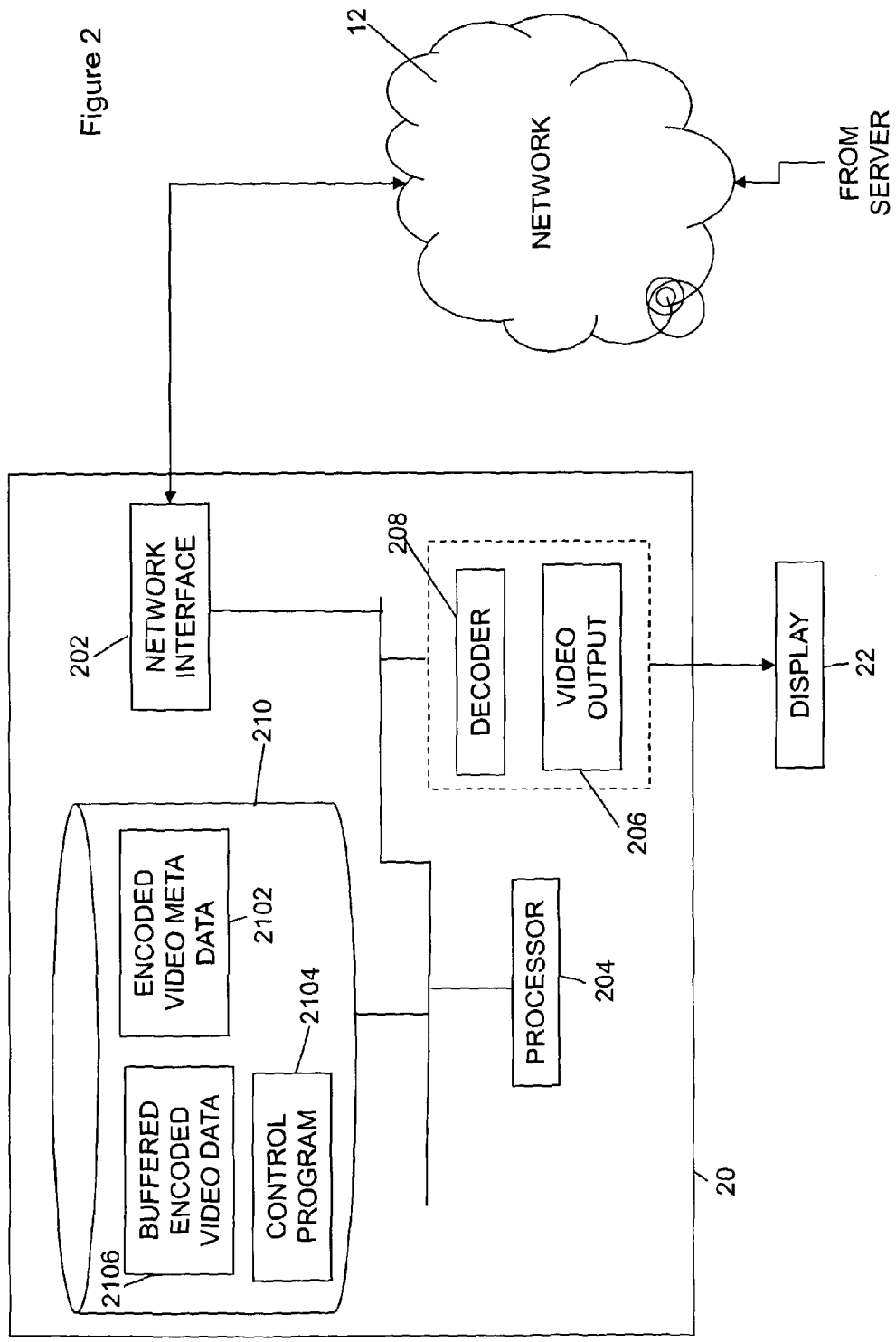
FIG. 2 is a block diagram of a client device of an embodiment.

FIG. 2 illustrates an example client, being a consumer of the encoded video data. In particular, client device 20 comprises a processor 204, and computer readable storage medium 210. Client device 20 also comprises network interface 202, which is able to receive data from and transmit data to network 12. Therefore, network interface 202 receives streamed encoded video data over the network 12 from the video content server 10. Client device 20 also comprises video content decoder 208, which is able to decode encoded content, and provide a video signal to a video output 206, which can then be used to drive a display 22. Display 22 may be integrated with the client device 20, or may, for example, be separate. It will be understood that the client device 20 may be many different types of device, such as, for example, a personal computer, a tablet computer, an Internet enabled television, a smart phone, a portable AV player, or the like.

Computer readable storage medium 210, which may, for example, be a hard disk drive, flash drive, or other solid state storage, stores a control program 2104, which controls the operation of the processor 204 to provide the functions to be described. Also stored on computer readable storage medium 210 is buffered encoded video data 2106, which is video data which has been received via the network interface 202, and stored on the computer readable storage medium 210 before it is required by the decoder 208 for decoding, and output as a video signal to drive display 22. In addition, computer readable storage medium 210 also stores encoded video meta data 2102, which is the video meta data relating to the present set of video data that is being received and reproduced by the client device 20, and which has been streamed from the server. Typically, within the embodiment the encoded video meta data 2102 is provided to the client as a first download from the video content server, when the client requests access to particular video content. The video meta data is then stored, and is used in subsequent delivery rate calculations, as will be described.

The content of the encoded video meta data for a particular video file in the present example is shown in FIG. 3. In particular, video meta data 1024 or 2102 (when downloaded to the client device) comprises in this example two tables of data 30 and 32. In particular, table 30 contains entries for sets of video data encoded at different qualities. Therefore, as will be seen, there is a set of pre-calculated data for the encoded video data of quality Q1, Q2, Q3, etc. etc. For a particular quality level pre-calculated data is included for each time base point, in this case measured by group of picture (GoP) index, of the encoded video data. Thus, as will be seen, the actual decoding schedule in the form of the cumulative bit curve is represented, as a series of cumulative bit totals, taken at the end of each GoP. It should be noted, however, that providing a complete table of CBC data to a client as the encoded video meta data in advance is one of the issues that embodiments of the invention address, as will be described, by the provision of a compact representation of this CBC data, rather than provision in table form as described here. However, for the purpose of clarity of description of the operation of the rate determination techniques, the CBC data can be considered for the time being as a table of cumulative bit totals, indexed by GoP, as described.

In addition, a second value, which is a delivery rate value, referred to as the zero start up delivery rate (O-SUD) is included. This is the delivery rate that is required moving forwards in the decoding schedule from the particular GoP against which a particular rate is indexed if no data is buffered, and no start-up delay is to be experienced. Thus, it follows that, that for higher quality levels, where more bits need to be delivered, the zero start up delay delivery rate for the same GoP, will usually be higher (although it does depend on the particular encoding). Likewise, the cumulative bit count at a particular GoP for increasing quality levels, will also increase.

In addition, the meta data also includes a second table 32, which indicates where in the decoding schedule the downstairs critical points occur. Hence, table 32 contains an index to downstairs critical points (DCP), against the GoP numbers at which they occur. In addition, table 32 also contains where in the decoding schedule (GoP number) so-called "additional critical points" (ACPs) occur. These are additional points that are pre-calculated and are used to determine rates locally for GoPs, and in particular when the actual delivery schedule has been behind that defined by the downstairs delivery schedule. Further details of the ACPs and how they are used in the present embodiment will be given later. In this example a separate table is included for each quality Q1, Q2, etc.

It should be noted that the specific numbers given in tables 30 and 32 of FIG. 3 are purely by way of example only and should not be taken as indicative of actual values that may be obtained for a particular video file.

It will be appreciated that the specific values included in tables 30 and 32 of the meta data 1024 are specific to each set of video data 1028 that is encoded at different quality levels. Hence, when the client device 20 requests a new video file to be streamed to it, the specific encoded video meta data 1024 for that video file must be provided to the client device, and stored thereat, so that the client device can determine particular delivery rates required whilst the video content is being streamed to it. Likewise, in embodiments of the invention, a separate compact representation of the CBC must provided for each different encoded video file (and for each different quality version of the same file).

Having described the general system architectural overview of the embodiment of the invention, FIG. 10 illustrates the overall operation of the client device 20. In the embodiment, the client device 20 operates under the control of control program 2104, to allow a user to select a particular video program to be delivered from the video content server, for display. Once the user has selected the program, the client device 20 then controls the download and display of the content as will be described.

More particularly, at block 10.2 the client device 20, under the control of the user, selects a particular video data set 1028, such as a movie, or the like, to be downloaded from the video content server 10. That is, the processor 204 controls the network interface 202 to send a request to the video content server 10 in order to start streaming the requested video file to it. The request is received at output interface 104, and the processor 108 then causes the video content server 10 to download the encoded video meta data file 1024 for the requested video file to the client device. Therefore, at block 10.4, the client device 20 receives the encoded video meta data at the network interface 202, and stores it as encoded video meta data 2102, on the computer readable storage medium 210. The video content server 10 then starts to stream the encoded video data 1026 via the output interface 104 over the network 12 to the network interface 202 of the client device 20. A particular start up quality may be provided, or an arbitrary quality may be provided, such as, for example, the lowest quality, or the medium quality. Alternatively, the client device may have monitored the network delivery rate of the encoded video meta data 2102, and based on this data rate, and the data in the encoded video meta data, had determined which quality may be supported by the received data rate at which the encoded video meta data 2102 was delivered, using the techniques for delivery rate calculation, to be described. The client device 20 may then request the video content server 10 to initially provide video content data at the quality determined to be supported by the data rate.

Whichever quality is first provided, at block 10.6 the client device receives the encoded video data and passes the encoded video data to the decoder 208, which starts to consume the video data at the rate of the decoding schedule for the particular quality of the video data that is being delivered. Any excess data that is not required for immediate consumption is stored as buffered encoded video data 2106 on the computer readable storage medium 210, and is retrieved from the buffer 2106 via the decoder as required. It therefore follows that if the encoded video data is being delivered faster than the decoding schedule, then more and more data will be buffered in the buffer 2106. If, however, the encoded video data is being delivered at a rate less than the decoding schedule requires, then the buffer may underflow, and decoding and reproduction may temporarily halt. The decoder 208 reproduces the video data at block 10.8, and the reproduced video data is then output from video output 206, to display 22 for reproduction.

From time to time, the client device 20 should evaluate the delivery rate that it is actually receiving, in order to determine whether in fact a higher quality of video can be supported by the delivery rate, or whether quality needs to change to, for example, a lower quality. In the present example this is performed at the end of reproduction of every group of pictures, as shown at block 10.10. That is, at the end of each group of pictures (typically 24 frames or the like) the client device 20 makes use of the pre-calculated data in the encoded video meta data 2102, together with a measure of how much data is buffered, and the delivery rate that it has already seen, to calculate data rates that would be required from that point in time to receive the different available qualities of encoded video available. This is performed at block 10.12, and further details of how these calculations are performed will be described below. The output at block 10.12, however, is, for each quality that is available, a data rate that is required for delivery of that quality. These data rates can then be compared at block 10.14, with the rate that the client device has already been seeing, and a particular quality selected. For example, if the data rate that has been received so far is high enough to support a higher quality video, then that quality is selected, and then subsequently requested at block 10.16. In one example, the quality which most closely matches the viewed throughput is selected, with the proviso that the rate required for that quality must be less than the viewed delivery rate. Other factors, such as the amount of data buffered at the client, may also be taken into account when making the decision of which quality of video to transmit next. For example, it may be decided not to switch to a higher quality if less than a threshold of data, such as that which would take five seconds to display, were buffered at the client, or it may be decided to switch to a lower quality if a lesser threshold of data were buffered, regardless of how the expected network throughput compares to the delivery rate required for each quality of video encoding.

Howsoever the next quality is selected compared to the data rates, as noted at block 10.16 the client then requests the video content server 10 to supply encoded video data at the selected quality.

As noted, this procedure of data rate calculation, and quality selection can repeat as often as required, and in the particular example can be repeated as often as every group of pictures, as it is possible to change between the different encodings at the start of any group of pictures.

We have thus presented a general architectural level overview of the present example embodiment, including the system components, and their operation. Next we describe the specifics of how the particular data rates are calculated in block 10.12. Two different methods are generally used in the embodiments, depending on whether delivery has been ahead of the downstairs delivery schedule, calculated using the downstairs critical points, or whether it has been slower than the schedule given by those points.

Figure 5:
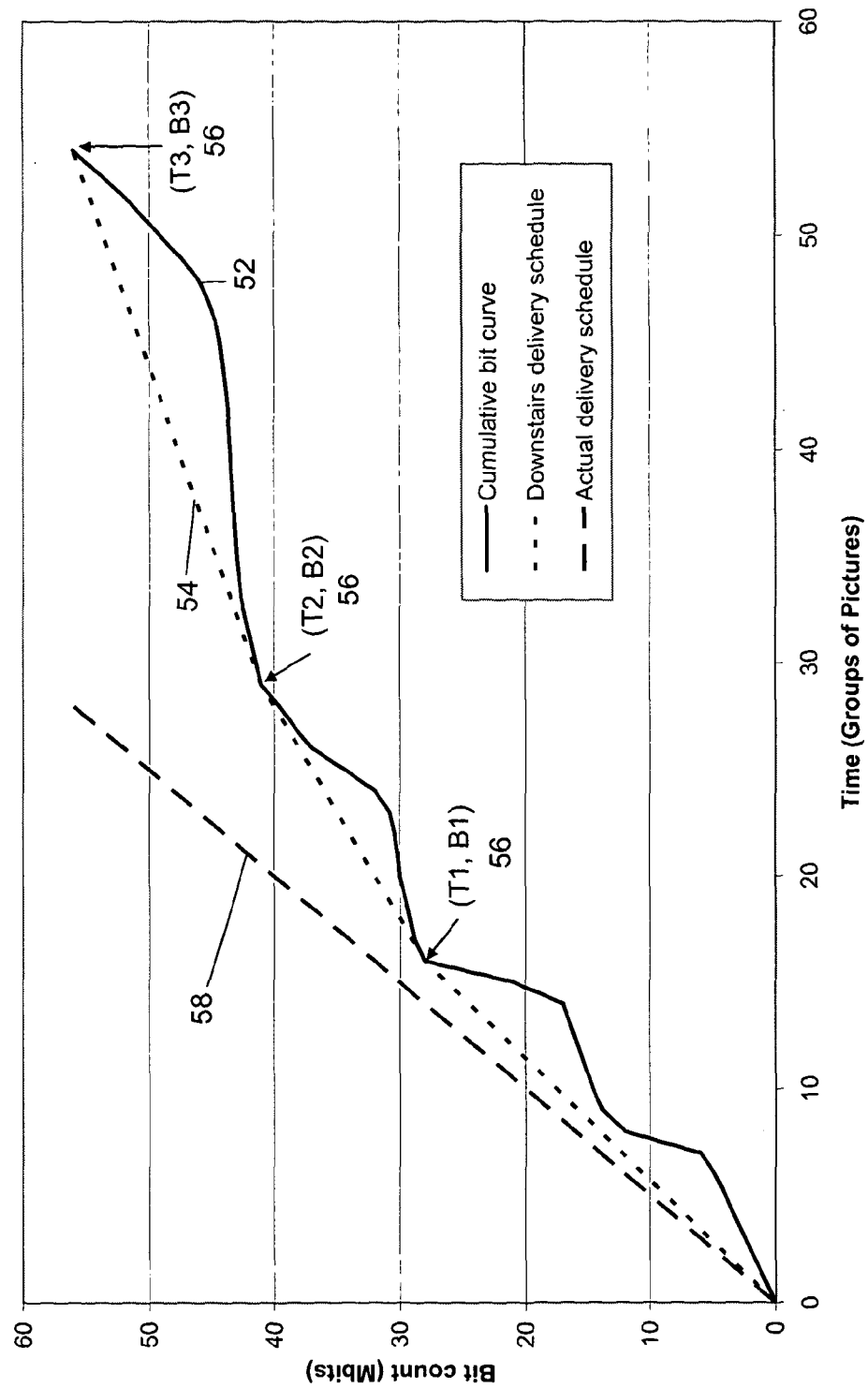
FIG. 5 is a graph of a cumulative bit curve.

Delivery Rate Calculation when Delivery is Ahead of the Downstairs Delivery Schedule Similar to FIG. 4, FIG. 5 shows a cumulative bit curve 52 for a video sequence encoded at variable bit rate and its piecewise constant, monotonic decreasing, delivery schedule, referred to as the "downstairs delivery schedule" 54. But it also shows a delivery schedule 58 for constant bit rate delivery at a rate faster than necessary for timely delivery. As discussed previously, at 8.10.12 after delivery of each group of pictures, we calculate the required delivery rate for timely delivery of the next and all subsequent groups of pictures. In the present case, this requires knowledge of the "downstairs delivery schedule" across the cumulative bit curve, which is readily obtained from the meta data 2102, and in particular using the data in table 32 relating to DCP position in the GoP sequence, and the cumulative bit counts for those GoPs identified as DCPs. The DCPs are shown in FIG. 5 as points 56. For example, the downstairs delivery rate between start-up and the first DCP is the ratio of the cumulative bit count ("CBC") at the DCP to the time at the DCP. Likewise, the rate between the first DCP and the second DCP is the ratio of the CBC difference between the first and second DCPs, and the time difference between the first and second DCPs.

Having determined the downstairs delivery schedule (or been provided with it), and knowing that it has been exceeded, in the present example then instead of using the other pre-calculated data in the meta-data, we observe that it is possible to calculate the required delivery rate simply by calculating the rate required to intercept with the "downstairs delivery schedule" at the points at which its slope changes, i.e. at the "critical points". By then selecting the maximum of these rates as the required delivery rate, the delivery rate can be determined. We proceed as follows, with reference to FIG. 5.

Let the actual delivery rate be D bits per group of pictures period. Let the time be t, also measured in group of pictures periods. Let the critical points be (T1, B1), (T2, B2) and (T3, B3) with T1, T2, and T3 being the times of the critical points, and B1, B2 and B3 being the number of bits that need to be delivered by those times. At time t, D times t bits would have been delivered. The rates R1, R2, and R3, required to deliver sufficient bits to satisfy each critical point are given by Equation 1.

$$R1 = \frac{B1 - D \cdot t}{T1 - t} \quad [1]$$

$$R2 = \frac{B2 - D \cdot t}{T2 - t}$$

$$R3 = \frac{B3 - D \cdot t}{T3 - t}$$

where t<=T1<=T2<=T3.

The required delivery rate, R, is then calculated as the maximum of these rates R1, R2, and R3, as given by Equation 2.

$$R = \text{Max}\{R1, R2, R3\}$$

Clearly from a visual representation, such as FIG. 5, when t=0, the most critical point will be (T1, B1) and the required delivery rate will be R1. But at some subsequent time, (T2, B2) will become the most critical point, and the required delivery rate will be R2. We can determine this time by setting R1=R2 in Equation 1, and by re-arranging it to find t, as in Equation 3.

$$t = \frac{B2 \cdot T1 - B1 \cdot T2}{B2 - B1 - (T2 - T1) \cdot D} \quad [3]$$

In the case of FIG. 5, this happens at t=12. And by substituting this expression for t into Equation 1 for R1 (or for R2, as at this time they are equal), we get Equation 4

$$R1 = R2 = \frac{B2 - B1}{T2 - T1} \quad [4]$$

This delivery rate is the same as the downstairs rate for delivery between time T1 and time T2.

Figure 6:
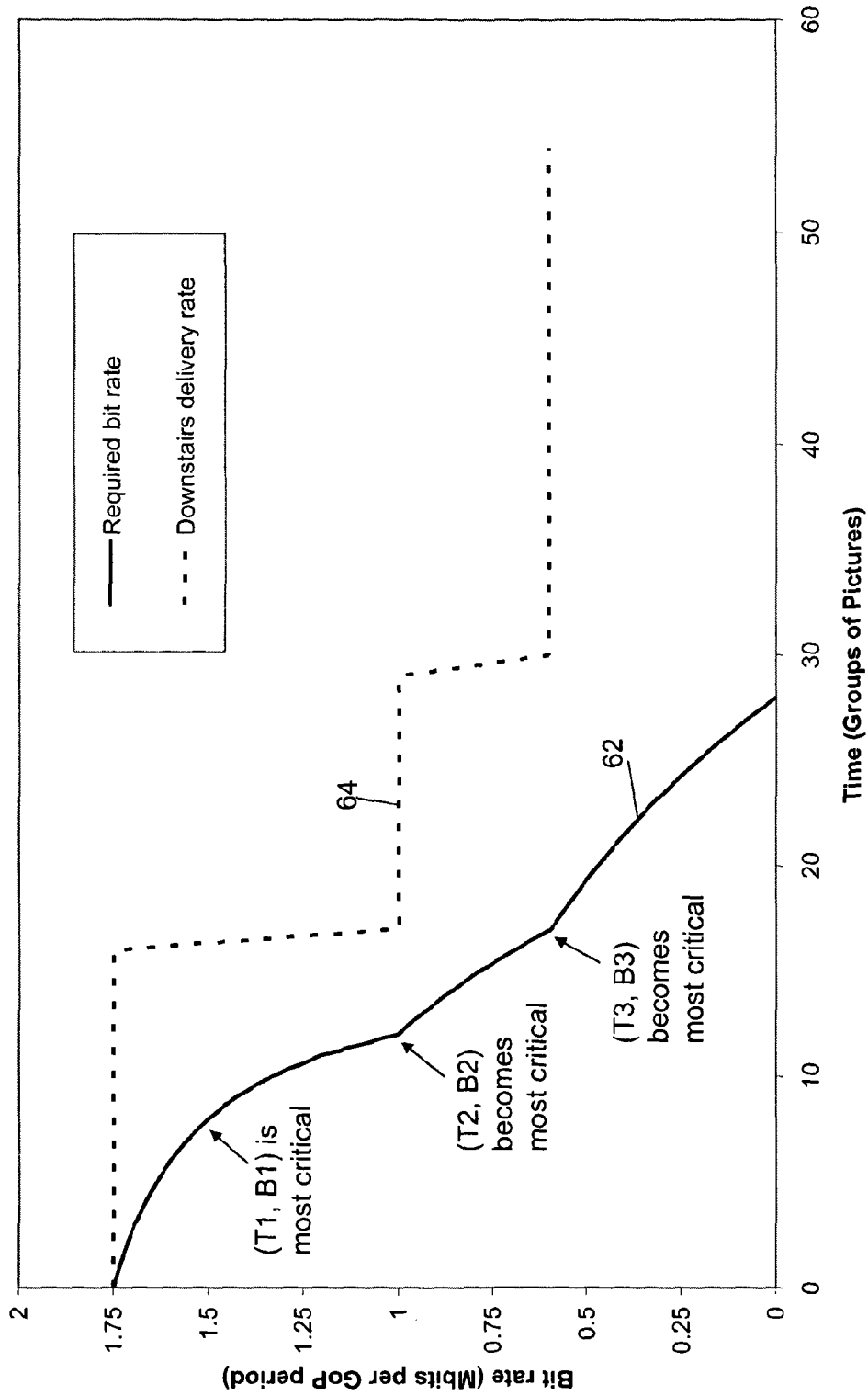
FIG. 6 is a graph of a plot of required bit rates calculated in an embodiment of the invention.

FIG. 6 shows how the required delivery bit rate 62 varies with time for the scenario of FIG. 5, showing that as more bits are delivered, the required delivery rate is determined by each of the critical points in turn, and at each transition, the required delivery rate is equal to the "downstairs" delivery rate 64 associated with the newly most critical point.

Hence if delivery is ahead of the "downstairs delivery schedule", that is, if at the current time, more data has been delivered than required by that schedule, then not only can the required rate be calculated from just the critical points, but also it is not necessary to check all of the critical points. On a first calculation, the rates required by each critical point, starting with the one with lowest bit count greater than the currently delivered number of bits, are calculated, iterating until a calculated rate is lower than the immediately previous one. On subsequent calculations it is only necessary to check this same critical point, and then only in the case that the calculated required rate is lower than the "downstairs" rate associated with the next critical point is it necessary to calculate the rate required by that next critical point.

With the above in mind, FIG. 11 illustrates in more detail the actions performed during B.10.12. The first point to note is that the client device 20 calculates rates required for each available video quality, and hence the above is performed for each quality (B.11.2). Once a particular rate is being determined for a particular quality, the downstairs schedule is first determined at B.11.4, either from being calculated as described, or looked up from a previous calculation thereof. At B.11.6 an evaluation as to whether the received rate so far has been such that delivery is ahead of the downstairs delivery schedule. If so, then this will mean that data will be buffered in buffer 2106, and that the rate required going forward will typically be less than that delivered so far, as shown in FIG. 6, where the required forward delivery rate decreases as more and more data is delivered and buffered.

If the delivery is ahead of the downstairs delivery schedule, then at B.11.8 the above noted procedure is performed to calculate the forward delivery rate, using the DCP data, and the CBC data. That is, the rest of the pre-calculated meta-data does not need to be used to calculate the forward delivery rates for each quality, when the historical delivery rate is ahead of the downstairs delivery schedule. Instead, in such a case, only the downstairs critical points are required, and the cumulative bit curve information. Thus, if the network were always able to deliver at at least the downstairs delivery schedule (or greater), then the only meta data that would be required would be the DCP information, comprising time index for each DCP, and the CBC data.

Figure 7:
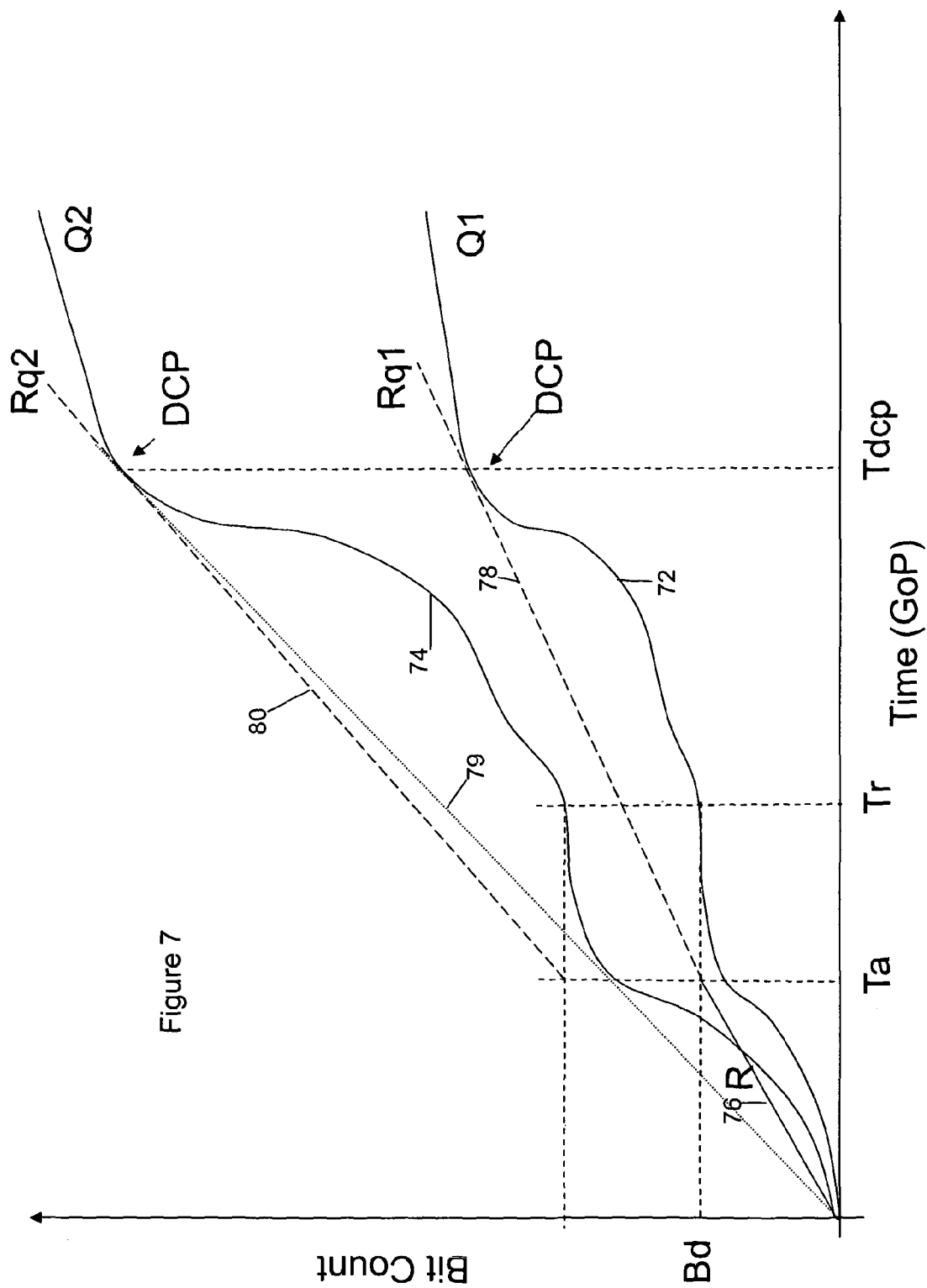
FIG. 7 is a plot of two cumulative bit curves used to illustrate the operation of an embodiment of the invention.

FIG. 7 illustrates an example of the calculation of data rates in accordance with the above for two different qualities. In FIG. 7, assume that encoded video data is being delivered at rate R, shown by line 76, and the encoded data is encoded at quality Q1, such that it has decoding schedule 72. The decoding schedule has a single downstairs critical point (DCP). In addition, in this example the video is also available from video content server 10 at quality Q2, which has decoding schedule 74. Decoding schedule 74 also has a single DCP, which is shown at the same time position Tdcp as the DCP of schedule 72 of Q1, although in other examples it could be at a different time position (and likewise there may be more than one such point). Delivery of Q1 data started at time 0, at rate R, and the present time is time Ta, which we know from the decoder 208, in terms of how many GoPs have been decoded. However, because rate R is greater than the downstairs schedule (not shown) for Q1 encoded data, Bd bits have been delivered. With the decoding schedule 72 of Q1, this means that there are bits in the buffer equal to Tr−Ta GoPs (as Bd bits on the decoding schedule is at Tr GoPs).

The effect of having bits in the buffer is essentially to "buy" time which can then be used in the calculation of the delivery rate required going forward, in that during the time the data in the buffer is being reproduced, the next data to be reproduced after the data in the buffer can be being downloaded. This is important to remember during a switch in quality, for example. In FIG. 7, imagine at point Ta quality was to be switched from Q1 to Q2. However, there are already Tr−Ta units of time worth of bits in the buffer of quality Q1. As there is no point downloading these again they may as well be reproduced at quality Q1, with that amount of time then being used to help download the bits of GoPs at Q2 to be displayed from time Tr.

With the above in mind, to determine the forward rate Rq1 required for continued delivery at quality Q1, a rate is obtained that is the ratio of the bit count at the next DCP of schedule 72 minus Bd bits already delivered, and the time difference between the time of the DCP, and the present time Ta.

However, to calculate the forward rate required for Q2 is slightly more involved, as it is necessary to know how many bits would need to have been decoded at time Tr, from the decoding schedule 74 of Q2, even though no Q2 bits have so far been downloaded and decoded. Whilst the amount of time from the present time Ta to the next DCP of Q2 can be calculated very easily from the DCP data, it is necessary to know how many bits need to be downloaded in that time in order to calculate the required data rate. However, we know that we have sufficient bits in the buffer to reproduce at Q1 until time Tr, and hence there is no point downloading bits from before time Tr of Q2. The number of bits of Q2 that would have been decoded at Tr therefore needs to be subtracted from the CBC at the DCP of Q2, to provide the number of bits that need to be downloaded. The delivery rate is therefore given by the ratio of the cumulative bit count at the DCP of Q2 minus the cumulative bit count of Q2 at Tr, against the amount of time between the present time Ta and the time of the DCP of Q2 i.e. Tdcp-Ta on FIG. 7.

It should be noticed that at the current delivery point for Q2 (i.e. the left end of line 80 at Ta) delivery is ahead of the downstairs delivery schedule for Q2, shown by dotted line 79. Thus, had data from Q2 been delivered, delivery to get to the current delivery point of Q2 would have had to have been at a greater rate than that determined by the downstairs delivery schedule for Q2. What is important as far as Q2 is concerned is not therefore the actual delivery rate R that has been received (delivering data from Q1), but that delivery has been at such a rate that, as far as Q2 is concerned (in addition to Q1), delivery is ahead of the downstairs delivery schedule for Q2.

As shown in FIG. 7, forward delivery rate Rq1 is found for Q1, and forward delivery rate Rq2 for Q2. Comparing these rates to historical rate R, it will be seen that Rq1<R<Rq2, and hence R is not sufficient to support the delivery rate required for Q2, but is sufficient to support continued delivery of Q1. Hence, in this example content of quality Q1 is selected for continued delivery.

Delivery Rate Calculation when Delivery is not Ahead of the Downstairs Delivery Schedule While the above is a simple technique, it is limited in its application, as it is restricted to the case of being ahead of the "downstairs delivery schedule". In reality this may not be the case, and hence we will now show how a similar technique can be used in some cases when behind the "downstairs delivery schedule".

Figure 8:
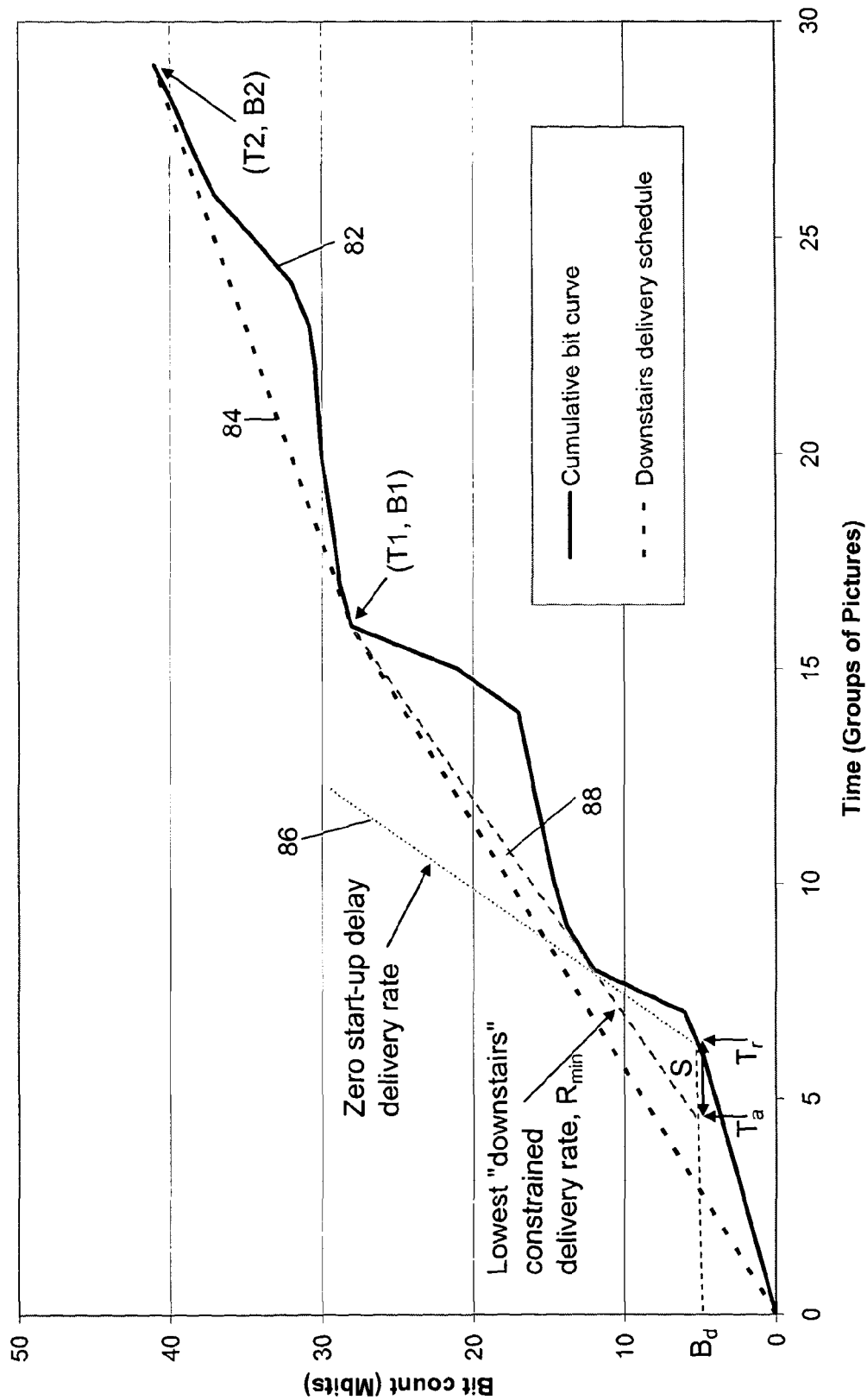
FIG. 8 is a plot of a cumulative bit curve used to illustrate the operation of an embodiment of the invention.

FIG. 8 shows a section of the cumulative bit curve and "downstairs delivery schedule" of FIG. 5. FIG. 8 shows a cumulative bit curve 82, and the associated downstairs delivery schedule 84. In FIG. 8 by way of example let the time when all of the currently transmitted bits will be decoded be $T_r$, and let the current time be $T_a$: this is the time at which the next bits transmitted will start arrive in the decoder buffer. Let $B_d$ be the cumulative bit count at time $T_r$: $B_d$ is indicative of the total number of bits that would have been delivered, if all received data had been encoded at this quality. In order to ensure sufficient bits have been delivered by the time, T1, of the next critical point (T1, B1) on the "downstairs delivery schedule" 84, (B1-$B_d$) bits need to be transmitted between time $T_a$ and time T1, requiring a rate R1 given by Equation 5.

$$R1 = \frac{B1 - B_d}{T1 - T_a} \quad [5]$$

It should be noted that this delivery rate is independent of how many bits are buffered at the decoder and hence independent of which quality of video stream they belong to: what matters is which video stream is to be delivered from this point in time, how much time will elapse before the next bits to be transmitted will be decoded, and how many bits need to be transmitted in the given time period.

While the rate R1 given by Equation 5 is sufficient to meet the demands of the next critical point (T1, B1), it may not be sufficient to deliver all intermediate groups of pictures in a timely fashion. Looking again at FIG. 8, if $B_d$ bits have been delivered in less time than required by the "downstairs delivery schedule", then the current delivery point is on the horizontal dashed line, to the left of its intersection with the "downstairs delivery schedule". In this case the required delivery rate can be determined from knowledge of this point and of all the following critical points on the "downstairs" delivery schedule: the rate R1 given by Equation 5 is sufficient to deliver all subsequent groups of pictures up to the point (T1, B1) in a timely fashion, but the rate required by subsequent critical points (T2, B2), etc, as calculated in Equation 1, must also be considered and the maximum determined, as above (see Equation 2), to find the rate required for timely delivery of the remainder of the video sequence.

Figure 13:
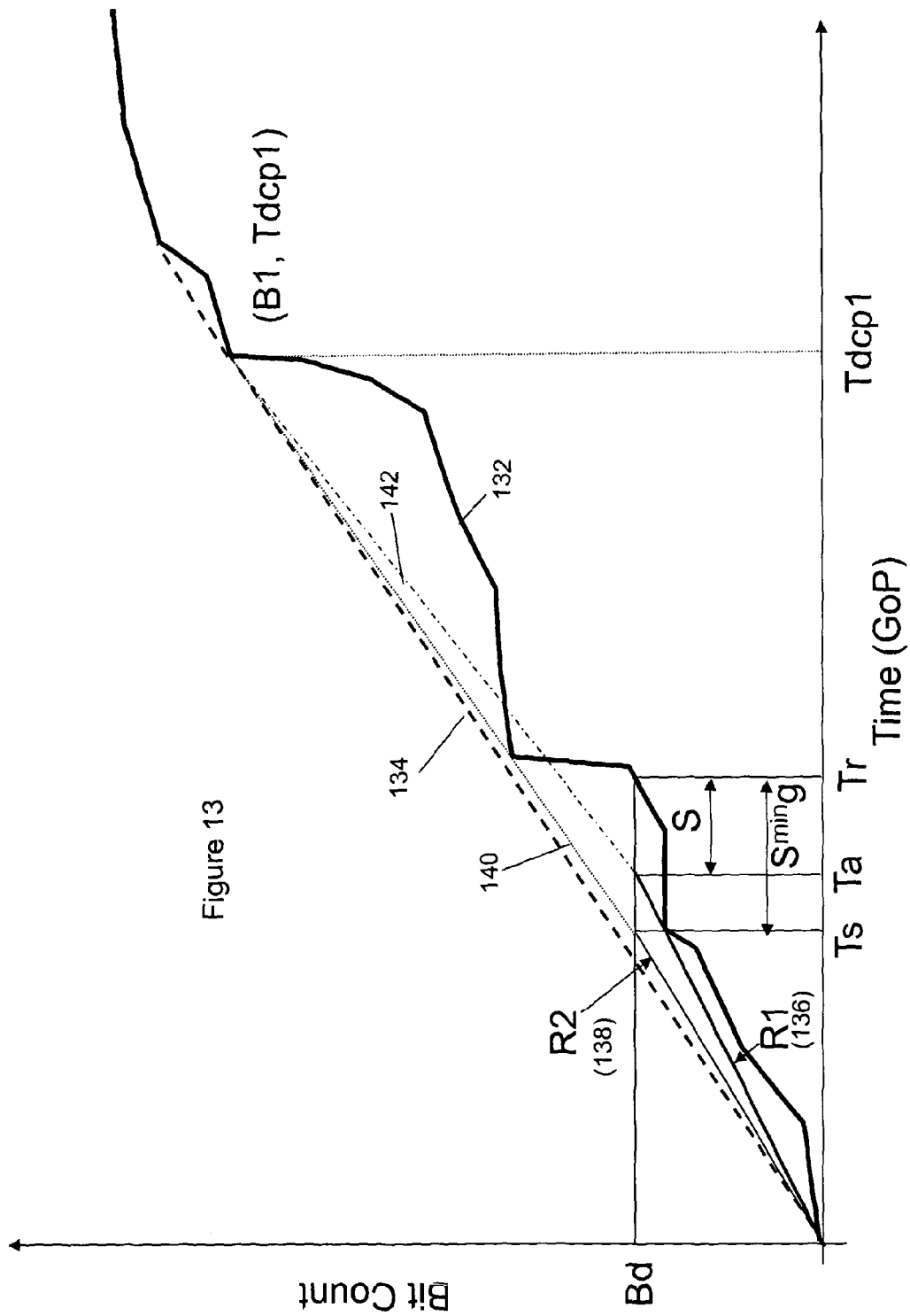
FIGS. 13 and 14 are plots of an example cumulative bit curve that are used to illustrate rate calculation in an embodiment of the invention.

If $B_d$ bits have been delivered in more time than required by the "downstairs delivery schedule", then the current delivery point is on the horizontal dashed line, to the right of the "downstairs delivery schedule", but to the left of the cumulative bit curve, otherwise it would represent an invalid delivery schedule as the bits would not have been delivered in time for decoding. At these points it is not possible to determine the required delivery rate for all possible points on this line segment solely from knowledge of this point and all the following critical points on the "downstairs delivery schedule": there may be points on the decoding schedule that were not critical when starting at the beginning and delivering at the "downstairs" rate but are critical when starting at the current delivery point. FIG. 13 illustrates this point in more detail.

Imagine a video file has decoding schedule 132, and has a downstairs delivery schedule 134, with a first critical point (B1, Tdcp1). However, assume that the delivery rate is less than the downstairs delivery schedule, at rate R1, shown as 136. At time Ta, for example, the client decides to evaluate the rates received and decide whether another quality can be supported. At time Ta in this example, Ta GoPs have been decoded, and there are Tr−Ta=S GoPs in the buffer, waiting to be decoded. Hence, this time S is available to download bits of GoPs which will be displayed after the GoPs already in the buffer.

If at point Ta the client device was constrained to calculate the rate required solely as described above, i.e. by calculating to the next downstairs critical point (B1, Tdcp1), then as shown the calculated rate (shown by dot-dash line 142) would cause a buffer underflow shortly after time Tr, as the delivery schedule moves to the right of the decoding schedule. As a consequence, playout of the encoded content would be interrupted, which is not acceptable. Therefore, some other method of rate calculation is required.

One technique is to define a minimum buffer size $S^{min}_g$ for each delivery point at which the DCP could still be used to calculate a valid rate. In FIG. 13 this is shown by $S^{min}_g$=Tr−Ts, from which it can be seen that a constant bit rate shown by dotted line 140 can be calculated to the DCP (B1, Tdcp1) which does not breach the decoding schedule. To achieve this buffer size delivery would have had to have been at rate R2, R2>R1, such that present time i.e. present decoding point is Ts, rather than Ta. By storing for each GoP such a minimum buffer size value, then an evaluation can be made as to whether the DCPs can be used to calculate the rate required. This is the technique described in more detail in our co-pending European patent application no. EP10252204.2, the entire contents of which are incorporated herein for all purposes.

Figure 9:
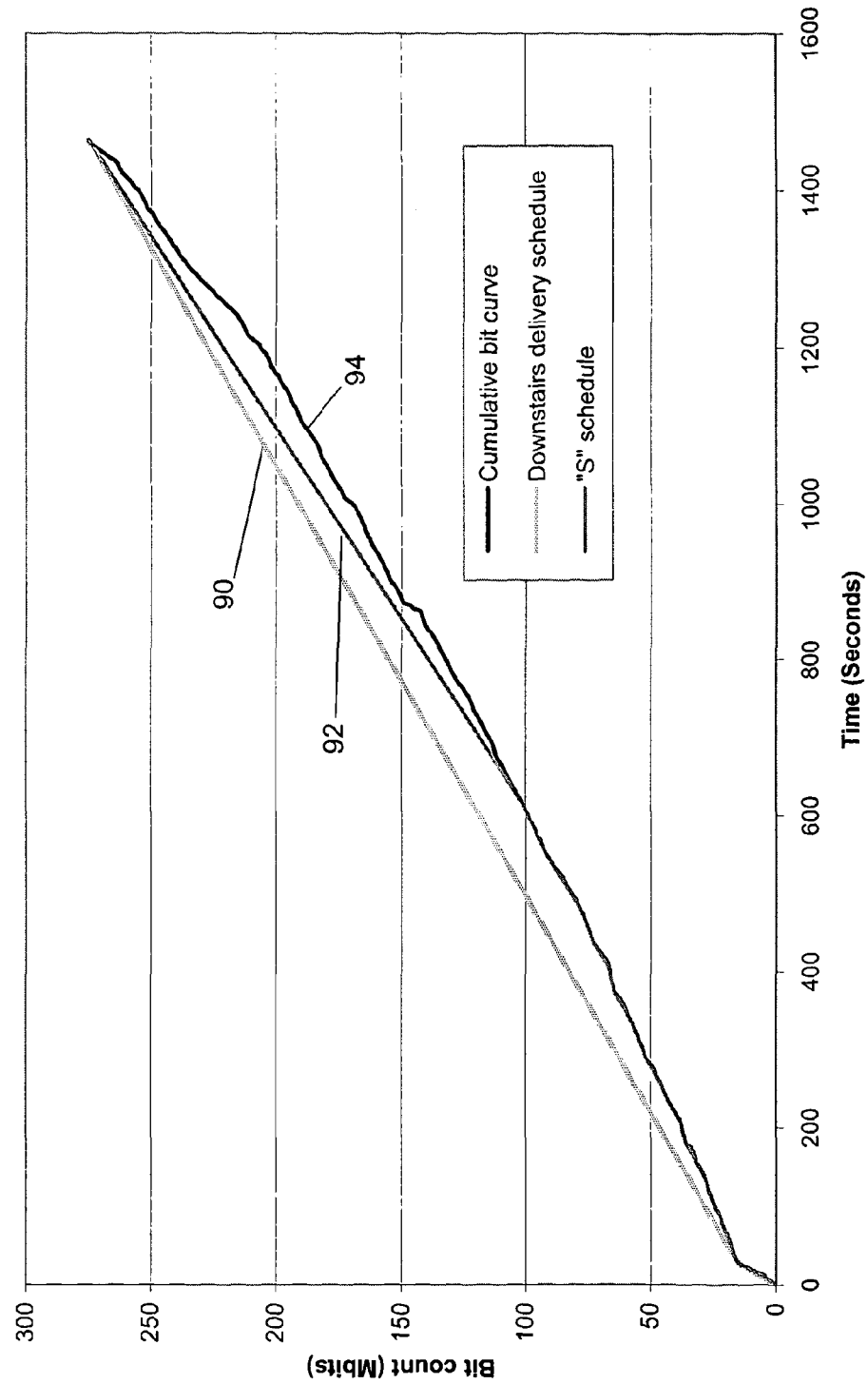
FIG. 9 is a plot showing the variation in a threshold parameter in an embodiment of the invention.

In the present example, however, delivery has been at rate R1 rather than R2, and hence present decoding point is Ta rather than Ts. At point Ta with buffer size S=Tr−Ta, where S<$S^{min}_g$ it is not possible to calculate the rate required for the particular present quality using the DCP. In fact, and dependent on the precise decoding schedule, there can be a large number of GoPs in a piece of encoded content for which rates cannot be calculated without large buffer sizes i.e. large values of $S^{min}_g$. FIG. 9 shows a cumulative bit curve 94 and "downstairs delivery schedule" 90 for a real piece of video content encoded at constant quality. Also shown on the figure is the value of $S^{min}_g$ for each group of pictures, drawn as a curve 92 consisting of one point for each group of pictures, g, at (g–$S^{min}_g$, $B_g$). It is observed that for the first 640 groups of pictures (about 615 seconds in this case of 24 pictures per group of pictures and 25 pictures per second), the value of $S^{min}_g$ tends to be low, but subsequently large values occur. The reason for this is not clear from FIG. 9 due to the scale at which it is drawn but is actually due to some groups of pictures just before the end of the video sequence being encoded with only a small number of bits.

Figure 14:
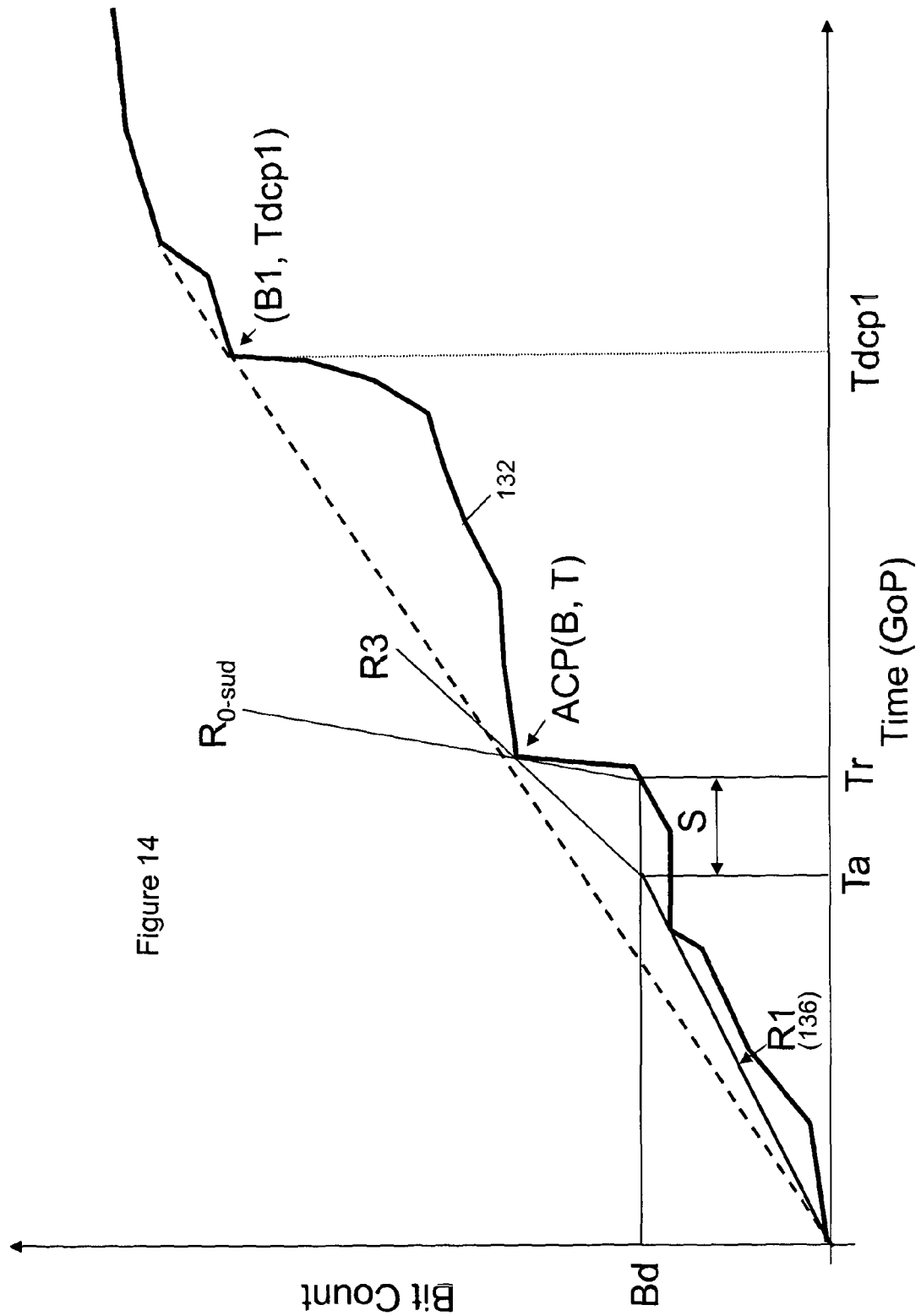

Turning to FIG. 14, instead of using the DCPs to calculate the rate, in order to ensure that decoding can continue uninterrupted a rate R3, as shown in FIG. 14, should be calculated, with reference to an "additional critical point" ACP(B, T), as shown, and that is indicated, in the present embodiment, by the encoded video meta data. By calculating a rate R3 from present decoding point Ta to the additional critical point, and then receiving at that rate, then the client device can ensure that no buffer underflow should occur. One way of looking at such operation is that by adding the additional critical point (ACP) in to the decoding schedule, then the buffer threshold $S^{min}_g$ at which the calculation of rate using the ACP can be performed is significantly reduced. This has the effect of allowing for straightforward rate calculation over a much larger number of GoPs than before, and that does not require much pre-calculated data to be passed to the client. In the present example, the data required includes the cumulative bit curve data, as well as the DCP data, and the additional critical points, that are found as described below.

Figure 15:
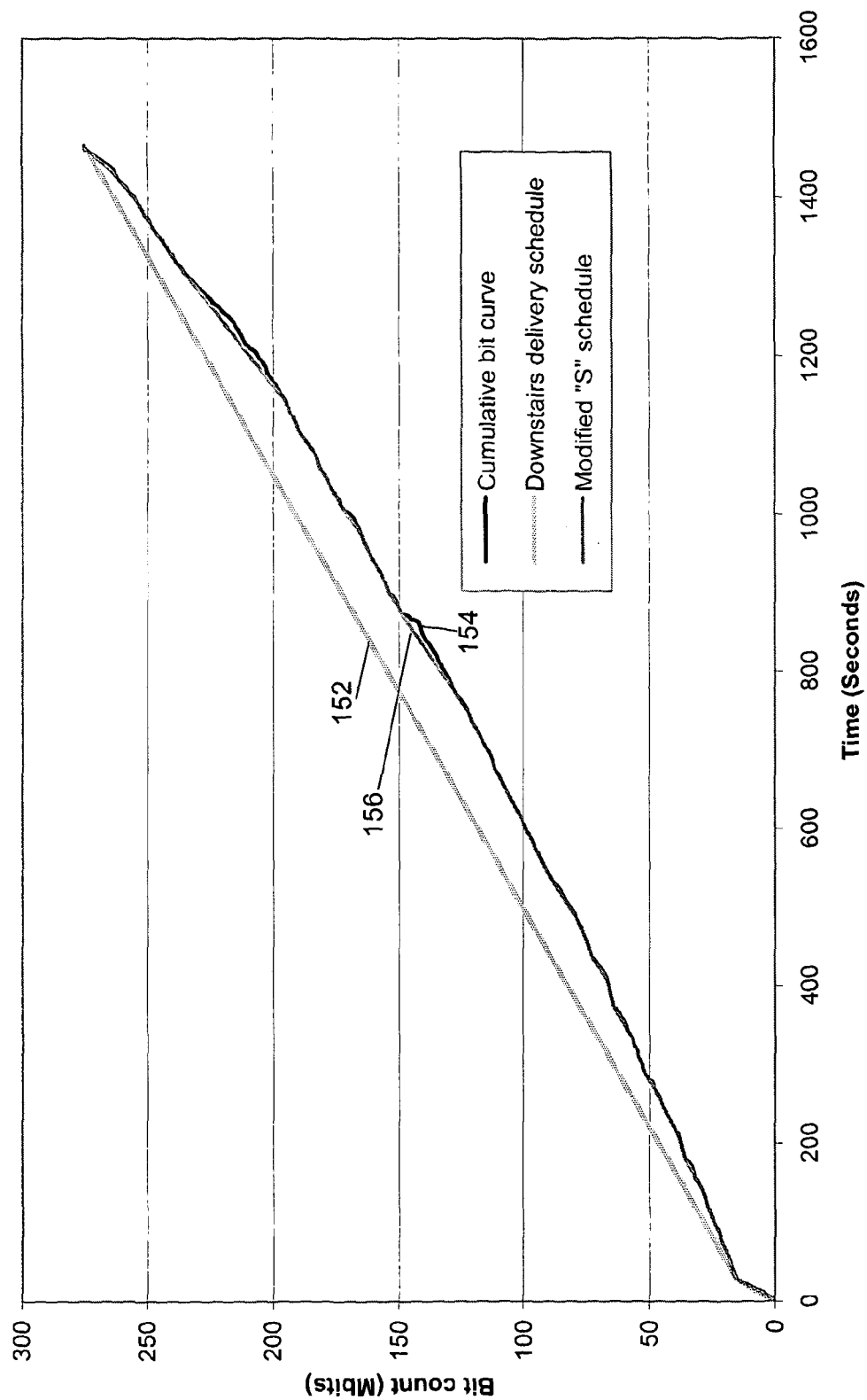
FIG. 15 is a plot of a cumulative bit curve illustrating how adding in an additional critical point can help to reduce required buffer size in an embodiment of the invention.
Figure 16:
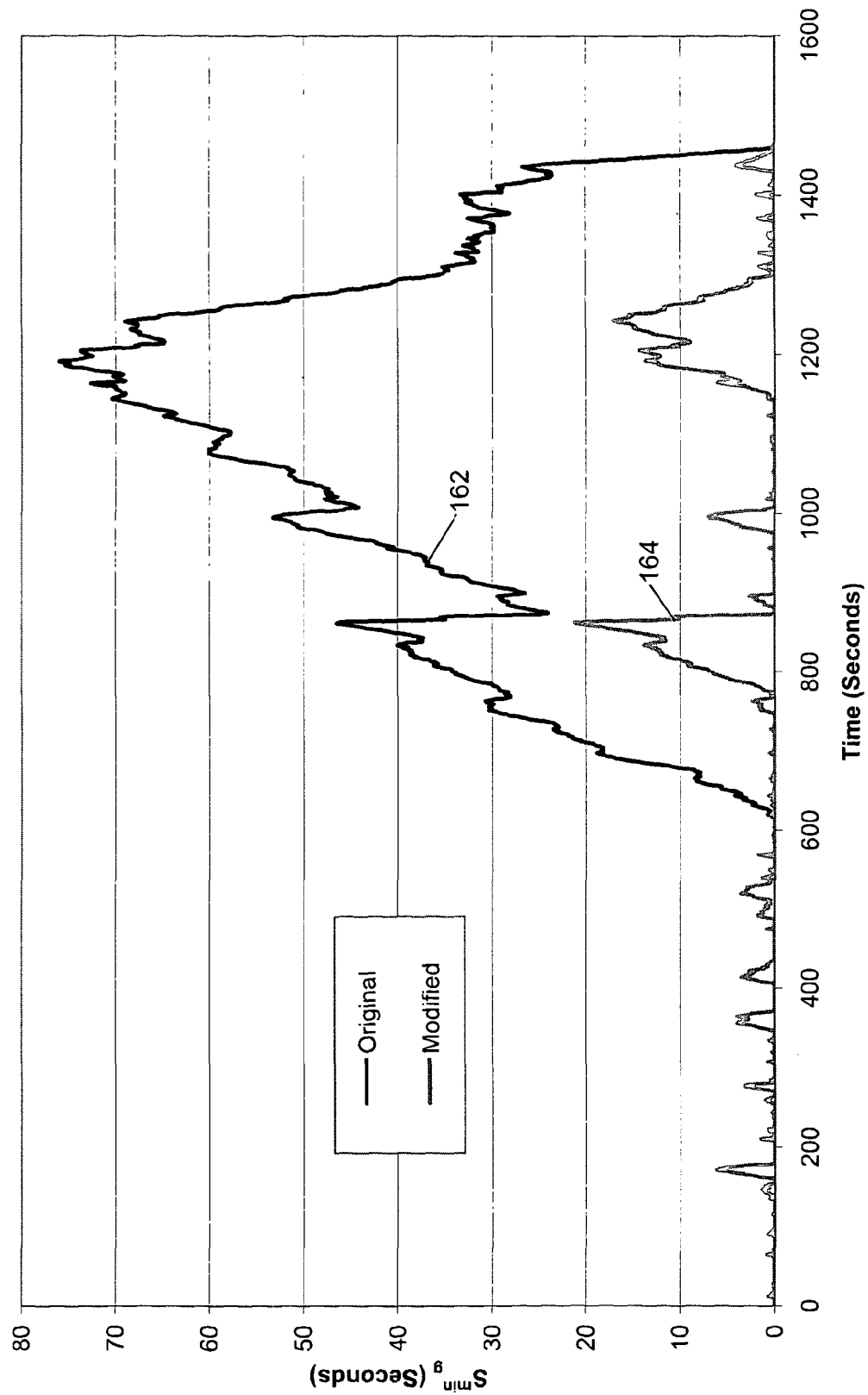
FIG. 16 is a graph showing changes in required buffer size when an additional critical point is added in an embodiment of the invention.

FIGS. 15 and 16 illustrate this in more detail for the example cumulative bit curve of FIG. 9. In particular, FIG. 15 shows the effect of adding one additional point, at group of pictures 1519 (i.e. GoP number 1519), to the set of critical points on the "downstairs delivery schedule" of the cumulative bit curve of FIG. 9. In FIG. 15 the cumulative bit curve is shown as line 154, the downstairs delivery schedule for the curve as line 152, and the resulting values of $S^{min}_g$ that are obtained by adding in the additional critical point as line 156. The particular group of pictures at position 1519 was selected as it was the last in the sequence with a number of bits close to the average found in the latter parts of the sequence: subsequent groups of pictures were encoded with significantly smaller numbers of bits. In comparison to FIG. 9, it can be seen that much lower values of $S^{min}_g$ are calculated.

This comparison is even more clear from FIG. 16, which shows the same two sets of values of $S^{min}_g$, but plotted on their own for clarity rather than being relative to the cumulative bit curve. The original and modified values of $S^{min}_g$ are very nearly identical for the first 640 groups of pictures, but afterwards differ significantly. Therefore, by adding in this case only one additional critical point to the cumulative bit curve, in addition to the downstairs critical points, the amount of data that must be buffered $S^{min}_g$ in order to allow a rate to be calculated using the critical points alone is much reduced, with the result that the technique can then be used over a greater number of GoPs of the decoding schedule than otherwise.

More generally, therefore, we try to find more points to add to the set of critical points with the aim of reducing the values of $S^{min}_g$. As noted above we refer to such a set of points as "additional critical points". Note that such sets of "additional critical points" may or may not include any or all of the critical points on the downstairs delivery schedule, depending on which method is used to calculate the sets and depending on the characteristics of the video bitstream.

There are many ways in which these "additional critical points" could be calculated, and two methods are given later. However, the manner in which they are used is the same: provided that the amount of data buffered at the decoder, measured in terms of the time it will take to decode it, is at least equal to a threshold value of $S^{min}_g$ for the next data to be delivered, the delivery rate required to satisfy each of the "additional critical points" and each original critical point could be calculated, with the maximum of these representing the actual required delivery rate precisely. FIG. 11 shows more detail.

In particular, assume that the actual delivery schedule is behind the downstairs delivery schedule, such that the evaluations at B.11.6 and B.11.10 have returned false and true respectively. The next evaluation made at B.11.12 is to look at the buffer 2106 (see FIG. 2) and see how much data is in the buffer waiting to be decoded, and then derive the delivery point Tr from the decoding schedule of the particular quality encoded video data for which a rate is being found. Thus, for example, in the examples of FIGS. 13 and 14, at decoding point Ta with delivery rate R having been less than the decoding schedule there is data in the buffer to reproduce up to point Tr. Hence, the next data to be delivered would need to be from following the delivery point Tr. If the amount of buffered data is more than a pre-set threshold $S_{max}$, for $S^{min}_g$, for example 5 seconds worth, then it should then be possible to find the rate required using either the downstairs critical points, or the additional critical points that are added in. In this respect, as will be described later, calculation of the location of the additional critical points is made in dependence on a particular chosen value for $S_{max}$. If B.11.12 returns true, then processing proceeds to B.11.14, where the rate is calculated from the additional critical points and/or the downstairs critical points.

More particularly, at B.11.14 the rate is calculated as explained above, that is, the delivery rate required to satisfy each of the "additional critical points" and each original critical point could be calculated, with the maximum of these representing the actual required delivery rate precisely. However, it should be noted that it is not necessary to calculate a rate to each "additional critical point" and to each original critical point. Points corresponding to data that have already been delivered are clearly not needed. When the current delivery point is to the right of the "downstairs delivery schedule", only "additional critical points" up to the next original critical point, and that point itself, need to be checked. And when the current delivery point is on or to the left of the "downstairs delivery schedule", it is only necessary to check the appropriate original critical points as has been described earlier in connection with FIGS. 5 to 7, and has would have already been dealt with at B.11.6 and B.11.8.

If at B.11.12 it is determined that the amount of buffered data is less than $S_{max}$, then in one example embodiment it could simply be determined that no rate calculation could be made for the present GoP of the present quality for which a rate is being calculated. In such a case, no new quality selection may be made, and the client may then continue to receive the encoded video at the present rate, at the present quality, until the next time the rates required for particular qualities are evaluated. In such an example embodiment, there would be no need to store the zero start-up delay data in the table 30 of FIG. 3, and hence the amount of pre-calculated data that needs to pass to the client before streaming commences is substantially reduced. In another embodiment another option in the event of being unable to calculate the rate would be to invoke a panic mode and switch as soon as possible to the lowest quality stream. Again, in such an embodiment there would be no need to store the zero start-up delay data.

In another example embodiment, however, as shown in FIG. 11, where less than $S_{max}$, is buffered then evaluation B.11.12 returns negative, and processing proceeds to B.11.16, which returns positive. Then, at B.11.18 a rate is found from a time point as if there was $S_{max}$ in the buffer to the ACP i.e. Tr–$S_{max}$, and ACP(B)–Bd bits had to be downloaded in time ACP(T)–Tr+$S_{max}$. At B.11.20 an interpolation is then performed between this found rate, and the zero delay start-up rate for time Tr, dependent on the actual value of S in the buffer, and the ratio of S to $S_{max}$. This interpolated rate is then used as the forward rate for the present particular quality, during the quality selection in B.10.14.

In terms of the interpolation that is used, in one embodiment a linear interpolation may be used. However, in other embodiments different interpolation techniques may be used, and particularly those described in our prior co-pending patent applications GB 1011047.6, and EP10251540.0, the entire contents of which are incorporated herein by reference for all purposes.

Thus far, therefore, we have described how adding in additional critical points into the decoding schedule can allow rates to be calculated in a very simple manner for a larger number of GoPs than previously, and for a larger range of delivery rates that have been received. In particular, by finding additional critical points based on a threshold value $S_{max}$, for $S^{min}_g$, then rates can be found by determining for a delivery point whether the actual delivered rate has been such as to provide a minimum amount $S_{max}$, in the buffer, and if so, then a rate can be found by calculating rates from the present decoding point to the next additional critical points up to the next downstairs critical point, and selecting the maximum rate found. If there is less than $S_{max}$, in the buffer, then either no calculation of rate is performed, or in some embodiments an interpolation can be performed, based on a pre-calculated zero-start-up delay rate.

The information relating to the location of the additional critical points on the decoding schedule is contained in the encoded video meta data, and stored in table 32 (see FIG. 3). That is, as discussed previously with respect to FIG. 3, an example of a pre-calculated file that is stored as the encoded video meta data would therefore contain, for each group of pictures, for each quality encoded: the cumulative bit count information, and the delivery rate needed for zero start-up delay. In addition, the critical points on the "downstairs delivery schedule", and the additional critical points, found as described below, would be stored once for the entire video sequence for each quality encoded. In embodiments of the present invention, the cumulative bit curve information is provided in a compact format, as will be described in more detail later.

Figure 12:
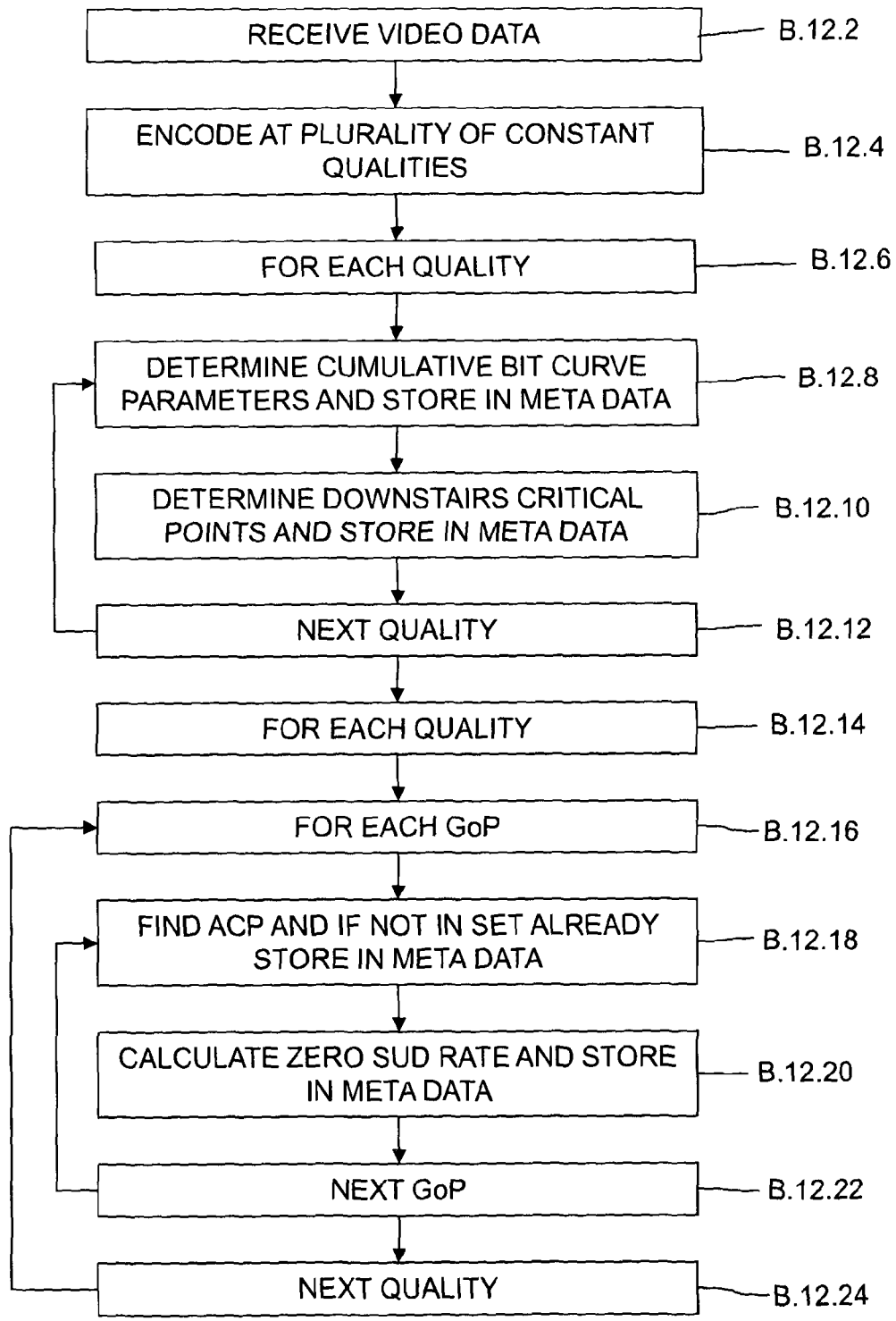
FIG. 12 is block diagram of part of the operation of the video content server of the embodiment.

In terms of the pre-calculation of the encoded video meta data, this is performed in the present embodiment by video content server 10, operating according to the process shown in FIG. 12. Here, imagine some new video content, such as a new movie or the like, is provided to the video content server, at B.12.2. At B12.4 the video encoder encodes the received content to produce a plurality of different encoded versions 1026, each encoded at different constant qualities. These are then stored in storage medium 108, as shown. Next it is then necessary to pre-calculate the meta data 1024 for the set 1028 of different quality encoded data.

At B.12.6 we start a loop to process each encoded video file of different quality in the set 1028, and then for the present encoded file being processed at B.12.8 determine the cumulative bit curve parameters, which are stored in the meta data. These are determined by stepping through the encoded file from GoP to GoP and counting the bits. In embodiments of the invention, once the actual CBC has been found, a compact representation of the curve that can be represented by linear interpolation between fewer number of points can then be found. The techniques used in embodiments of the present invention for so doing will be described later. In addition, once the cumulative bit curve has been found, the downstairs critical points (DCPs) can then be found at B.12.10, from the cumulative bit curve. These are also stored in the meta data file.

At B.12.12. an evaluation is performed as to whether the above has been performed for every different quality level, and if not the next quality level file is selected, and the process repeated. Once all of the different quality files 1026 have been processed, then by that point the cumulative bit curves and downstairs critical points will have been found for each different quality version of the encoded video data.

Next, at B.12.14 another processing loop is started to process each different quality version in turn again. At B.12.16 each GoP is then looked at in turn, with the purpose of determining the location of an "additional critical point" for the GoP, assuming that $S_{max}$ is buffered, and also calculating a zero start-up delay rate for each GoP, at B.12.18, and B.12.20.

Regarding the processing performed at B.12.18 to find additional critical points, we will now describe two example methods for calculating the additional critical points.

In the first example method the upper bound, $S_{max}$, on the values of $S^{min}_g$ is chosen, and the "additional critical points" required to achieve this value are calculated: the end result will be a set of points such that if the parameter $S^{min}_g$ were calculated for each group of pictures, no value would be greater than $S_{max}$, as shown in Equation 6.

$$S^{min}_g \leq S_{max} \text{ for all } g, 1 \leq g \leq G \qquad [6]$$

The process must be carried out for each quality at which the video sequence was encoded. For each encoding quality, we consider each group of pictures in turn, and calculate the rate required to satisfy each subsequent group of pictures on the cumulative bit curve when the amount of data (in time units) buffered at the decoder, $S_g$, is equal to $S_{max}$ and find the maximum of these rates and the only or last group of pictures on the cumulative bit curve that requires this maximum rate. The point on the cumulative bit curve corresponding to this only or last group of pictures is included in the set of "additional critical points". This could be visualised as taking each point on the cumulative bit curve in turn, moving to the left by the maximum allowed value, $S_{max}$, and then finding the line of lowest slope passing through that point that just touches the cumulative bit curve, and including the only or last such point in the set of "additional critical points".

Figure 17:
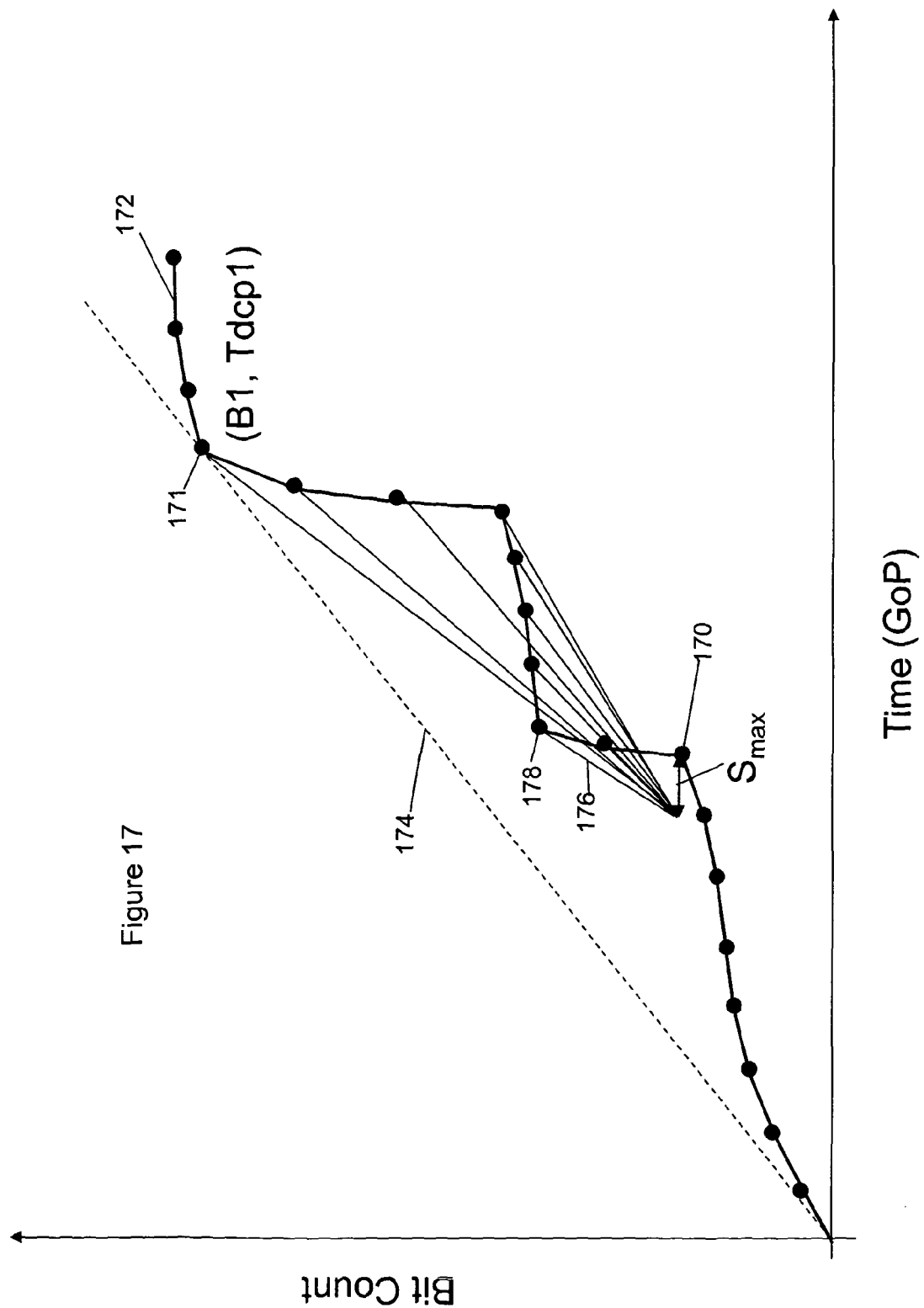
FIG. 17 is a graph of part of a cumulative bit curve showing how additional critical points are found in an embodiment of the invention.

FIG. 17 shows the process graphically. Here, we have cumulative bit curve 172, which has downstairs rate 174, calculated to downstairs critical point 171. Now, imagine we are trying to calculate the critical point on the decoding schedule for point 170, having coordinates (Bd, Td), assuming that there is value $S_{max}$ in the buffer. Having data in the buffer effectively buys time for data to be delivered before it needs to be decoded, and hence moves the starting time back from which the rate calculation needs to be made by the same amount, in this case by $S_{max}$. Therefore, from a point in space equal to (Bd, Td–$S_{max}$), rates are calculated to every other GoP moving forward from the point in question, up to the next downstairs critical point 171. These rates are then compared, and the GoP which gives the maximum rate is selected as a new additional critical point, if it has not already been selected as an additional critical point for another GoP i.e. if it is not already in the list of additional critical points. In the example of FIG. 17, the highest rate calculated is shown by line 176 to GoP 178, and hence GoP 178 would be added to the list of additional critical points, unless it was included in the list already.

This method is described formally as follows for a single encoding quality, q, where the amount of data $b_{qg}$ generated for each group of pictures (g=1 . . . G) has already been calculated, and where $S_{max}$ indicates the maximum allowed value of the parameter $S^{min}_g$ measured in group of pictures periods.

400 Initialise the set of "additional critical points" to be empty. Set a group of pictures index g=1.
410 Set a maximum bit rate parameter $R_{max}$=0, Set a group of pictures index $H_{max}$=0. Set a cumulative bit count B=0. Set another group of pictures index h=g.
420 Set B=B+$b_{qh}$
430 Set R=B/(h−g+1+$S_{max}$)
440 If R<$R_{max}$ go to step 460
450 Set $R_{max}$=R; Set $H_{max}$=h
460 Set h=h+1. If h≤G go to step 420
470 Add the point on the cumulative bit curve with group of pictures index $H_{max}$ to the set of "additional critical points" if it is not already present in it.
480 Set g=g+1. If g≤G go to step 410, otherwise terminate.

Note that in the above the values of h iterate to the end of the video content rather than to the next downstairs critical point, and hence more points are considered as to whether they should be additional critical points than as described previously in respect of FIG. 17. In embodiments of the invention either technique may be used, i.e. look at points all the way to the end of the video content as in the above formal description, or look at points only up to the next downstairs critical point, as shown in FIG. 17.

Figure 18:
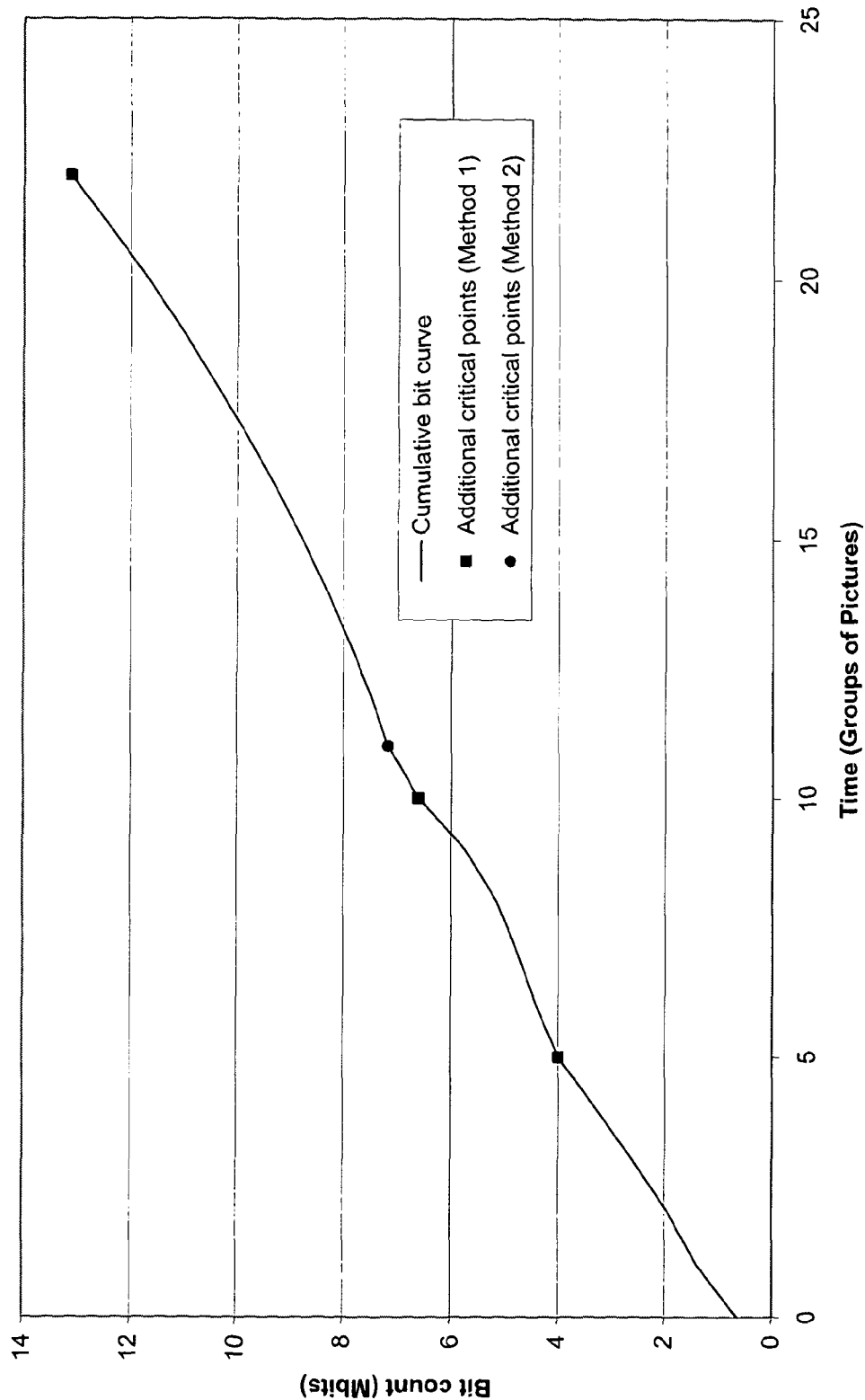
FIG. 18 shows a cumulative bit curve and the "additional critical points" as identified by two methods of calculation.

This first method identifies the points on the cumulative bit curve that need to be known in order to be able to calculate the delivery rate when the amount of data buffered is equal to $S_{max}$. One might imagine that these points would also be sufficient to calculate the delivery rate for any larger amount of buffered data. While this may often be the case, we find that there are cases where this is not true. An example is shown in FIG. 18. This shows a cumulative bit curve and the "additional critical points" found by the above first method when $S_{max}$=0.5 seconds: three such points are found at the groups of pictures with indices 5, 10 and 22. However, when analyzing the delivery of group of pictures with index 10, one finds that when the amount of buffered data, $S_g$, is less than 0.587358276 seconds the required delivery rate is limited by group of pictures 10 itself, and when $S_g$ is greater than 0.618985287 seconds the required delivery rate is limited by group of pictures 22, but for intermediate values of $S_g$ the required delivery rate is limited by group of pictures 11, a point not identified by the above first method.

We find in this example that the maximum error in the calculation of required delivery rate when using the "additional critical points" found by the above first method occurs when $S_g$=0.605230856 seconds, at which the rate is underestimated by about 0.44%.

In the analysis of real video data, we find that the above first method fails to find a small fraction of the "additional critical points", and that the missing ones are generally next to or very close to ones that are identified.

Figure 19:
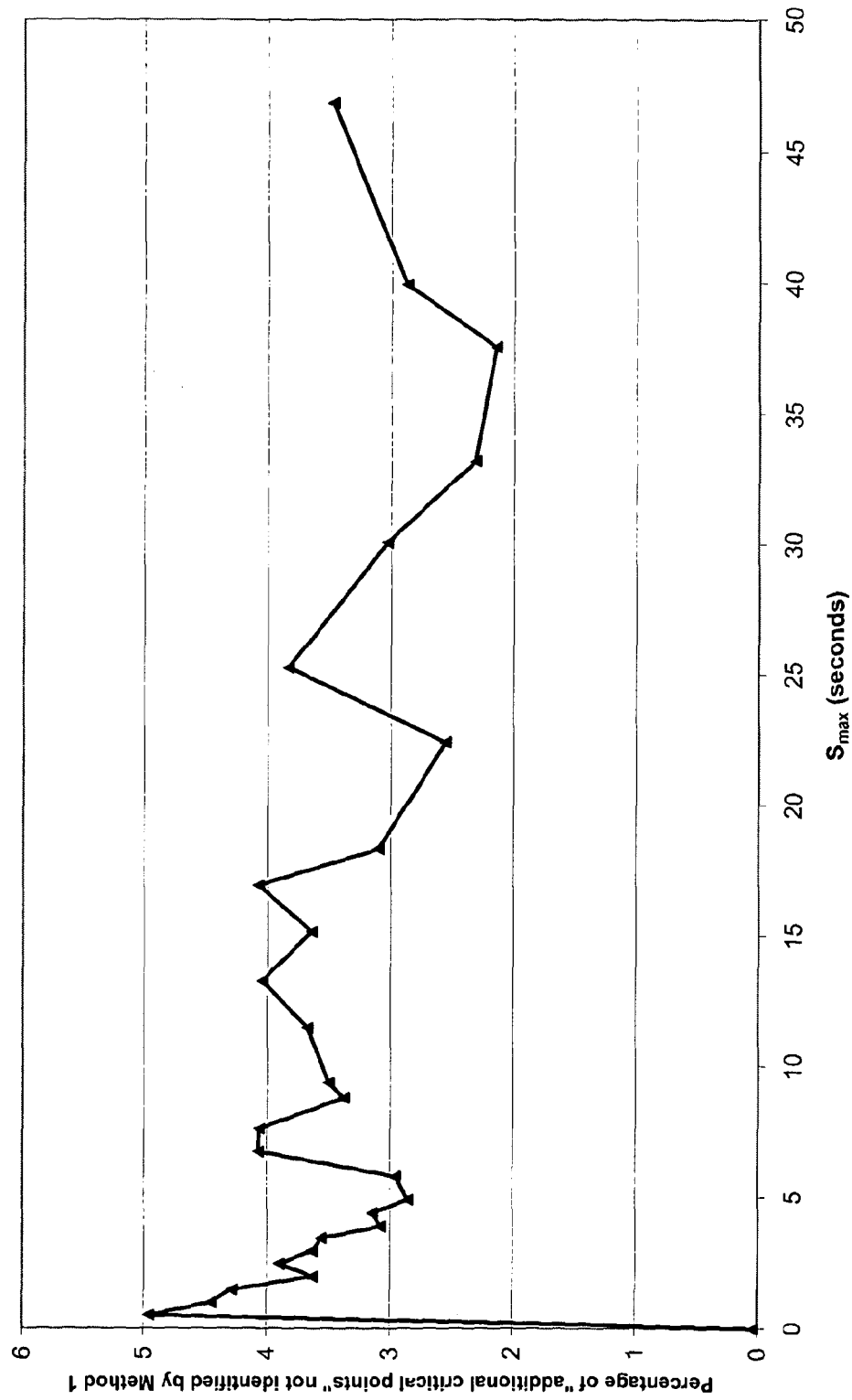
FIG. 19 shows the percentage of "additional critical points" not identified when using the first method of calculation.

FIG. 19 shows the percentage of "additional critical points" not identified when using this first method of calculation: it can be seen that when $S_{max}$ is set to zero, almost all of the "additional critical points" are identified, whereas for larger values, between 2% and 5% are not identified.

As the missing "additional critical points" are only applicable to calculating the delivery rate required for some groups of pictures for some, probably small, ranges of $S_g$ above $S_{max}$, we believe that using the above method to identify "additional critical points" would be suitable to a wide range of applications.

However, we will now describe a second method that does identify all of the "additional critical points". As in the first method, a upper bound, $S_{max}$, on the values of $S^{min}_g$ is chosen, and all of the "additional critical points" that are needed to calculate delivery rates for all values of $S_g$ greater than or equal to this value for all groups of pictures are calculated. The process must be carried out for each quality at which the video sequence was encoded. For each encoding quality, we consider each group of pictures, g, in turn, starting with the last and working towards the first, to determine whether it is an "additional critical point". For each such group of pictures, g, we consider a group of pictures, h, starting at group of pictures h=g, and working towards the first group of pictures in the sequence, h=1, and calculate the value of $S^{min}_h$, that is, the minimum start up delay required for group of pictures h such that the point on the cumulative bit curve with group of pictures index g constrains the constant delivery rate that can be used to deliver groups of pictures h to g inclusive in a timely fashion. If $S^{min}_h$ is less than $S_{max}$, we set $S^{min}_h$=$S_{max}$, as doing so will not change the fact that g is critical for the delivery of groups of pictures h to g, and as we are not interested in finding "additional critical points" for values of $S_g$ less than $S_{max}$. We then consider groups of pictures after g, to determine whether the delivery rate required with start up delay $S^{min}_h$ would be sufficient to deliver the remainder of the video sequence. If so, then the group of pictures g is added to the set of "additional critical points". Otherwise it is not added as some later group of pictures after g is more critical for the delivery of group of pictures h with the calculated start up delay $S^{min}_h$.

We illustrate that this method is guaranteed to find all of the "additional critical points" for a given value of $S_{max}$ by considering a group of pictures g that has not been added to this set. We have determined that for each group of pictures h g, that g is not critical for h for start up delay $S^{min}_h$≥$S_{max}$. By the definition of $S^{min}_h$, for that value of start up delay, for delivery of groups of pictures h to g inclusive, g is actually critical. But as we have asserted that g is not critical for h, then some group of pictures, i, after g, must be critical for h. Then in consideration of the geometry of the cumulative bit curve, we can see that as the start up delay is increased from $S^{min}_h$, no group of pictures between h and i, which includes the group of pictures g, can not become critical for h. And hence we conclude that group of pictures g can not be critical for any group of pictures h, with h≤g, for start up delays greater than $S^{min}_h$ if it is not critical for a start up delay of $S^{min}_h$.

This method is described formally as follows for a single encoding quality, q, where the amount of data $b_{qg}$ generated for each group of pictures (g=1 . . . G) has already been calculated, and where $S_{max}$ indicates the maximum value of the parameter $S^{min}_h$, measured in group of pictures periods.

500 Initialise the set of "additional critical points" to contain group of pictures G, the last in the video sequence. This will always be an "additional critical point" because, at least, it is critical for the delivery of the last group of pictures in the video sequence. Set a group of pictures index g=G−1.

505 Set the minimum bit rate parameter $R_{min}$ to a large value, such as the total number of bits in the encoded video sequence. Set a cumulative bit count B to zero.

510 Set another group of pictures index h=g.

515 Set $B=B+b_{qh}$

520 Set R=B/(g−h+1)

525 If $R>R_{min}$ go to step 535

530 Set $R_{min}=R$; set $S^{min}_h=0$; go to step 545

535 Set $B^{min}_h=(B/R_{min})-(g-h+1)$

540 If $S^{min}_h<S_{max}$ set $S^{min}_h=S_{max}$

545 Set $R=B/(S^{min}_h+g-h+1)$

550 Set another group of pictures index i=g; set cumulative bit count $D=B-b_{qg}$.

555 Set $D=D+b_{qi}$

560 Set $r=D/(S^{min}_h+i-h+1)$

565 If r>R go to step 580. Group of pictures g is therefore not critical for group of pictures h.

570 Set i=i+1. If i≤G go to step 555

575 Add the point on the cumulative bit curve with group of pictures index g to the set of "additional critical points". Go to step 585. As group of pictures g is critical for group of pictures h, there is no need to consider groups of pictures with lower index than h for the group of pictures g.

580 Set h=h−1. If h≥0 go to step 515

585 Set g=g−1. If g≥0 go to step 505, otherwise terminate.

Figure 20:
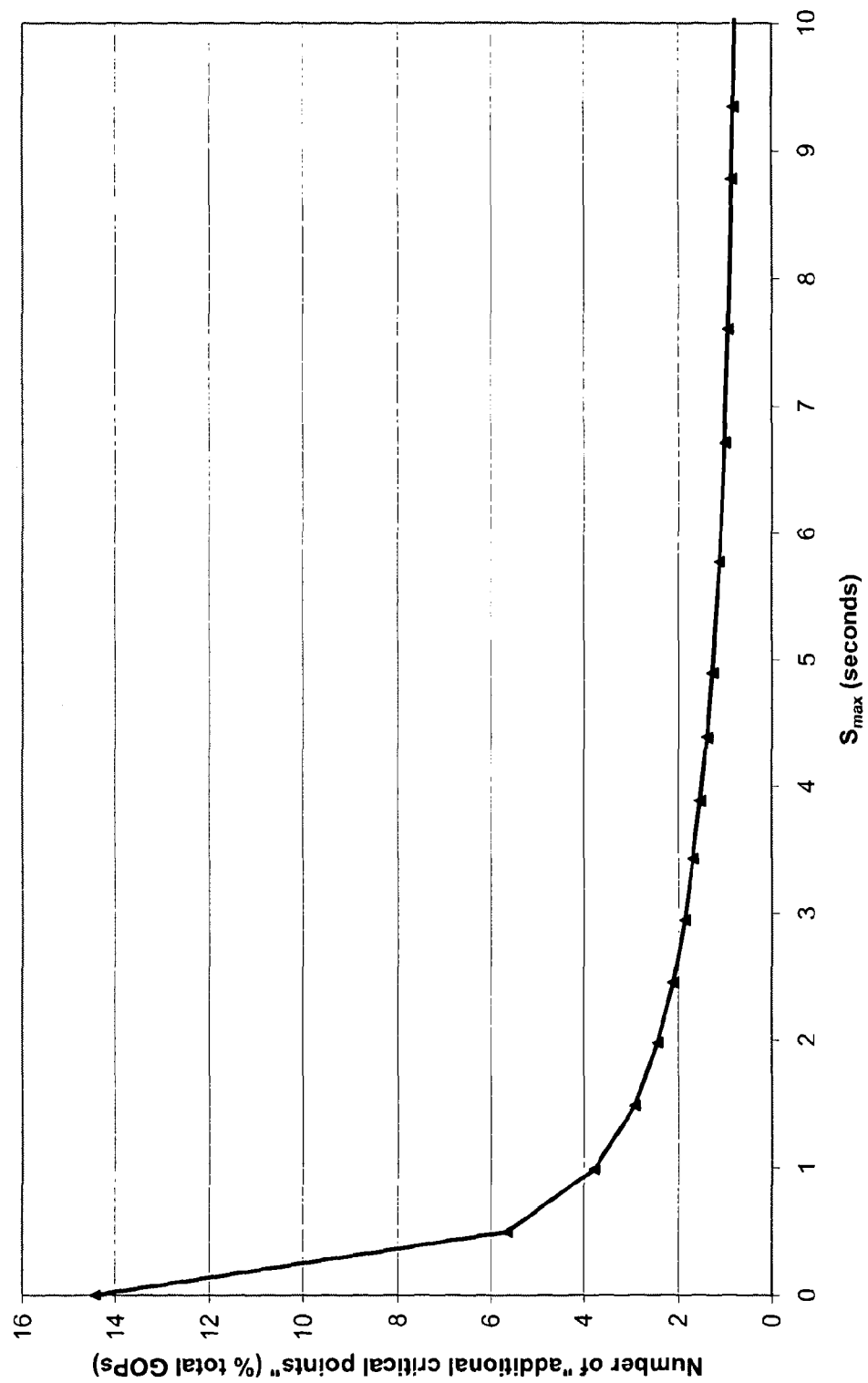
FIG. 20 shows how the number of "additional critical points", expressed as a percentage of the number of groups of pictures in the video sequence, varies with the start up delay parameter, $S_{max}$, averaged over the analysis of a number of real video sequences encoded with constant perceptual quality.

FIG. 20 shows how the number of "additional critical points", expressed as a percentage of the number of groups of pictures in the video sequence, varies with the start up delay parameter, $S_{max}$, averaged over the analysis of a number of real video sequences encoded with constant perceptual quality. We find that a practical implementation point is to set $S_{max}$ to 5 seconds, in which case on average the number of "additional critical points" will be about 1.25% of the number of groups of pictures in the video sequence.

Returning to FIG. 12, therefore, once the additional critical points have been found, the zero start-up delay value is found. As shown in FIG. 14, pictorially this is found by starting with a high rate beginning at Tr, and reducing the rate until a rate is found which just touches the cumulative bit curve at a future point. That rate is then used as the zero-start-up delay rate.

Mathematically, the zero-start-up rate is found using the following equation, where the present GoP for which the rate is being found is g, h refers to future GoPs in the decoding schedule, and $B_h$ and $B_{g-1}$ are the cumulative bit counts for GoPs h and g−1 respectively:

$$\text{Max}\left\{\frac{B_h - B_{g-1}}{h - g + 1}\right\} \text{ for all } h \geq g \quad [7]$$

As shown in both B.12.18 and B.12.20, both the found additional critical points and zero start-up rates are stored in the meta data. At B.12.22, and 12.24 evaluations are performed to ensure that each GoP in each different quality version of the video content is processed. The complete resulting set of meta-data is stored as meta data 1024.

We will now provide an example of the calculation of a required delivery rate, by considering the video sequence whose cumulative bit curve is shown in FIG. 9. We consider the time at which 800 groups of pictures have already been delivered. With 24 pictures per group of pictures, and 25 pictures per second, this corresponds to a decoding time of 768 seconds. By analysis of the downstairs delivery schedule, on which there are seven critical points, we can determine that had delivery been on the downstairs delivery schedule, then the current time would be 644.9 seconds from the start, and hence 123.1 seconds of data would be buffered. Using the process described above starting at step 500 to calculate the "additional critical points", we find 19 such points when the threshold $S_{max}$ is 5 seconds. We also find that $S^{min}_g$ is 0.28 seconds at this group of pictures, indicating that when the amount of data buffered, measured in units of time, is more than this threshold, the required delivery rate can be calculated from the "additional critical points". We can also calculate the minimum delivery rate $D_{qg}$ of 275075 bits/second that would be needed for delivery if no time were buffered at the decoder i.e. the zero start-up rate.

With the above, therefore, we have shown how data rates for different quality variable bit rate encoded content files can be determined, in dependence on whether the actual delivery rate already received is ahead of schedule or behind schedule. Various pre-calculated data is provided to a client device in advance of the streaming, which is then used during receipt of a video stream to calculate forward delivery rates required for different quality levels. When delivery is ahead of schedule, then forward delivery rates can be calculated using pre-calculated "downstairs critical points" on the decoding schedule, whereas when delivery is behind schedule, and buffer underflow might occur, then forward delivery rates can be calculated using pre-calculated "additional critical points", provided that a minimum amount of data is buffered, but which may be as low as 5 seconds, or even 0.5 s. The use of "additional critical points" provides a good compromise between the amount of pre-calculated data that should be passed to the client and the range of amounts of buffered data for which the required rate could be calculated.

In the above example embodiment it is the client device that is provided with pre-calculated data, and which calculates required delivery rates for different constant quality encoded data, and then selects a quality to be used in dependence on the calculated rates. In other embodiments, however, the rate calculations could be performed at the video content server, as could also the quality selection. In such a case the video content server would provide the selected quality to the client device, which would then need to do no more than decode and reproduce the data that is passed to it. In addition, there would be no need to deliver the encoded video meta data to the client prior to streaming, if the client device is not required to make rate calculations and quality selection decisions.

In addition, in the above described embodiment we have concentrated on the delivery of encoded video data, as such forms one of the primary applications areas of embodiments of the invention. In other embodiments, however, the encoded data may be any encoded data that is encoded at variable bit rate, such as audio data, or the like.

Compact Representation of Cumulative Bit Curve

So far, we have described how rate determination for VBR encoded data at different qualities can be undertaken, using downstairs critical points, and additional critical points on the CBC of the encoded data. In the example meta-data of FIG. 3 the CBC is fully represented in table form, with an individual entry per GoP. When CBC information is required, it can then be directly looked up from this table.

However, it has already been noted above that such a representation requires lots of pre-calculated meta-data to be passed in advance to the video client, which is undesirable. The present embodiment therefore aims to try and reduce the amount of meta data that needs to be passed to the client over the network in advance of streaming.

One possible method is to note that the pre-calculated data already includes either the critical points on the downstairs delivery schedule or the "additional critical points" or both, and that these points lie on the cumulative bit curve. These points could therefore be used to estimate the cumulative bit curve for intermediate groups of pictures, by, for example, linear interpolation. However, as will become clearer from the following, simple linear interpolation between critical points on the CBC can introduce large errors in calculated rates.

Figure 21:
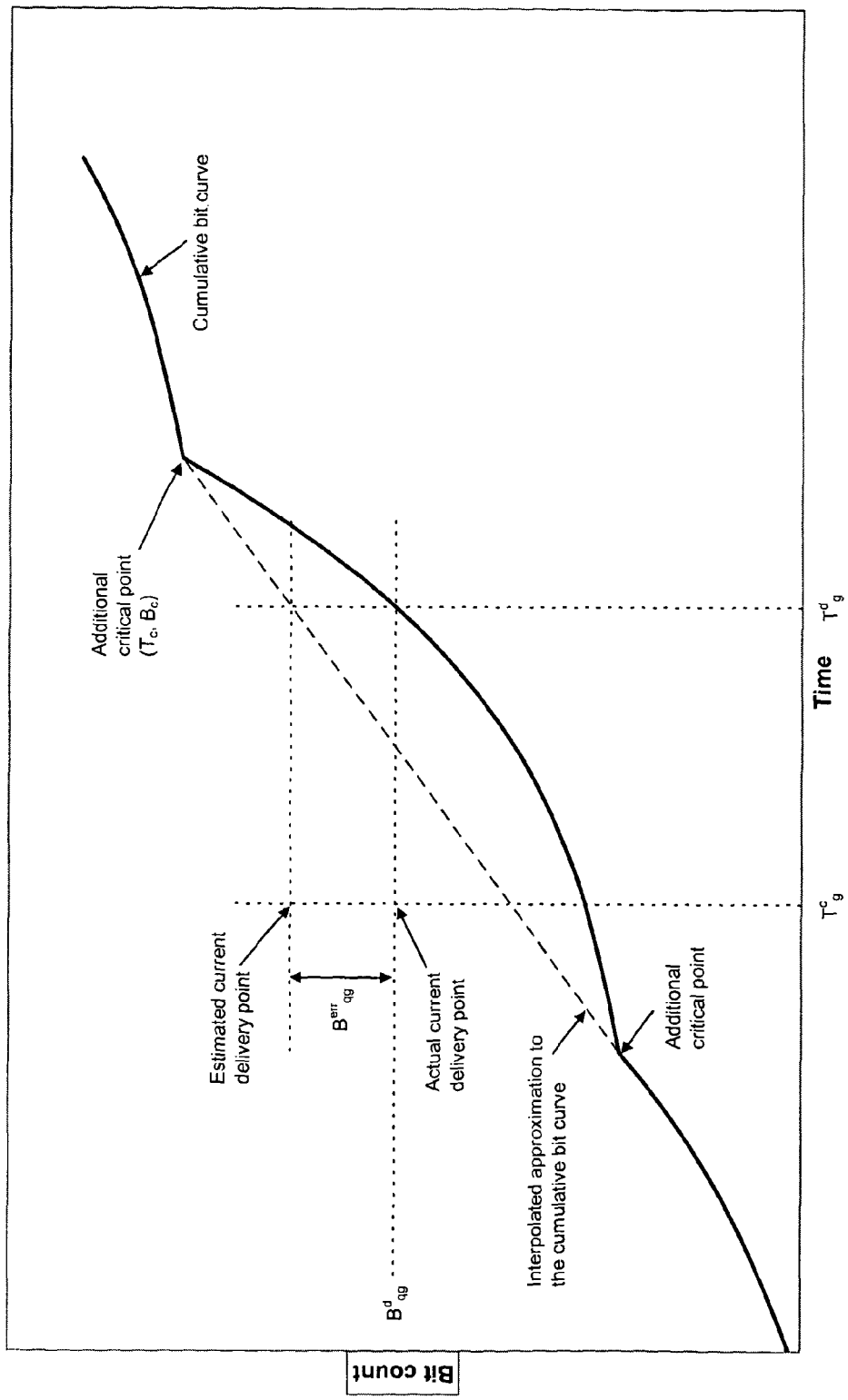
FIG. 21 shows a cumulative bit curve, an approximation of that curve found by interpolation between two points on it, an actual current delivery point and an estimated current delivery point found using the approximation to cumulative bit curve.

FIG. 21 shows such an example, showing a cumulative bit curve, two points on it, labelled as "additional critical points", and a linear interpolation between those two points. The current time is $T^c_g$ and the decoding time for the group of pictures that is about to be transmitted is $T^d_g$. If full knowledge of the cumulative bit curve for quality q were available, the vertical coordinate $B^d_{qg}$ could be easily deduced. When such full knowledge is not available, and the interpolated approximation to the cumulative bit curve is used instead, the vertical coordinate is deduced as $B^d_{qg}+B^{err}_{qg}$, where $B^{err}_{qg}$ is the error in the result.

But what matters in practice is not the error in the vertical coordinate but the effect it has on the calculated required rate. Let us assume that $T^c_g$ and $T^d_g$ are such that the additional critical point $(T_c, B_c)$ determines the required delivery rate, $R^r_{qg}$, and that the required delivery rate estimated using the linear interpolated approximation to the cumulative bit curve is $R^{est}_{qg}$. The error in the estimated required rate can be calculated using Equation 8.

$$R^r_{qg} - R^{est}_{qg} = \frac{B_c - B^d_{qg}}{T_c - T^c_g} - \frac{B_c - (B^d_{qg} + B^{err}_{qg})}{T_c - T^c_g} = \frac{B^{err}_{qg}}{T_c - T^c_g} \quad [8]$$

It can be seen that this error is proportional to the error resulting from the linear interpolation at the time when the next group of pictures to be delivered is decoded, and is inversely proportional to the time to the next "additional critical point". One would expect the error to increase as this point is approached, up to the point when it no longer remains the most critical point on the cumulative bit curve.

Figure 22:
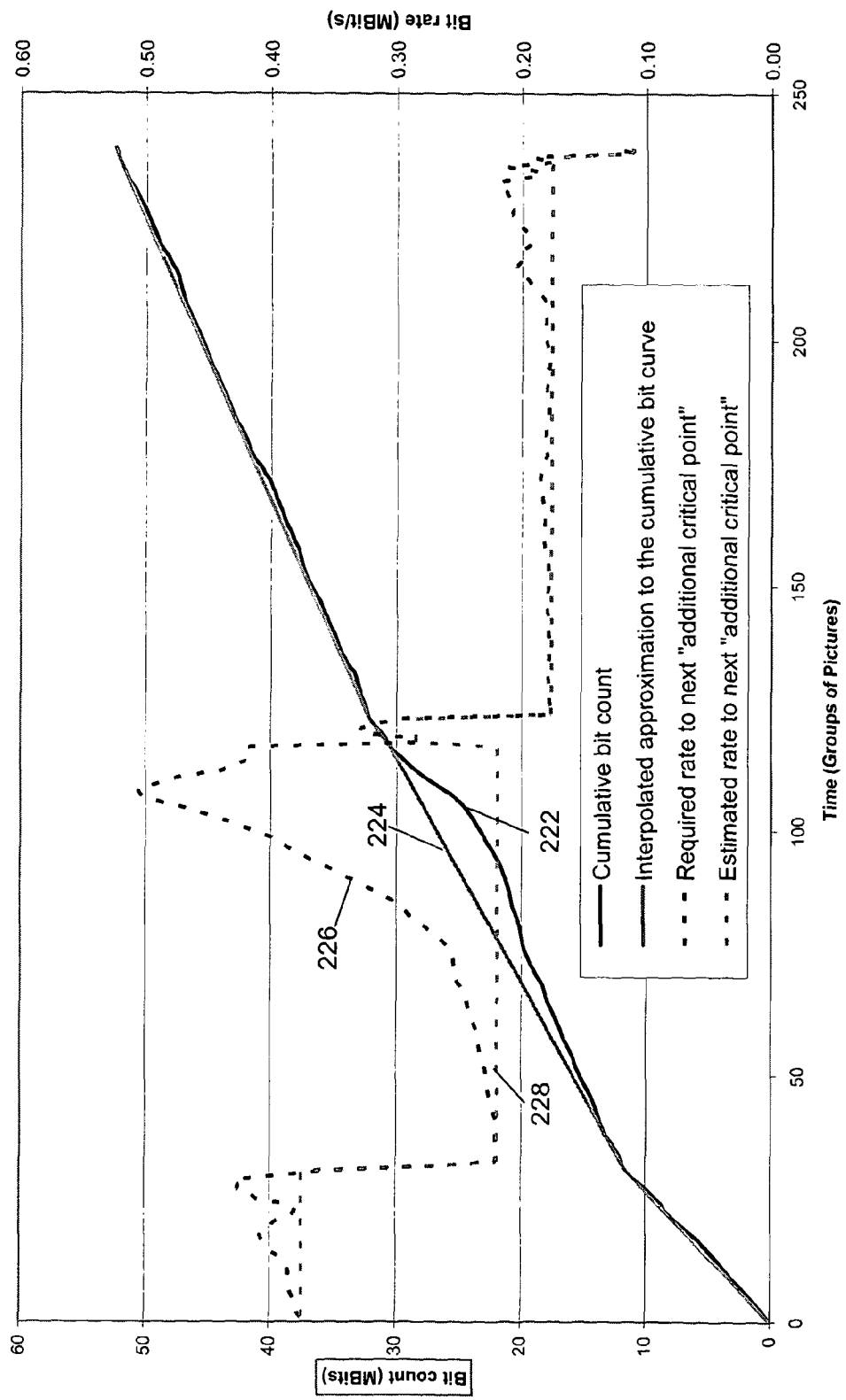
FIG. 22 shows for a real video sequence the cumulative bit curve and the approximation of that curve found by interpolation between pairs of "additional critical points" on it, as well as the actual required delivery rate and the estimated required delivery rate when no data is buffered at the client.

FIG. 22 illustrates this for a real video sequence. It shows the cumulative bit curve (222) and the approximation of that curve found by interpolation (224) between pairs of "additional critical points" on it. It also shows the actual required delivery rate (226) and the estimated required delivery rate (228) when no data is buffered at the client. It can be seen that the error in the estimated required delivery rate is large when there is a large difference between the cumulative bit curve and its approximation, and as an "additional critical point" is approached. It can also be seen that the estimated required delivery rate stays constant for significant numbers of consecutive groups of pictures: this is to be expected when the cumulative bit curve is linear between "additional critical points" and no data is buffered at the client. In the worst case, the estimated required delivery rate is less than 44% of the actual required delivery rate. This would cause serious problems to a video streaming system, as it could lead to the conclusion that there was sufficient bit rate over the network to deliver a given quality of video when in fact there was not, and at some future time the video play back might stall.

Consequently we reject approximating the cumulative bit curve by linear interpolation between points already specified in the pre-calculated data on the grounds that this tends to underestimate the required delivery bit rate, and often to a very significant extent.

While it would be possible to simply include more samples of the cumulative bit curve in the pre-calculated data, for example in the tables holding the DCPs and ACPs, unless these extra points were distinguished from the "additional critical points", they would have to be tested when calculating required delivery rates. Instead, in embodiments of the invention we include in the pre-calculated data a set of points, not necessarily on the cumulative bit curve, which when joined by linear interpolation, give an approximation of the cumulative bit curve which when used to calculate required delivery rates always produces a result that is greater than or equal to the actual required rate, but only greater to a limited, specifiable, extent. Thus such calculated delivery rates are safe, in that if the bit rate over the network is at least this calculated value, then the video stream can be delivered in a timely fashion, and the calculated value is not so high as to unnecessarily limit the quality of video that is selected for transmission.

Hence we wish to define a set of points, such that when joined by linear interpolation to give an approximation of the cumulative bit curve, results in estimated required delivery rates that satisfy Equation 9, where K is a constant. In tests we have found that setting the value of K to 0.1 gives good performance.

$$R^r_{qg} \leq R^{est}_{qg} \leq (1+K) \cdot R^r_{qg} \quad [9]$$

Figure 23:
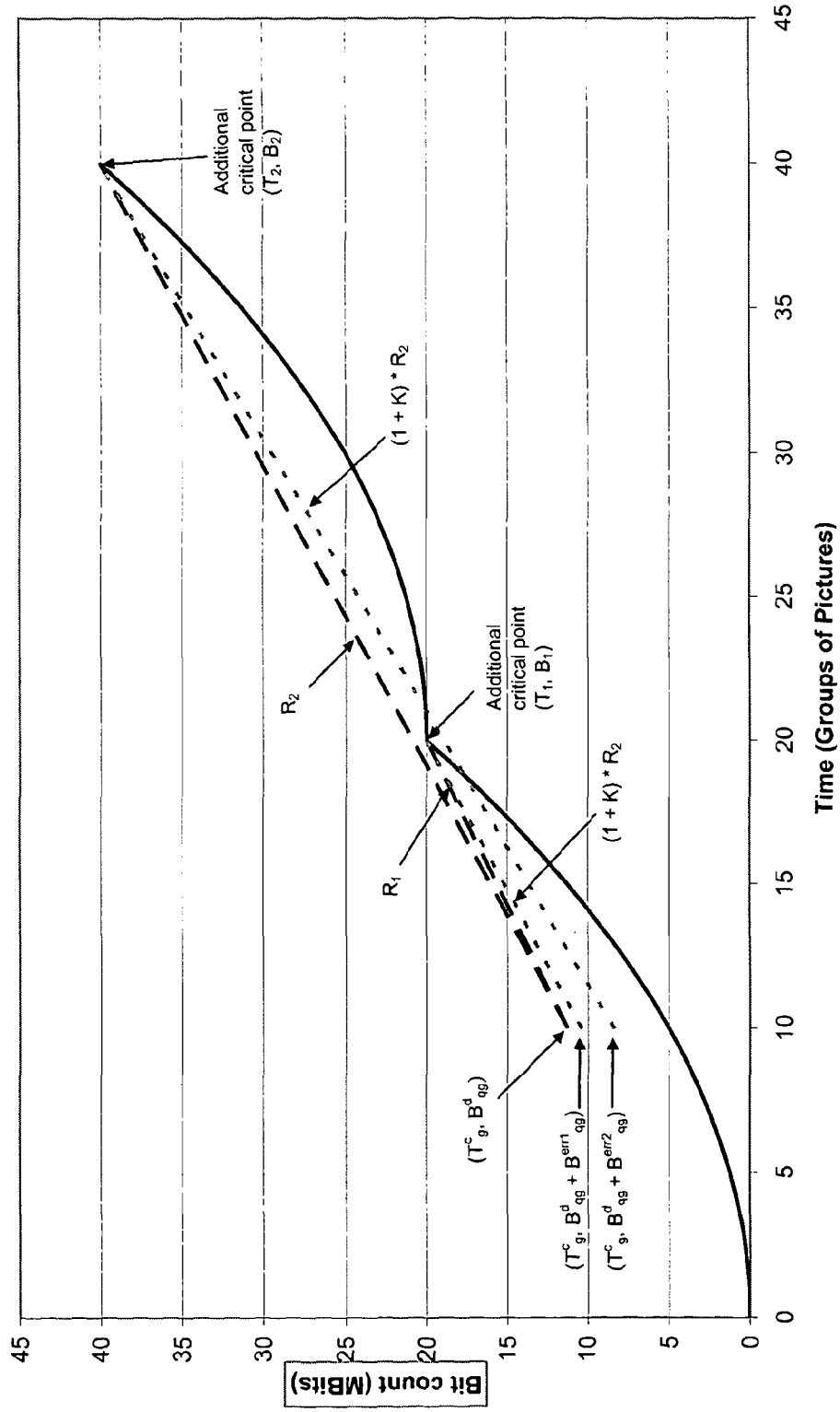
FIG. 23 shows a cumulative bit curve, two "additional critical points", a current delivery point, delivery rates to satisfy those "additional critical points", delivery schedules back from those points at a rate slightly greater than the higher of the two rates, and the resulting two bounds on the cumulative bit curve at the current delivery time.

FIG. 23 shows an example of how the constraint of Equation 9 can be used to determine a bound on the cumulative bit curve. It shows a cumulative bit curve, two "additional critical points", $(T_1, B_1)$, and $(T_2, B_2)$, and a current delivery point, $(T^c_g, B^d_{qg})$. The delivery rates to satisfy those points are labelled as $R_1$ and $R_2$, with $R_2$ being the greater and hence the one that determines the required delivery rate, $R^r_{qg}$=Max($R_1$, $R_2$)=$R_2$. The upper bound on the required delivery rate is calculated from Equation 9 as $R^{est}_{qg}$=(1+K)*$R_2$. This rate is then applied back from each of the two "additional critical points" to the current time to get two bounds on the cumulative bit curve at the current delivery time: $(T^c_g, B^d_{qg}+B^{err1}_{qg})$ and $(T^c_g, B^d_{qg}+B^{err2}_{qg})$. The one with the higher vertical coordinate of these two is taken as the actual bound on the cumulative bit curve, so that if that bound were used to calculate the required delivery rate, the resulting estimated delivery rate would satisfy Equation 9. Note in FIG. 23, if the bound with the lower vertical coordinate were chosen, then the rate to $(T_1, B_1)$ would be more than (1+K)*$R_2$, and Equation 9 would not be satisfied.

Specifically, we can calculate the rates $R_1$ and $R_2$, as in Equation 10, where $S_g$ is the amount of data buffered at the client in terms of the time, as given by Equation 11.

$$R_1 = \frac{B_1 - B^d_{qg}}{T_1 - T^d_g + S_g} \quad [10]$$

$$R_2 = \frac{B_2 - B^d_{qg}}{T_2 - T^d_g + S_g}$$

$$S_g = T^d_g - T^c_g \quad [11]$$

Let us assume that $R_2$>$R_1$, as is the case in FIG. 23, and hence that in the worst case $R^{est}_{qg}$=(1+K)*$R_2$. We can then calculate two bounds, i=1, 2, on the cumulative bit curve at the current delivery time, $T^c_g$, as given by Equation 12.

$$B_{qg}^d + B_{qg}^{erri} = B_i - (T_i - T_g^d + S_g) \cdot (1+K) \cdot \frac{B_2 - B_{qg}^d}{T_2 - T_g^d + S_g} \quad [12]$$

As noted above, we must choose the larger of these two values as the actual bound on the cumulative bit curve. If this occurs for i=2, it can be seen that the denominator cancels with the same term in the numerator, and the result is independent of the value of $S_g$, the actual amount of time buffered. Otherwise the result does depend on this value.

This may initially seem to be a problem, but in practice this is not the case. As we have calculated the "additional critical points" with a constraint on the amount of time buffered, termed $S_{max}$, we are not actually guaranteed to be able to calculate a required delivery rate using only the "additional critical points" when the amount of time buffered is less than this amount, and hence we do not need to consider values of $S_g$ smaller than $S_{max}$ in Equation 12. Hence we evaluate Equation 12 with $S_g=S_{max}$. We observe that as $S_g$ is increased from the value of $S_{max}$, we obtain lower values for the bound on the cumulative bit curve, which can be ignored as the actual bound is given by the largest of all individual bounds. This is easily observed when drawn on a graph, such as one like FIG. 23. When $S_g=S_{max}$, $R^r_{qg}=Max(R_i)$, $R^{est}_{qg}>R^r_{qg}$, and we draw lines of slope $R^{est}_{qg}$ through each of the "additional critical points", the highest of these parallel lines must go through one of the "additional critical points" on or to the left of the one that led to the maximum rate $R^r_{qg}$. Hence in a generic form of Equation 12, that is, when there may be more than two "additional critical points", with potentially one or more greater than $T_2$, and potentially one or more less than $T_2$, the index i which leads to the highest value of $B^d_{qg}+Be^{erri}_{qg}$ in Equation 12 must be such that $T_i \le T_2$. And in this case it is clear that as $S_g$ increases, the term $B^d_{qg}+B^{erri}_{qg}$ decreases.

In the case that values of $S^{min}_g$ are stored in the pre-calculated data for each group of pictures (as described in our co-pending EP10252204.2), it would be better to evaluate Equation 12 with $S_g=S^{min}_g$. As before, this value of $S_g$ would provide the actual bound on the cumulative bit curve that leads to Equation 9 being satisfied, and larger values of $S_g$ would not need to be considered. However this would lead to tighter bounds on the cumulative bit curve than when using $S_g=S_{max}$, and hence would require more data to describe the cumulative bit curve. Also, if values of $D_{qg}$, the delivery rate needed if no time were buffered at the decoder, were stored in the pre-calculated data for each group of pictures to allow delivery rates to be calculated or interpolated for any amount of buffered data, then Equation 12 should be evaluated with $S_g=0$.

This method, when using $S_g=S_{max}$, of defining a bound on an approximation of the cumulative bit curve, such that when the bound is used in place of the actual cumulative bit curve the calculated required delivery rate satisfies Equation 9, that is, the calculated rate is no less than the actual required rate and no more than a specified factor above it, is described formally as follows for a single encoding quality, q.

The amount of data $b_{qg}$ generated for each group of pictures (g=1 ... G) has already been calculated. Let c be an index (c=1 ... C) into the set of "additional critical points", calculated for example using the process starting at step 500, ordered in increasing time order. Let $S_{max}$ be the maximum value of the parameter $S^{min}_g$, measured in group of pictures periods, that was used in the calculation of the "additional critical points".

600 Set a group of pictures index g=1. Set a cumulative bit count B=0.

605 Set the required bit rate parameter $R^r_{qg}=0$. Set c=1.

610 Let $T_c$ be the index of the group of pictures of the critical point with index c, at which the cumulative bit count is $B_c$ bits.

615 If $T_c<g$, go to step 630.

620 Calculate $R_c$, the delivery rate required to deliver from and including group of pictures g to the "additional critical point", c:

$$R_c = \frac{B_c - B}{T_c - g + 1 + S_{max}} \quad [13]$$

625 If $R_c>R^r_{qg}$, set $R^r_{qg}=R_c$

630 Set c=c+1. If c≤C, that is, if c is a valid index, go to step 610.

635 Set the upper bound on an estimated required delivery rate, $R^{est}_{qg}$:

$$R^{est}_{qg}=(1+K) \cdot R^r_{qg} \quad [14]$$

640 Set c=1. Set an upper bound on the cumulative bit curve estimate $B^{est}_{qg}$ equal to a large negative value, such as the total number of bits in the encoded video sequence multiplied by minus one.

645 If $T_c<g$, go to step 660.

650 Calculate the number of bits, $B_{cqg}$, at time g, such that if further bits were delivered at rate $R^{est}_{qg}$, by time $T_c$, a total of $B_c$ bits would have been delivered:

$$B_{cgg}=B_c-(T_c-g+1+S_{max}) \cdot R^{est}_{qg} \quad [15]$$

655 If $B_{eqg}>B^{est}_{qg}$, set $B^{est}_{qg}=B_{cqg}$

660 Set c=c+1. If c≤C, that is, if c is a valid index, go to step 650.

665 The desired bound on the cumulative bit curve for group of pictures g is $B^{est}_{qg}$.

670 Set $B=B+b_{qg}$

675 Set g=g+1. If g G, go to step 605, otherwise terminate.

Figure 24:
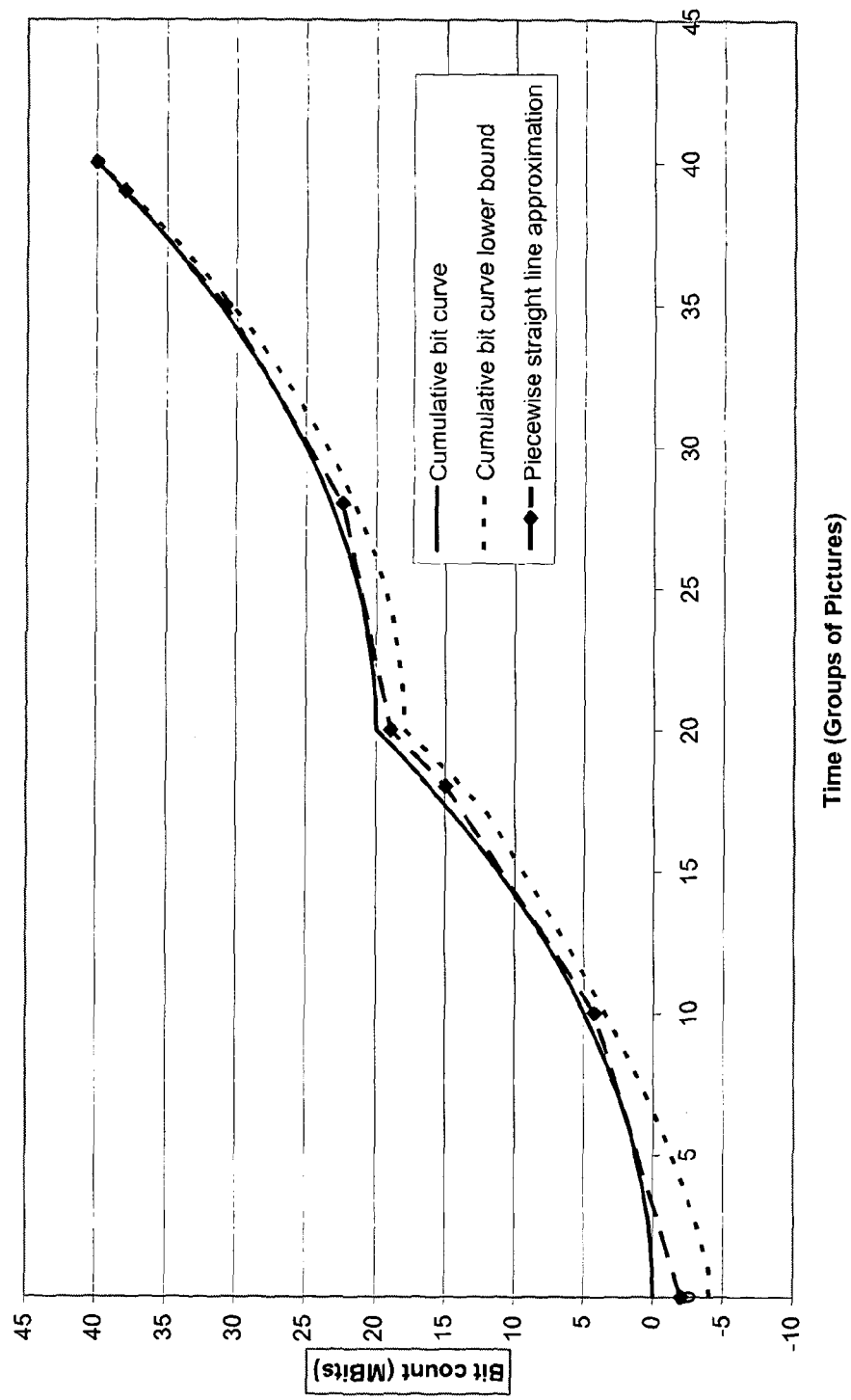
FIG. 24 shows a cumulative bit curve and a lower bound on it, and a piecewise straight line approximation of the cumulative bit curve that lies between the curve itself, and the lower bound.

We now have two bounds for the cumulative bit curve. The upper bound is the actual curve itself, and the lower bound is as calculated by the process described above starting at step 600. FIG. 24 provides an example, showing a cumulative bit curve and a lower bound on it, and a piecewise straight line approximation of the cumulative bit curve that lies between the curve itself, and the lower bound. The lower bound was calculated with $S_{max}$=5.0 group of picture periods. The eight points that define the piecewise straight line are marked with diamonds. In this case the piecewise straight line was identified by trying to join the points that are halfway between the curve and the lower bound, making each segment as long as possible, such that it remains on or within the bounds.

It can be noted that the piecewise straight line is initially below zero. It is possible for the client to detect this and apply the better approximation of zero. This is an example of a more generic improvement that the client can make. The client will know the actual cumulative bit curve at points contained in the pre-calculated data, for example the "additional critical points", and will know that at such times and at later times, the cumulative bit curve can not be lower than these known actual values. The client can therefore make a better approximation to the cumulative bit curve as the higher of the piecewise straight line and the most recent point in the pre-calculated data.

We will now describe two methods to generate a piecewise straight line that is within these two bounds, for a single encoding quality, q.

The first method we describe is a generalization of the method used to generate the piecewise straight line of FIG.

24: we join points that are a specified fraction of the way between the two bounds, making each segment as long as possible. We refer to this method as the "variable mid point" method.

700 Initialize the value of a mid-point fraction, f, in the range 0 to 1. Let g be the index of a group of pictures, and let $B_g$ be the cumulative bit count for group of pictures g (g=1 . . . G), for encoding at quality q, as given by $$B_g = \sum_{j=1}^{g} b_{qj},$$

and let $B_0=0$. Let the lower bound on the cumulative bit curve for group of pictures g, for encoding at quality q, be $B^L_g$, which could be calculated as $B^{est}_{qg'}$, with g'=g+1, using the process starting at step 600. Initialize a set of defining points on the piecewise straight line to be empty.

705 Set the point ($P_x$, $P_y$) as follows, and add this point to the set of defining points on the piecewise straight line:

$$P_x=0 \; P_y=f \cdot B_o + (1-f) \cdot B_0^L \qquad [16]$$

710 Set a group of pictures index g=1.
715 Set the next potential defining point on the piecewise straight line, ($N_x$, $N_y$), as:

$$N_x=g \; N_y=f \cdot B_g + (1-f) \cdot B_g^L \qquad [17]$$

720 Set a validity flag V=1. Set another group of pictures index h=$P_x$+1.
725 Calculate the vertical coordinate, Y, at group of pictures h on the piecewise straight line from ($P_x$, $P_y$) to ($N_x$, $N_y$):

$$Y = P_y + \frac{(N_y - P_y) \cdot (h - P_x)}{(N_x - P_x)} \qquad [18]$$

730 Check whether Y is outside of the two bounds for the cumulative bit curve. If (Y>$B_h$) or (Y<$B^L_h$), set the validity flag V=0, and go to step 740.
735 Set h=h+1. If h<$N_x$, go to step 725, otherwise go to step 745.
740 We have determined that the straight line from ($P_x$, $P_y$) to ($N_x$, $N_y$) does not stay within the two bounds, as it is beyond one of the bounds at group of pictures h. Therefore the straight line from ($P_x$, $P_y$) must terminate at the previous value of g, that is, at g−1. Set ($P_x$, $P_y$) accordingly as follows, and add this point to the set of defining points on the piecewise straight line:

$$P_x=g-1 \; P_y=f \cdot B_{g-1} + (1-f) \cdot B_{b-1}^L \qquad [19]$$

745 Set g=g+1. If g≤G, go to step 715.
750 Add the point ($N_x$, $N_y$) to the set of defining points on the piecewise straight line.
755 Terminate.

Figure 25:
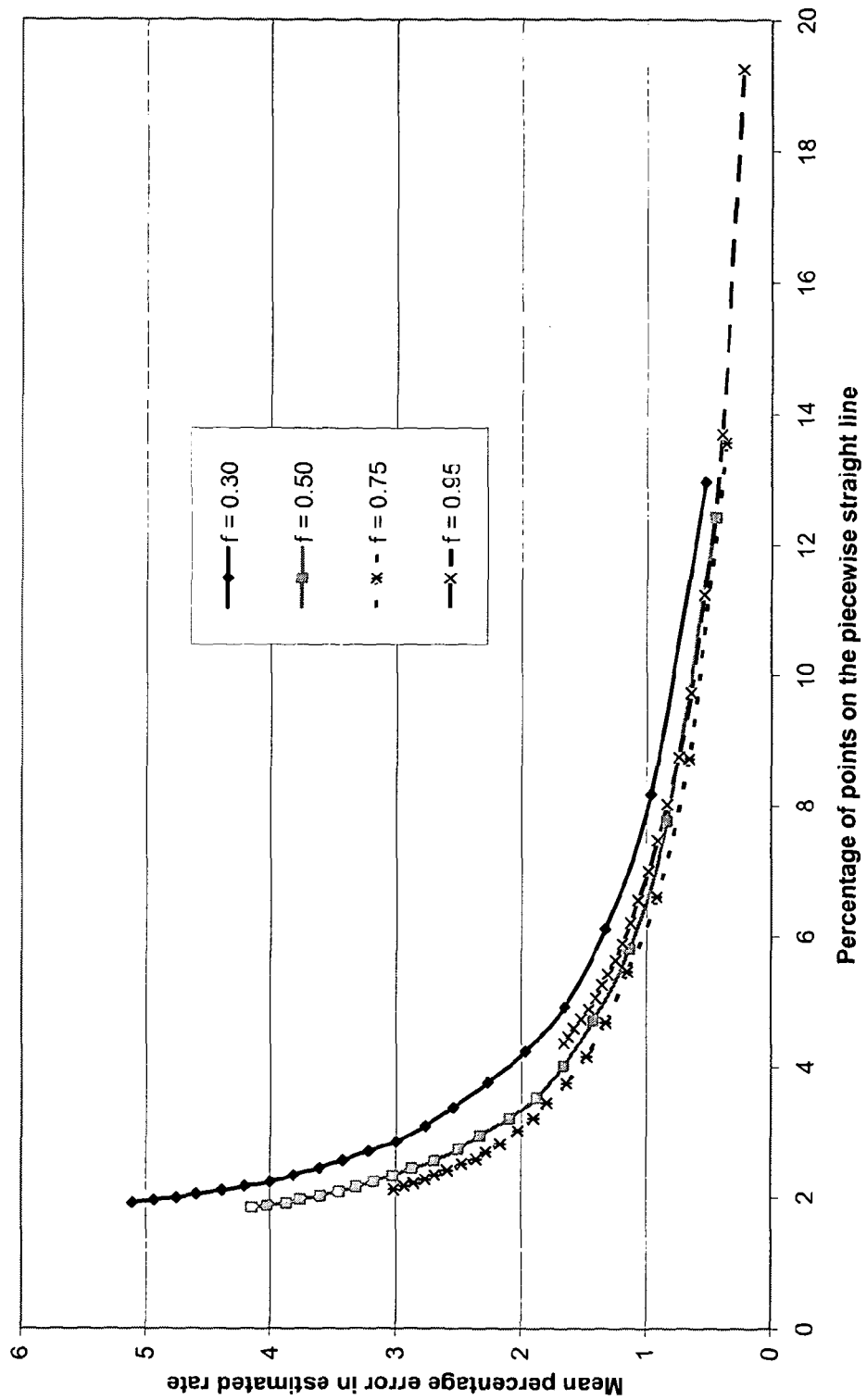
FIG. 25 shows the effect of varying the mid-point fraction, f, on the relationship between the mean number of points on the piecewise straight line and the mean percentage error in the estimated required delivery bit rate, averaged over 19 real video sequences.

FIG. 25 shows the effect of varying the mid-point fraction, f, averaged over 19 real video sequences when $S_{max}$ is set to 5.0 seconds. The lower bound to the cumulative bit curve was generated with various values of the constant K from Equation 9, that is, with different tolerances on the calculated required delivery rate, with K in the range 0.01 to 0.20. The mean number of points on the piecewise straight line, expressed as a percentage of the number of groups of pictures, is plotted on the horizontal axis. The vertical axis plots the mean percentage error in estimated required delivery bit rate, calculated for start up delays of 5.0 seconds. It can be seen that by setting the value of f to 0.75, good performance is achieved.

Figure 26:
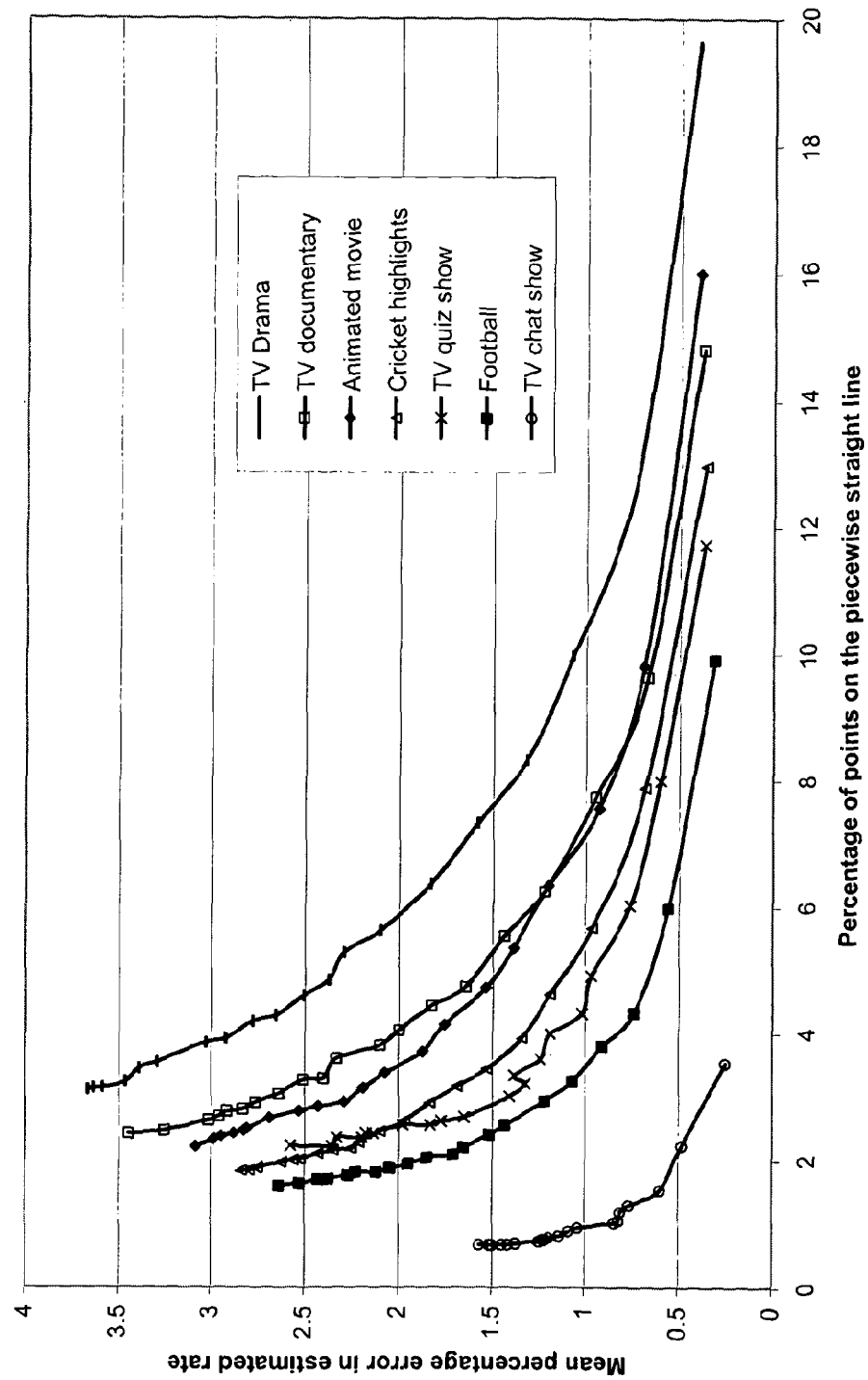
FIG. 26 shows the relationship between the mean number of points on the piecewise straight line and the mean percentage error in estimated required delivery bit rate for seven video sequences when f=0.75.

FIG. 26 shows the relationship between the mean number of points on the piecewise straight line and the mean percentage error in estimated required delivery bit rate for seven video sequences when f=0.75, and otherwise the same conditions as with FIG. 25 are used. It can be seen that there is significant difference between the sequences, but even in the worst case, it is possible to constrain the mean percentage error in estimated required delivery bit rate to 3% by approximating the cumulative bit curve with a piecewise straight line defined by a number of points equal to 4% of the number of groups of pictures in the video sequence.

We have studied variations on this method to provide alternative embodiments. In one such alternative embodiment, which we refer to as the "Forward" method, we remove the restriction that the line segments must end at the same fraction of the distance between the cumulative bit curve and the lower bound on it. We proceed as follows. We set the first point on the piecewise straight line as in the process starting at step 700 with f=0.5. We then for each subsequent group of pictures calculate the rate required to reach the point on the cumulative bit curve, and the rate required to reach the point on the lower bound. We remain the minimum of the former and the maximum of the latter and proceed until the said maximum is greater than the said minimum, at which point we back track one group of pictures and end the line segment at that time. The slope of that line segment can be chosen as anywhere on and between the maximum and minimum rates calculated for the said previous group of pictures: in our experiments we used the mean of the two rates. This point is then the starting point for the next line segment.

In a second alternative embodiment, which we refer to as the "Backward" method, we follow exactly the same process as the first alternative method, the "Forward" method, but instead of starting at the beginning of the video sequence and working towards the end, we start at the end and work towards the beginning. The reasoning behind using this method is that the cumulative bit curve and the lower bound tend to be closer at the end of a sequence than at the start, and hence by starting at the end we might obtain a piecewise straight line on and between the bounds with less defining points on it.

We will now describe a yet further embodiment to generate a piecewise straight line on and between the cumulative bit curve and the lower bound on it. We refer to it as either the "Two step 1" method or the "Two step 2" method, according to whether we test for so-called "next_end" points on just the cumulative bit curve or on both it and the lower bound on it, as will be described later.

Figure 27:
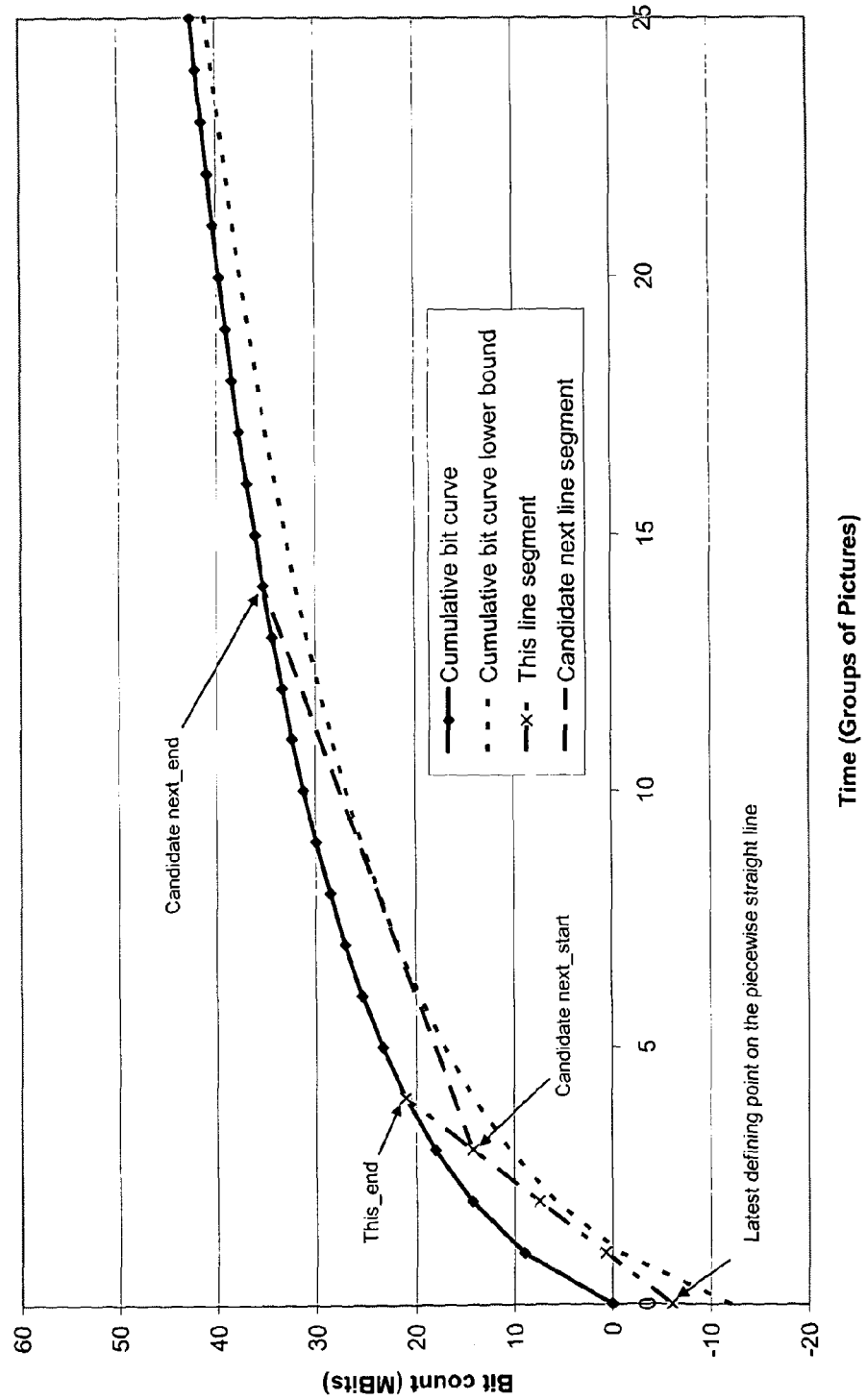
FIG. 27 illustrates the principle behind the methods "Two step 1" and "Two step 2" for finding a piecewise approximation to the cumulative bit curve that lies on and between the cumulative bit curve and the lower bound on it.

FIG. 27 illustrates the principle behind these methods. It shows a cumulative bit curve and the lower bound on it, and the latest defining point on the piecewise approximation to the cumulative bit curve which lies on or between the bounds, the said point having the approximate coordinates (0, −6). This corresponds to a starting point halfway between the CBC and the lower bound for GoP 0. We then find the longest line segment from this point to the cumulative bit curve when using the "Two step 1" method, or the longest line segment from this point to either the cumulative bit curve or the lower bound when using the "Two step 2" method, measuring the length only in the time dimension. The end of this line segment is labelled as "This_end" in FIG. 27. From each point on this line segment with integer horizontal coordinate measured in group of pictures periods, one such point being labelled as "Candidate next_start" in FIG. 27, we again find the longest line segment to the cumulative bit curve in the "Two step 1"

method and the longest line segment from this point to either the cumulative bit curve or the lower bound in the "Two step 2" method, measuring the length only in the time dimension. The longest such line segment from the given "Candidate next_start", which happens to end at point labelled "Candidate next_end", is shown in FIG. 27. After consideration of all possible points "Candidate next_start", we select the one that leads to the "Candidate next_end" with largest group of pictures index, and add it (i.e. "Candidate next_start") to the set of defining points on the piecewise straight line. We then iterate the process, noting that the optimal line segment ending at "Candidate next_end" on one iteration becomes the line segment ending at "This_end" on the next iteration, without the need for it to be calculated again.

We will now formally describe the "Two step 2" method. The "Two step 1" method can be implemented by simply omitting step 856; however, it could be further simplified by the removal of the variables curve_count and best_curve_count and any logic processed when their values are non zero.

800 Let g be the index of a group of pictures, and let $B_b$ be the cumulative bit count for group of pictures g (g=1 ... G), for encoding at quality q, as given by $$B_g = \sum_{j=1}^{g} b_{qj},$$

and let $B_0$=0. Let the lower bound on the cumulative bit curve for group of pictures g, for encoding at quality q, be $B^L_g$, which could be calculated as $B^{ext}_{qg'}$, with g'=g+1, using the process starting at step 600. Initialize a set of defining points on the piecewise straight line to be empty.

803 Set the point ($P_x$, $P_y$) as follows, and add this point to the set of defining points on the piecewise straight line:

$$P_x=0 \; P_y=0.5 \cdot B_o + 0.5 \cdot B_0^L \quad [20]$$

806 Initialize the following variables: set a "first time" flag F=1, and set the variables best_next_start_x, best_next_start_y, best_next_end_x and best_curve_count to zero.

810 Set the variable this_end_x=best_next_end_x. If F equals 1 set the variable this_end_y=$P_y$, otherwise set it according to the value of best_curve_count as follows: if best_curve_count is zero set this_end_y=$B_{this\_end\_x}$ otherwise set this_end_y=$B^L_{this\_end\_x}$.

813 Set the variables best_next_start_x and best_next_end_x to zero.

816 Set the variable next_start_x=$P_x$.

820 If F equals 1, set the variable next_start_y=this_end_y, and go to step 830.

823 If next_start_x=P, go to step 863. Note that if it is not the first time, we do not consider starting the next segment from the same point as the current segment.

826 Calculate next_start_y as follows:

$$\text{next\_start\_y} = P_y + \frac{(\text{this\_end\_y} - P_y) \cdot (\text{next\_start\_x} - P_x)}{(\text{this\_end\_x} - P_x)} \quad [21]$$

830 Set the variable next_end_x=next_start_x+1

833 Set the variable curve_count to 0. This indicates that we are aiming for the cumulative bit curve when it is 1 and for the lower bound when it is 1.

836 If curve_count equals 0, set next_end_y=$B_{next\_end\_x}$ otherwise set next_end_y=$B^L_{next\_end\_x}$.

840 Set a validity flag V=1. Set the variable h equal to next_start_x+1.

843 Set the variable Y as follows:

$$Y = \text{next\_start\_y} + \frac{(\text{next\_end\_y} - \text{next\_start\_y}) \cdot (h - \text{next\_start\_x})}{(\text{next\_end\_x} - \text{next\_start\_x})} \quad [22]$$

846 Check whether Y is outside of the two bounds for the cumulative bit curve. If (Y>$B_h$) or (Y<$B^L_h$), set the validity flag V=0, and go to step 856.

850 Set h=h+1. If h<next_end_x, go to step 843.

853 If V=1 and (next_end_x>best_next_end_x), do the following variable assignments. That is, if this is a valid segment and has a later endpoint than any other segment found so far, update the variables.
best_next_start_x=next_start_x;
best_next_start_y=next_start_y;
best_next_end_x=next_end_x;
best_curve_count=curve_count;

856 If V=0 and curve_count=0, set curve_count=1 and go to step 836. That is, if we have tested for curve_count=0 (aiming for the cumulative bit curve) and have not found it to be a valid line segment, then test for curve_count=1 (aiming for the cumulative bit curve lower bound), otherwise continue to the next value of next_end_x.

860 Set next_end_x=next_end_x+1. If next_end_x≤G, go to step 833.

863 Set next_start_x=next_start_x+1. If next_start_x≤this_end_x, go to step 820.

866 If F=0, that is if the first time, set F=1, and go to step 810.

870 Set ($P_x$, $P_y$) as follows, and add this point to the set of defining points on the piecewise straight line:

$$P_x=\text{best\_start\_}x \; P_y \text{best\_next\_start\_}y \quad [23]$$

873 If best_next_end_x+1≠G, go to step 810.

876 Set ($P_x$, $P_y$) as follows, as the last point on either the curve or the bound, and add it to the set of defining points on the piecewise straight line:

$$\text{if best\_curve\_count=0: } P_x=\text{best\_next\_end\_}x \; P_y=B_{P_x}$$

$$\text{otherwise: } P_x=\text{best\_next\_end\_}x \; P_y=B_{P_L} \quad [24]$$

880 Terminate.

We will now describe some experimental results obtained by using these methods, referred to as "f=0.5", "f=0.75", "Forward", "Backward", Two step 1", and "Two step 2", when used on 19 real video sequences, with the parameter $S_{max}$ equal to 5 seconds, and with 20 values of the parameter K, uniformly linearly spaced between 0.01 and 0.20 inclusive, presenting the results as averages over all sequences for a given value of K and a given method of calculating a piecewise approximation to the cumulative bit curve that satisfies Equation 9.

Figure 28:
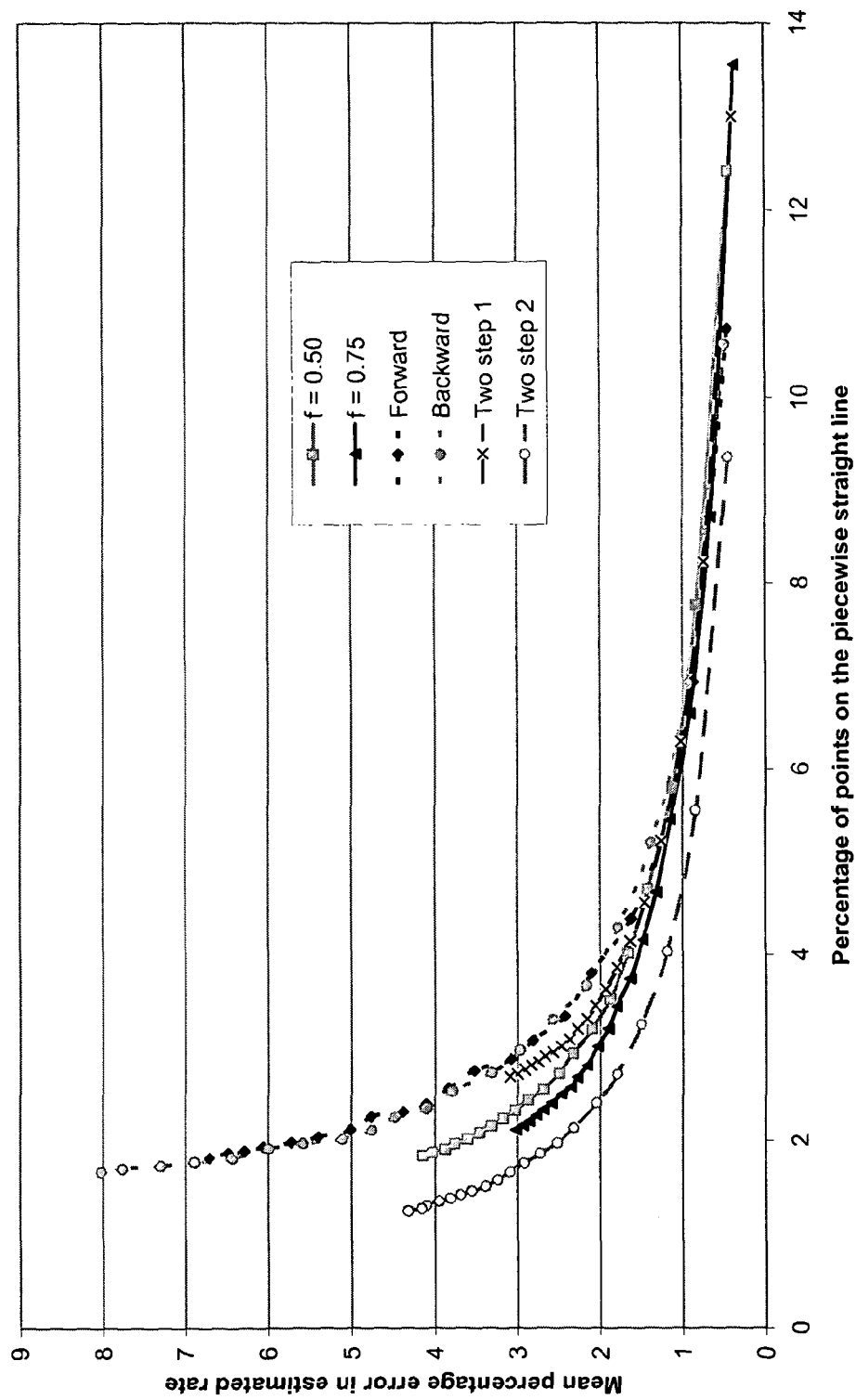
FIG. 28 shows an example of the variation of the mean percentage error in the estimated required delivery rate with the number of points required to define the piecewise approximation to the cumulative bit curve, expressed as a percentage of the number of groups of pictures in the video sequence.

FIG. 28 shows the variation of the mean percentage error in the estimated required delivery rate with the number of points required to define the piecewise approximation to the cumulative bit curve, expressed as a percentage of the number of groups of pictures in the video sequence. Good performance is indicated by a low error in the rate for a given number of points. Consequently it can be seen that the "Two step 2" method provides the best performance followed by the "f=0.75" method, that is, the method defined starting at step 700 with the parameter f set to the value of 0.75. It should be noted that the maximum percentage error in the estimated required delivery rate is usually very close to 100 times the parameter K used in the calculation.

Figure 29:
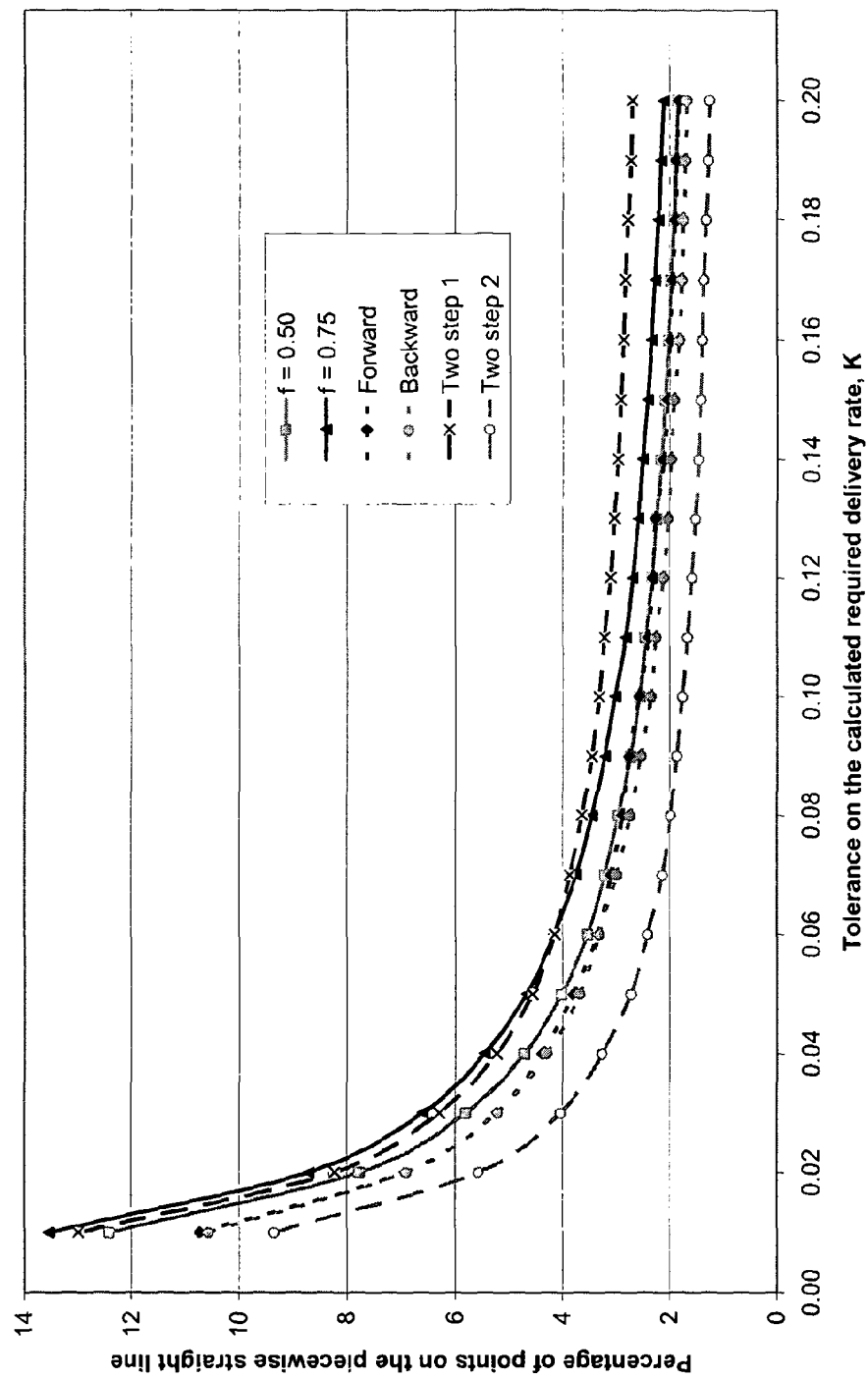
FIG. 29 shows an example of the variation of the number of points required to define the piecewise approximation to the cumulative bit curve, expressed as a percentage of the number of groups of pictures in the video sequence, with the parameter K, the tolerance on the calculated required delivery rate.

FIG. 29 shows the variation of the number of points required to define the piecewise approximation to the cumulative bit curve, expressed as a percentage of the number of groups of pictures in the video sequence, with the parameter K, the tolerance on the calculated required delivery rate, which we have noted above is very close to 0.01 times the maximum percentage error in the estimated required delivery rate. Good performance is indicated by a low number of points for a given tolerance. Consequently it can be seen that the "Two step 2" method provides the best performance followed by the "Backward" method.

Figure 30:
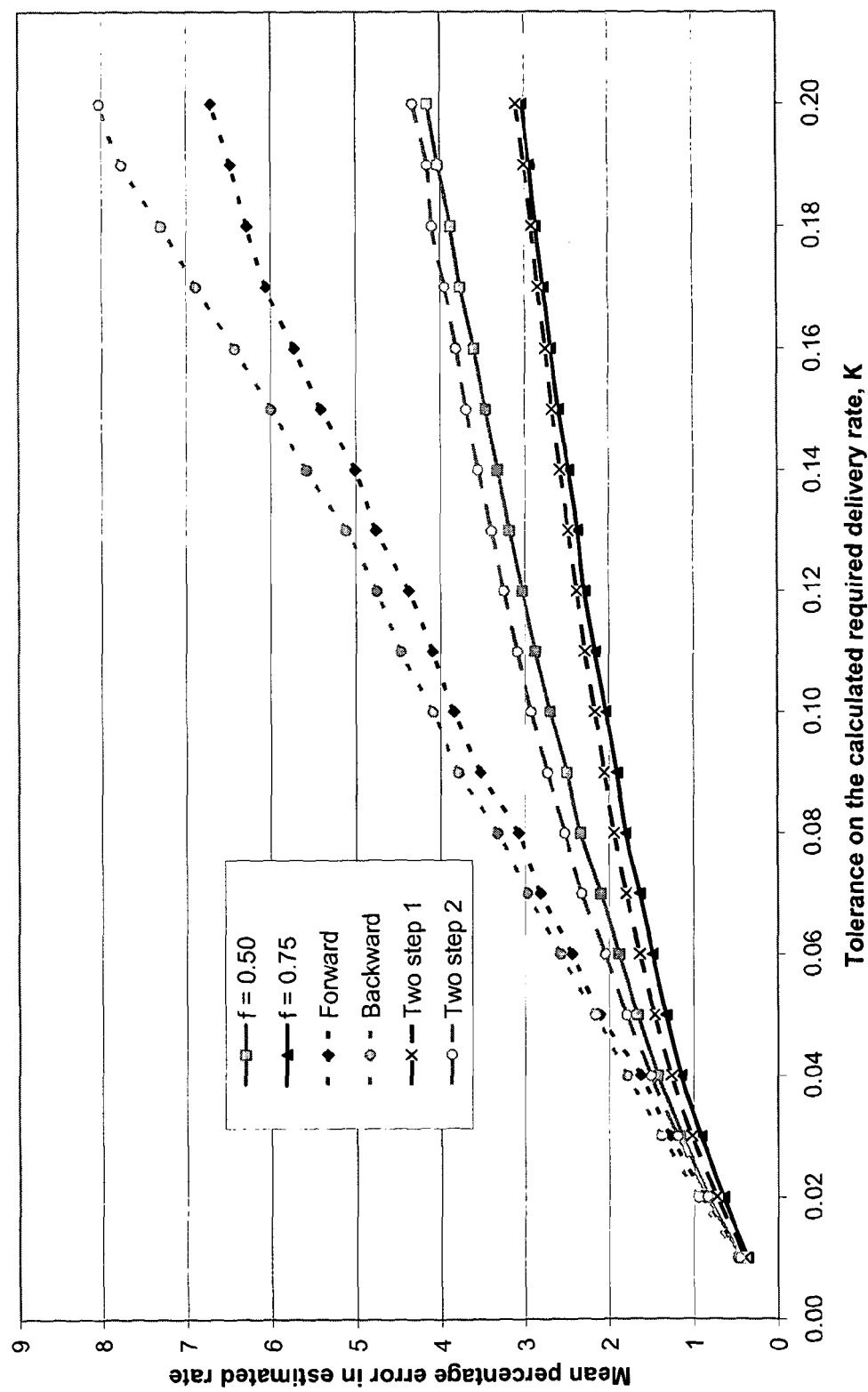
FIG. 30 shows an example of the variation of the mean percentage error in the estimated required delivery rate with the parameter K, the tolerance on the calculated required delivery rate.

FIG. 30 shows the variation of the mean percentage error in the estimated required delivery rate with the parameter K, the tolerance on the calculated required delivery rate. Good performance is indicated by a low error in the rate for a given tolerance. Consequently it can be seen that the "f=0.75" method provides the best performance followed by the "Two step 1" method.

Although there is no clear best performing method, we prefer the "f=0.75" method as a low complexity method, and the "Two step 2" method as a higher complexity method.

Therefore, in embodiments of the invention any of the above described methods are used to produce a compact rate-constrained description of the cumulative bit curve, which is then stored as the encoded video meta data 1024, 2102, and provided to the video client in the manner described previously. With respect to the form of the encoded video meta data, as described previously the form of the meta data is different in embodiments of the invention than described previously in respect of FIG. 3, and instead may for example take the form shown in FIG. 31. Here, the table 300 in FIG. 31(*a*) contains data relating to downstairs points, and in particular gives the GoP location of each downstairs point for a particular quality. In addition, the actual downstairs rate required from each downstairs point is given, although in another embodiment the CBC count could instead be given, leaving the client to calculate the downstairs rate by interpolation.

In addition to the downstairs critical point information, table 304 in FIG. 310(*c*) contains information relating to the additional critical points. Here, for each critical point of index i, the GoP position on the CBC is given (as in FIG. 3), but in addition the actual CBC count at the position is also given. This is because it is better for accurate CBC count information to be used for rate calculations to and from additional critical points, rather than interpolated count information. Within FIG. 3, because the actual CBC count at each GoP is available from table 30, there is no need for CBC count information to also be provided in table 32 relating to the ACPs.

The compact description of the CBC is then given in table 302 in FIG. 31(*b*). Here, a number of indexed GoP positions are given, together with the cumulative bit counts at each position. As will be seen, the bit counts monotonically increase, as expected.

It should be noted that the tables 300, 302, and 304 represent the data for a single quality; corresponding tables would be provided for each quality available for a particular item of video content.

An example of the meta data derived from a real video file is in the table below. For each quality of encoding, there is data indicating: the stream name (eqvs:stream_name), the average bit rate (eqvs:av_bit_rate), the average quality (eqvs: av_imos), the downstairs delivery rates and the groups of pictures from which they apply (eqvs:dsr), the "additional critical points" (eqvs:acp), and the points describing the cumulative bit curve (eqvs:cbc). The table shows two sets of data for two different quality levels (stream names JR_imos27.csv and JR_imos32.csv).

```
eqvs: eqvs:Namespace/ (0x80000000 :
schema)
    eqvs:type = "vbr"
    eqvs:frame_rate = "25"
    eqvs:number_of_gops = "3704"
    eqvs:frames_per_gop = "24"
    eqvs:acp_sud = "5.00"
    eqvs:rate_error_factor = "1.10"
    eqvs: stream_array (0x600 : isOrdered
isArray)
        [1] (0x100 : isStruct)
            eqvs: stream_name = "JR_imos27.csv"
            eqvs:av_bit_rate = "260961"
            eqvs:av_imos = "27"
            eqvs:dsr (0x600 : isOrdered
isArray)
                [1] = "0,373"
                [2] = "31,348"
                [3] = "32,261"
                [4] = "3700,95"
            eqvs:acp (0x600 : isOrdered
isArray)
                [1] = "31,11419768"
                [2] = "121,30191720"
                [3] = "127,31812712"
                [4] = "447,88405168"
                [5] = "1310,228601984"
                [6] = "1335,235921536"
                [7] = "3624,878242904"
                [8] = "3597,926472176"
                [9] = "3698,927200360"
                [10] = "3699,927643896"
                [11] = "3703,928007552"
            eqvs:cbc (0x600 : isOrdered
isArray)
                [1] = "0,-9203"
                [2] = "17,5845695"
                [3] = "30,10743696"
                [4} = "99,21922799"
                [5] = "109,24427645"
                [6] = "112,25926301"
                [7] = "122,30071766"
                [8] = "126,31173728"
                [9] = "365,69901733"
                [10] = "428,81853114"
                [11] = "446,87753995"
                [12] = "1206,200016600"
                [13] = "1248,207852466"
                [14] = "1273,214413967"
                [15] = "1292,221726016"
                [16] = "1297,222701830"
                [17] = "1317,229443085"
                [18] = "1334,235187967"
                [19] = "2872,490280670"
                [20] = "3040,551154329"
                [21] = "3430,743154700"
                [22] = "3555,827016331"
                [23] = "3605,863736426"
                [24] = "3638,882786082"
                [25] = "3670,900143124"
                [26] = "3681,910077842"
                [27] = "3689,917921100"
                [28] = "3697,926442883"
                [29] = "3698,927180180"
                [30] = "3699,927634804"
                [31] = "3702,927882649"
                [32] = "3703,927974041"
        [2] (0x100 : isStruct)
            eqvs:stream_name = "JR_imos32.csv"
            eqvs:av_bit_rate = "366522"
            eqvs:av_imos = "32"
            eqvs:dsr (0x600 : isOrdered
isArray)
                [1] = "0,509"
                [2] = "31,478"
```

-continued

```
            [3] = "32,366"
            [4] = "3700,141"
      eqvs: acp (0x600 : isOrdered
isArray)
            [1] = "31,15605768"
            [2] = "121,42115536"
            [3] = "127,44414448"
            [4] = "447,122688496"
            [5] = "1310,320374240"
            [6] = "3624,1234693224"
            [7] = "3697,1301231888"
            [8] = "3698,1302225936"
            [9] = "3699,1302857712"
            [10] = "3703,1303397352"
      eqvs:cbc (0x600 : isOrdered
isArray)
            [1] = "0,-12837"
            [2] = "17,8120258"
            [3] = "30,14663620"
            [4] = "99,30358294"
            [5] = "109,33946114"
            [6] = "113,36749177"
            [7] = "126,43511521"
            [8] = "361,95849359"
            [9] = "428,113612400"
            [10] = "446,121771496"
            [11] = "1205,279849346"
            [12] = "1248,291212063"
            [13] = "1273,300275277"
            [14] = "1293,311006789"
            [15] = "1297,312060719"
            [16] = "1309,319174479"
            [17] = "2874,685885203"
            [18] = "3027,763748746"
            [19] = "3433,1046951116"
            [20] = "3556,1164030478"
            [21] = "3605,1214457433"
            [22] = "3638,1240977423"
            [23] = "3670,1265272215"
            [24] = "3683,1281679083"
            [25] = "3689,1289765798"
            [26] = "3696,1299962612"
            [27] = "3698,1302196650"
            [28] = "3699,1302844221"
            [29] = "3702,1303217895"
            [30] = "3703,1303349205"
```

As will be seen, for the first quality (eqvs: stream_name="JR_imos27.csv") there are 32 indexed points in the "eqvs:cbc" array, and hence the CBC is represented by piecewise straight lines interpolated between the values given for the indexed points. Hence, for example, for GoP 435, this lies between index GoPs [10] (428, 81853114), and [11] (446, 87753995), and hence linear interpolation between these values using:

$$CBC_n = (GoP_n - GoP_1)\left(\frac{CBC_2 - CBC_1}{GoP_2 - GoP_1}\right) + CBC_1 \quad [25]$$

gives a value for GoP 435 of 84147901, where $CBC_n$ is the desired count to be found for $GoP_n$, $CBC_1$ is the lower CBC count for lower $GoP_1$ (i.e. the GoP which is below the desired GoP $GoP_n$ in the array of the compact representation), and $CBC_2$ is the lower COC count for upper $GoP_2$ (i.e. the GoP which is above the desired GoP $GoP_n$ in the array of the compact representation).

Figures 32, 33:
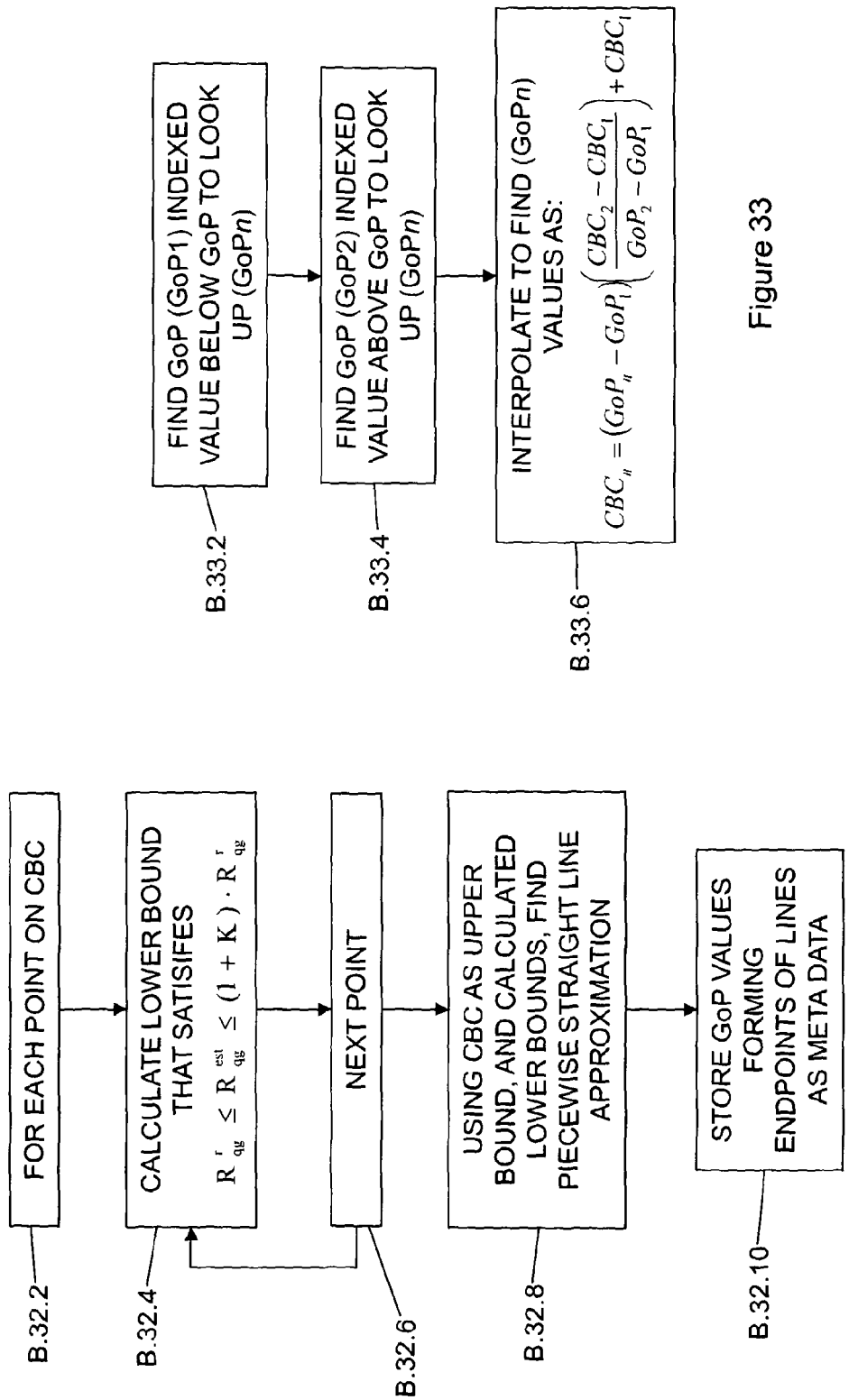
FIG. 32 is a flow-chart illustrating processing undertaken in an embodiment of the invention.
FIG. 33 is a flow-chart illustrating processing undertaken in an embodiment of the invention.

Regarding the calculation of the compact description of the CBC, in the context of FIG. 12 such a calculation is performed as part of the processing performed for block 12.8. The processing performed is described in detail above, but is summarised in FIG. 32, described next.

The processing involved to find the compact CBC representation is basically in two parts. Firstly, as shown at block 32.2 to 32.6, a processing loop is performed to process each point on the CBC in turn, and find for that point a lower bound such that when a rate is calculated using the lower bound it meets Equation 9 discussed above. In this respect, as mentioned, a good value of the constant K is 0.1, although other values of K may be used, from, for example, 0.01 to as high as 1, although a maximum value of 0.2 is more likely. K represents a fraction over the ideal rate calculated from the actual CBC data that a rate calculated from the lower bound will be, and hence the higher the value of K the more a rate calculated from the lower bound will be above the ideal calculated rate, calculated using the CBC data. The output from these processing blocks is a "shadow" lower bound CBC, with the actual CBC then defining an upper bound. Hence, for each GoP, there is range of values between the lower bound and the upper bound that the cumulative count for the GoP could take.

Having found the bounds, the second half of the processing is performed at B.32.8, to find a piecewise straight line approximation between the bounds. As discussed above, there are several different algorithms that can be used, and other line-fitting algorithms will be known in the art. The important point here is that the fit line is within the upper and lower bounds, as then we can be sure that the resulting rate that is obtained will not be under-calculated.

Once a piecewise straight line approximation has been found, at block 32.10 the GoP values forming the endpoints of the straight lines are stored in the meta data, as interpolation points, as described above.

In use, as described previously when a video file is requested from the server then the video server provides the meta data relating to the requested content to the client. The client then operates as described above to make rate calculations when required, but with the difference that whenever a CBC count value is required, then rather than looking it up directly from a table in the meta-data, it has to be calculated by interpolation from the compact representation provided. The calculation is an interpolation operation as described above, and shown in FIG. 33.

In particular, at B.33.2 and B.33.4 the meta data is searched to find the GoPs either side of a GoP the cumulative bit count for which is required. The cumulative bit count values assigned to the GoPs either side in the compact representation are then looked up, and a linear interpolation applied, as described above with respect to Equation 25.

The found CBC count value for the required GoP is then used in the rate determination techniques in exactly the same manner as if it had been looked up from table 30 in the meta data of FIG. 3.

Alternatively to the above, rather than perform an interpolation operation every time a CBC look up is performed, in another embodiment when the video client receives the meta data containing the compact representation of the CBC, it constructs a look-up table of CBC count values for each GoP from the compact representation by interpolating for each GoP in turn. In this way, the client can construct a table of CBC values for each GoP similar to the table 30 in FIG. 3, and then CBC values can simply be looked up therefrom when required.

Of course, the values would be different from the actual original CBC values, as they would have been derived by interpolation using the compact representation.

With all of the above, therefore, rate determination calculations can be performed for VBR encoded data using interpolated values for the cumulative bit curve, interpolated from a compact representation thereof that has been found in such a manner as to ensure that rates calculated using the interpolated values derived therefrom will be sufficient to ensure that buffer underflow does not occur.

Whilst the above use is optimal, the compact representations of the cumulative bit curve may be used for other uses to which cumulative bit curve information can be used. For example, cumulative bit curve information may be used in controlling buffer sizes at the client, and in particular in helping to decide how much buffer should be allocated to download a particular stream. Hence, use in rate determination calculations is not the only use for the compact representations of the cumulative bit curves of the present embodiments.

In addition, in the embodiments described above straight line approximations are found for the piecewise approximation to the CBC. However, in other embodiments other piecewise approximations that can easily be represented may be used. For example, the piecewise approximation may be found by fitting curves according to various pre-defined parametric equations within the bounds defined by the CBC and lower bounds. For example, it may be that between certain GoPs a parametric equation according to a parabola ($y=ax^n+b$, $n=2$) provides a best fit curve, in which case the meta data may indicate between which GoPs it applies and provide the parameters a and b. A series of such parameters could be provided for different ranges of GoPs, to characterise a curve that fits between the upper and lower bounds. The video client would then need to be programmed to recognise the provided parameters, and calculate the CBC approximation values appropriately. Of course, any form of parametric equation may be used, of differing orders, as required, and the order could be indicated by supplying the value for n in the data, as well as a and b.

Various further modifications, whether by way of addition, deletion, or substitution may be made to the above described embodiments to provide further embodiments, any and all of which are intended to fall within the scope of the appended claims.

The invention claimed is:

1. A method of determining a compact representation of a cumulative bit curve by a node in a video content system, the method comprising:
   receiving cumulative bit curve data representing the decoding schedule of encoded content to be delivered over a network, the cumulative bit curve data comprising cumulative bit counts with respect to a timebase of the content;
   for the timebase points in the cumulative bit curve, calculating a respective lower bound point in dependence on a forward delivery rate required to deliver the encoded content over a network such that a delivery schedule is provided which is ahead of the decoding schedule of the content;
   determining a piecewise approximation to the cumulative bit-curve, the piecewise approximation being such that a value of the approximation corresponding to a timebase point of the content is between the cumulative bit count and the calculated lower bound for the timebase point; and
   storing data representing the piecewise approximation as the compact representation of the cumulative bit curve.

2. A method according to claim 1, wherein the lower bound for a timebase point is calculated in dependence on a first delivery rate that is found in dependence on the cumulative bit curve data, and a second delivery rate equal to the product of a coefficient $(1+K)$ and the first delivery rate, where $K>0$.

3. A method according to claim 2, wherein the lower bound is calculated such that the if the resulting lower bound was used to calculate a forward delivery rate, a rate of $(1+K)R$ would be obtained, where R is a forward delivery rate required by the decoding schedule to prevent buffer underflow at a receiver that reproduces the encoded content, and $K>0$.

4. A method according to claim 3, wherein $0.01<=K<=1$, and preferably $0.01<=K<=0.2$.

5. A method according to claim 1, wherein the piecewise approximation is a curve-fit approximation within the bounds of the cumulative bit curve data and the lower bound points.

6. A method according to claim 1, wherein the piecewise approximation is a piece-wise straight line approximation.

7. A method according to claim 6, wherein the piece-wise approximation is found by starting at a point a predetermined fraction between the cumulative bit count and the lower bound for a first timebase point, and determining the longest straight line that can be drawn that ends at a point with the same predetermined fraction between the cumulative bit count and the lower bound for a second timebase point, and which remains within the cumulative bit counts and lower bounds for all timebase points in between first and second timebase points, and
   iterating the procedure with the second timebase point as the first timebase point, until substantially all timebase points in the cumulative bit curve have been processed.

8. A method according to claim 7, wherein the first timebase point is the earliest timebase point in the encoded content.

9. A method according to claim 8, wherein the first timebase point is the last timebase point in the encoded content.

10. A method according to claim 6, wherein the piecewise approximation is found by:—
   i) from a starting point between the cumulative bit count and the calculated lower bound for a timebase point, determining a first longest line that can be drawn from the point within the cumulative bit counts and the lower bounds until one of the cumulative bit count curve and/or the lower bound is intercepted;
   ii) from points on the first longest line corresponding to timebase points encompassed by the line, determining a respective second longest line that can be drawn from each point within the cumulative bit counts and the lower bounds until one of the cumulative bit count curve and/or the lower bound is intercepted;
   iii) selecting the respective second longest line which ends at the highest timebase; and
   iv) iterating the above operations ii) and iii), using the selected second longest line as the first longest line, until substantially all timebase points in the cumulative bit curve have been processed.

11. A method according to claim 1 further comprising
   calculating a forward delivery rate required such that a delivery schedule comprising the forward delivery rate is at least equal to the decoding schedule, the calculation being performed in dependence on the compact representation of the cumulative bit curve.

12. A method according to claim 11, wherein the calculation of a forward delivery rate comprises:
   being provided with pre-calculated data defining one or more critical points of a first type on the decoding schedule of the encoded content data, the critical points of the first type being points at which, for one or more other points on the decoding schedule and assuming that when delivery occurs from those points a minimum threshold amount of encoded content data is buffered, a constant bit rate delivery schedule calculated for the one or more other points such that buffer underflow does not occur is substantially equal to the decoding schedule;

wherein when actual delivery of the encoded content data is behind a piecewise monotonic decreasing constant bit rate delivery schedule required to deliver the encoded content data from the start so that buffer underflow does not occur, and at least the minimum threshold amount of content is buffered, calculating the data rate required for delivery of remaining encoded data in dependence on at least the critical points of the first type.

13. A method according to claim 12, and being further provided with pre-calculated data defining one or more critical points of a second type on the decoding schedule of the encoded data at the particular quality level, the critical points of the second type being points at which the piecewise monotonic decreasing constant bit rate delivery schedule is equal to the decoding schedule, wherein the calculating the data rate further comprises;

calculating a respective data rate for each critical point of the first type on the decoding schedule between the present delivery point and the next critical point of the second type; and selecting the maximum calculated data rate as the data rate for the particular quality.

14. A method according to claim 11, wherein the calculation of a forward delivery rate comprises:

being provided with pre-calculated data defining one or more critical points on a decoding schedule of the encoded data, the critical points being points at which a piecewise monotonic decreasing constant bit rate delivery schedule required to deliver the encoded content data so that buffer underflow does not occur is equal to the decoding schedule; and when actual delivery of the encoded content data is ahead of the constant bit rate delivery schedule, calculating the data rate required for delivery of remaining encoded data in dependence on at least the critical points on the decoding schedule.

15. A method according to claim 14, wherein the calculation of the data rate comprises:

determining a latest timepoint (Tr) in the set of encoded content data at which already delivered bits will be decoded;

determining a cumulative bit count (Bd) for the particular quality level at the latest time (Tr);

determining the present timepoint (Ta) in the set of encoded content data corresponding to the data just decoded;

determining the required data rate as the ratio of the difference between the cumulative bit count (Bdcp) of the critical point and the cumulative bit count (Bd) at the latest time (Tr), and the difference between the time (Tdcp) of the critical point and the present timepoint (Ta).

16. A computer system comprising a computer processor and a non-transitory computer readable storage medium storing instruction executable by the computer processor, the computer system being at least configured to:

receive cumulative bit curve data representing the decoding schedule of encoded content to be delivered over a network, the cumulative bit curve data comprising cumulative bit counts with respect to a timebase of the content;

for the timebase points in a cumulative bit curve, calculate a respective lower bound point in dependence on a forward delivery rate required to deliver the encoded content over a network such that a delivery schedule is provided which is ahead of the decoding schedule of the content;

determine a piecewise approximation to the cumulative bit-curve, the piecewise approximation being such that a value of the approximation corresponding to a timebase point of the content is between the cumulative bit count and the calculated lower bound for the timebase point; and store data representing the piecewise approximation as a compact representation of the cumulative bit curve.

17. The computer system according to claim 16, wherein the lower bound for a timebase point is calculated in dependence on a first delivery rate that is found in dependence on the cumulative bit curve data, and a second delivery rate equal to the product of a coefficient $(1+K)$ and the first delivery rate, where $K>0$.

18. The computer system according to claim 16, wherein the piecewise approximation is a curve-fit approximation within the bounds of the cumulative bit curve data and the lower bound points.

19. The computer system according to claim 16, wherein the piecewise approximation is a piece-wise straight line approximation.

20. The system according to claim 16, wherein the computer system is at least further configured to calculate a forward delivery rate required such that a delivery schedule comprising the forward delivery rate is at least equal to the decoding schedule, the calculation being performed in dependence on the compact representation of the cumulative bit curve.

* * * * *